(12) United States Patent
Yasui

(10) Patent No.: US 8,863,503 B2
(45) Date of Patent: Oct. 21, 2014

(54) EXHAUST PURIFICATION SYSTEM FOR INTERNAL COMBUSTION ENGINE

(71) Applicant: Honda Motor Co., Ltd., Tokyo (JP)

(72) Inventor: Yuji Yasui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 16 days.

(21) Appl. No.: 13/855,473

(22) Filed: Apr. 2, 2013

(65) Prior Publication Data

US 2013/0255233 A1    Oct. 3, 2013

(30) Foreign Application Priority Data

Apr. 3, 2012    (JP) ................................ 2012-085045

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 11/00* | (2006.01) |
| *F01N 9/00* | (2006.01) |

(52) U.S. Cl.
CPC . *F01N 3/10* (2013.01); *Y02C 20/10* (2013.01); *F01N 2900/1402* (2013.01); *F01N 11/00* (2013.01); *Y02T 10/47* (2013.01); *F01N 2900/0404* (2013.01); *F01N 2560/025* (2013.01); *F01N 2900/1622* (2013.01); *F01N 2560/021* (2013.01); *F01N 2900/0601* (2013.01); *F01N 9/005* (2013.01); *F01N 2560/026* (2013.01); *F01N 2900/1602* (2013.01); *Y02T 10/24* (2013.01); *F01N 3/208* (2013.01); *F01N 2550/02* (2013.01)
USPC .................. 60/295; 60/301; 60/286; 60/299; 60/274; 60/277

(58) Field of Classification Search
USPC ............ 60/285, 286, 295, 299, 274, 277, 301
See application file for complete search history.

(56) References Cited

U.S. PATENT DOCUMENTS

| 6,427,439 B1 | 8/2002 | Xu et al. |
| 2005/0282285 A1 | 12/2005 | Radhamohan et al. |

(Continued)

FOREIGN PATENT DOCUMENTS

| DE | 10 2008 040 377 A1 | 1/2010 |
| DE | 10 2010 026 373 A1 | 1/2010 |

(Continued)

OTHER PUBLICATIONS

Search report issued to DE Application No. 102013205815.2, mailed Nov. 7, 2013.

*Primary Examiner* — Thomas Denion
*Assistant Examiner* — Dapinder Singh
(74) *Attorney, Agent, or Firm* — Squire Patton Boggs (US) LLP

(57) ABSTRACT

An exhaust purification system is provided that can appropriately grasp the NOx concentration or $NH_3$ concentration on a downstream side of a selective reduction catalyst. A separation filter of the system models a downstream NOx estimated value (NOx_DW_hat) of the catalyst with a value obtained by multiplying a coefficient (Kscr) by an output (NOx_UP) of an upstream-side NOx sensor. The separation filter includes transient extraction filters that block a stationary component and allow a frequency band corresponding to an increase-decrease request of drive power from the driver to pass from the downstream NOx sensor output (Ynox) and upstream NOx sensor output (NOx_UP), and calculate filter values (Ynox_f, NOx_UP_f) of each; and an identifier that identifies the coefficient (Kscr) so that error (eid) between the filter value (Ynox_f) and a value (NOx_DW_hat_f) obtained by multiplying the purification coefficient (Kscr) by the filter value (NOx_UP_f) becomes a minimum.

12 Claims, 35 Drawing Sheets

(56) References Cited

U.S. PATENT DOCUMENTS

| | | |
|---|---|---|
| 2009/0266142 A1 | 10/2009 | Wang et al. |
| 2010/0005781 A1 | 1/2010 | Schweizer |
| 2010/0050614 A1 | 3/2010 | Parmentier et al. |
| 2010/0107609 A1 | 5/2010 | Parmentier et al. |
| 2010/0223907 A1 | 9/2010 | Walde et al. |
| 2011/0005202 A1 | 1/2011 | Gady et al. |
| 2012/0117954 A1* | 5/2012 | Yasui et al. .............. 60/301 |
| 2012/0124967 A1* | 5/2012 | Yang et al. .............. 60/274 |
| 2012/0137660 A1* | 6/2012 | Yan et al. .............. 60/276 |
| 2012/0174562 A1* | 7/2012 | Itoh .............. 60/274 |
| 2012/0186232 A1* | 7/2012 | Kim et al. .............. 60/274 |

FOREIGN PATENT DOCUMENTS

| | | |
|---|---|---|
| DE | 10 2009 012 092 A1 | 9/2010 |
| DE | 10 2009 027 184 A1 | 12/2010 |
| JP | 2004-100700 A | 4/2004 |
| JP | 2006-274986 A | 10/2006 |

* cited by examiner

SCR TEMPERATURE [°C]
(CATALYST TEMPERATURE SENSOR OUTPUT VALUE Tscr)

NH3 STORAGE RATE R_nh3_st

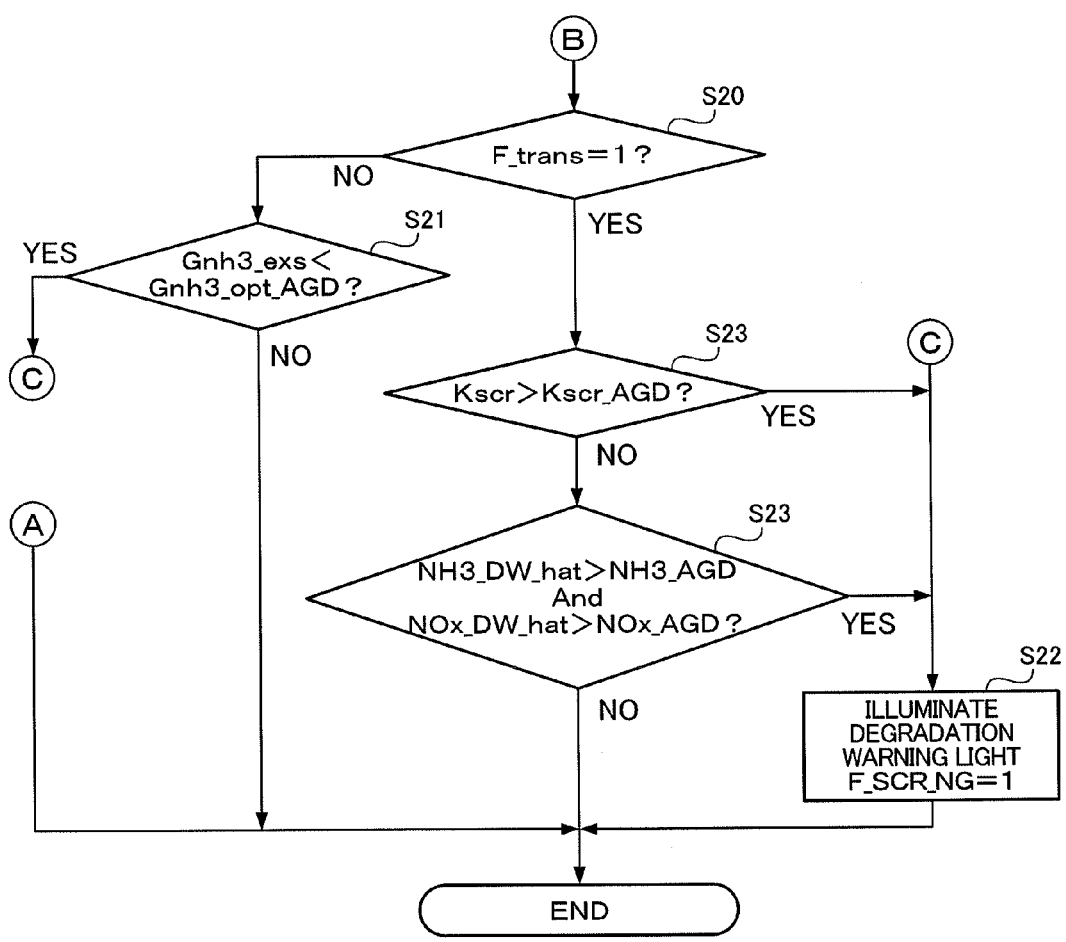

FIG. 26

| | UREA WATER INJECTOR | FEED-FORWARD CONTROLLER | NH3 STORAGE CONTROLLER | FEED-BACK CONTROLLER | | |
|---|---|---|---|---|---|---|
| | | | | SEPARATION FILTER | SLIDING-MODE CONTROLLER | EXTREMA SEARCH CONTROLLER |
| EXPERIMENT 1 | REFERENCE ARTICLE | ○ | ○ | × | × | × |
| EXPERIMENT 2 | UPPER-LIMIT ARTICLE | ○ | ○ | × | × | × |
| EXPERIMENT 3 | LOWER-LIMIT ARTICLE | ○ | ○ | × | × | × |
| EXPERIMENT 4 | REFERENCE ARTICLE | ○ | ○ | × | ○ | × |
| EXPERIMENT 5 | REFERENCE ARTICLE | ○ | ○ | ○ | ○ | ○ |
| EXPERIMENT 6 | UPPER-LIMIT ARTICLE | ○ | ○ | ○ | ○ | ○ |
| EXPERIMENT 7 | LOWER-LIMIT ARTICLE | ○ | ○ | ○ | ○ | ○ |

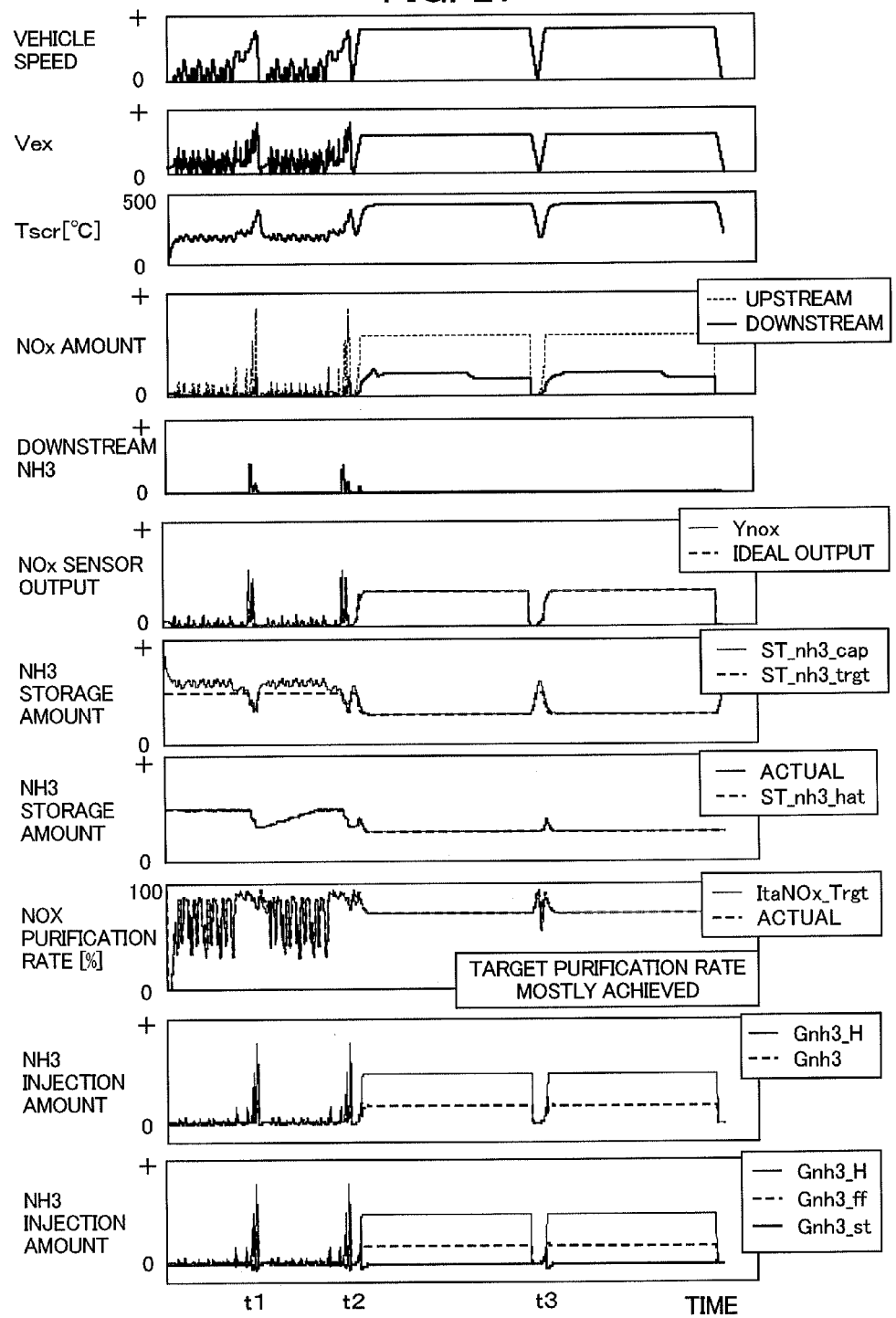

EXHAUST PURIFICATION SYSTEM FOR INTERNAL COMBUSTION ENGINE

This application is based on and claims the benefit of priority from Japanese Patent Application No. 2012-085045, filed on 3 Apr. 2012, the content of which is incorporated herein by reference.

BACKGROUND OF THE INVENTION

1. Field of the Invention

The present invention relates to an exhaust purification system for an internal combustion engine. In more detail, the present invention relates to an exhaust purification system provided with a selective reduction catalyst that purifies NOx in the exhaust under the presence of $NH_3$, a NOx sensor that detects the concentration of NOx, an $NH_3$ sensor that detects the concentration of $NH_3$ on a downstream side of this selective reduction catalyst, and the like.

2. Related Art

As one exhaust purification system that purifies NOx in exhaust, a system has thus far been proposed in which a selective reduction catalyst that selectively reduces NOx in the exhaust by way of a reducing agent such as ammonia ($NH_3$) is provided in an exhaust channel. For example, with an exhaust purification system of urea addition type, urea water, which is a $NH_3$ precursor, is supplied from an upstream side of the selective reduction catalyst, $NH_3$ is generated by thermal decomposition or hydrolysis of this urea water by the heat of the exhaust, and the NOx in the exhaust is selectively reduced by this $NH_3$. In addition to such a system of urea addition type, for example, a system has also been proposed that generates $NH_3$ by heating a compound of $NH_3$ such as ammonia carbide, and directly adds this $NH_3$. A system of urea addition type will be explained hereinafter.

With such a system, in a case of the effective $NH_3$ amount of the selective reduction catalyst being less than an optimum amount, the NOx purification rate declines from the ammonia being consumed in the reduction of NOx being insufficient, and in a case of being larger than this optimum amount, the ammonia that has become surplus in the reduction of NOx is discharged. As a result, appropriately controlling the injection amount of urea water has been important in an exhaust purification system provided with a selective reduction catalyst. Therefore, in Patent Document 1 and Patent Document 2, systems are exemplified that estimate a NOx purification rate of a selective reduction catalyst, and control an injection amount of the urea water based on this estimation.

With the exhaust purification system of Patent Document 1, the NOx amount on a downstream side of the selective reduction catalyst is detected by a NOx sensor, and the composition of the exhaust flowing into the selective reduction catalyst, more specifically, the ratio of NO to $NO_2$, is estimated from the output value of this NOx sensor and the operating state of the internal combustion engine. Furthermore, based on this composition of the exhaust, the NOx purification rate of the selective reduction catalyst is estimated and the injection amount of urea water is controlled.

In addition, with the exhaust purification system of Patent Document 2, the temperature of the catalyst is detected as an amount relating to the NOx purification rate of the selective reduction catalyst, and the injection amount of urea water is controlled based on this temperature.

However, the NOx purification rate of the selective reduction catalyst varies not only by the aforementioned such composition of the exhaust and temperature of the selective reduction catalyst, but also the degradation state of the selective reduction catalyst. In addition, there is variability in purification performance between individual units. Therefore, it is difficult to always optimally control the injection amount of urea water with exhaust purification systems such as those exemplified in Patent Documents 1 and 2.

Patent Document 1: Japanese Unexamined Patent Application, Publication No. 2004-100700

Patent Document 2: Japanese Unexamined Patent Application, Publication No. 2006-274986

SUMMARY OF THE INVENTION

FIG. 43 provides graphs showing the output characteristics of the NOx sensor provided on the downstream side of the selective reduction catalyst in the aforementioned such conventional exhaust purification systems. FIG. 43 shows the change characteristics of the NOx concentration and the $NH_3$ concentration on the downstream side of the selective reduction catalyst, and the outputs value of the downstream-side NOx sensor when defining the vertical axis as the effective $NH_3$ amount of the selective reduction catalyst. Herein, the effective $NH_3$ amount refers to an amount of $NH_3$ that can directly contribute to the reduction of NOx in the selective reduction catalyst, and is one index indicating the NOx purification performance of the selective reduction catalyst. More specifically, the effective $NH_3$ amount corresponds to an amount combining the amount of $NH_3$ already adsorbed to the selective reduction catalyst ($NH_3$ storage amount), and the amount of $NH_3$ newly supplied to the selective reduction catalyst.

Since the effective $NH_3$ amount is increased when increasing the injection amount of urea water, the NOx purification rate of the selective reduction catalyst will rise. For this reason, the NOx concentration downstream of the selective reduction catalyst decreases accompanying the effective $NH_3$ amount increasing, as shown in FIG. 43. In addition, when exceeding the effective $NH_3$ amount indicated by the star, the NOx concentration becomes substantially constant, irrespective of the effective $NH_3$ amount. In other words, the urea water of the amount exceeding the star indicates being surplus relative to that reducing the generated NOx.

In addition, herein, the $NH_3$ generated from the urea water that is surplus is not consumed in the reduction of NOx, and is discharged to downstream of the selective reduction catalyst. Therefore, as shown in FIG. 43, the $NH_3$ concentration of exhaust downstream of the selective reduction catalyst increases, when exceeding the effective $NH_3$ amount indicated by the star. It should be noted that $NH_3$ discharging from the selective reduction catalyst to the downstream side thereof in this way is referred to hereinafter as "$NH_3$ slip".

The effective $NH_3$ amount indicated by the stars in FIG. 43 can minimize both the NOx concentration and $NH_3$ concentration on the downstream side of the selective reduction catalyst; therefore, it is the optimum effective $NH_3$ amount in this exhaust purification system.

However, as shown in FIG. 43, the output value of the NOx sensor exhibits a downward convex characteristic, with the output value at this optimum effective $NH_3$ amount as the minimum point. This is because existing sensors called NOx sensors are sensitive not only to NOx, but also to $NH_3$, on this detection principle. Therefore, it is not possible to determine if the effective $NH_3$ amount is an insufficient state relative to the optimum amount or is an excessive state, with only the output value from the NOx sensor.

However, the selective reduction catalyst has an ability to adsorb ammonia, in addition to the ability to reduce NOx under the presence of $NH_3$, in the above way.

FIG. 44 is a graph showing the relationship between the storage rate of $NH_3$ and the NOx purification rate of the selective reduction catalyst. Herein, the storage rate is a proportion of the $NH_3$ amount adsorbed to the selective reduction catalyst relative to the maximum value thereof.

As shown in FIG. 44, the NOx purification rate of the selective reduction catalyst has a characteristic of improving as the storage rate rises. Therefore, in order to maintain the NOx purification rate high while suppressing the occurrence of $NH_3$ slip, it is desirable to control the storage rate of the selective reduction catalyst to the maximum value with high accuracy. However, since there is the aforementioned such characteristic in the NOx sensor, it is difficult to continuously control the storage rate to the maximum value while suppressing the occurrence of $NH_3$ slip, and there is also concern over the control system failing. For this reason, with the conventional exhaust purification system using a NOx sensor provided on the downstream side of the selective reduction catalyst, the occurrence of excessive $NH_3$ slip is suppressed in exchange for a decline in NOx purification rate, by controlling the storage rate to approximately 15 to 30%.

As described above, although existing NOx sensors have sensitivity to not only NOx components in exhaust but also to the $NH_3$ component, it is possible to develop an $NH_3$ sensor having no sensitivity to NOx. Therefore, by substituting the aforementioned NOx sensor with an $NH_3$ sensor or jointly using with an $NH_3$ sensor, it is possible to determine if the effective $NH_3$ amount is an insufficient state or is an excessive state relative to the optimum amount as indicated by the star in FIG. 43.

However, existing $NH_3$ sensors receive the influence of components other than $NH_3$ in exhaust ($O_2$, $H_2O$, etc.), and thus there is a possibility of gain variation to occur. For this reason, in a case of performing urea-water injection control based on the output value of an $NH_3$ sensor, there is concern over the urea water injection amount shifting from the appropriate amount in response to the gain variation of the $NH_3$ sensor.

Due to the aforementioned such problems being present in the existing NOx sensors and $NH_3$ sensors, it has been difficult to appropriately grasp the NOx concentration and $NH_3$ concentration on the downstream side of the selective reduction catalyst, and thus to perform optimal urea-water injection control in accordance thereto.

The present invention has an object of providing an exhaust purification system that can appropriately grasp the NOx concentration or $NH_3$ concentration on the downstream side of the selective reduction catalyst so as to perform optimal injection control in accordance thereto.

In order to solve the above problem, a first aspect of the present invention provides an exhaust purification system (e.g., the exhaust purification system 2 described later) for an internal combustion engine (e.g., the engine 1 described later) that includes: a selective reduction catalyst (e.g., the selective reduction catalyst 23 described later) that is provided in an exhaust channel (e.g., the exhaust channel 11 described later) of the internal combustion engine and purifies NOx in exhaust under the presence of $NH_3$; a reducing agent supply means (e.g., the urea-water injection device 25 described later) for supplying $NH_3$ or a precursor thereof to the selective reduction catalyst; an exhaust gas sensor (e.g., the downstream-side NOx sensor 26 described later) that detects a concentration of a component combining NOx and $NH_3$ in exhaust on a downstream side from the selective reduction catalyst; an upstream-side detection means (e.g., the upstream-side NOx sensor 28 described later) for detecting or estimating a concentration of NOx in exhaust on an upstream side from the selective reduction catalyst; a downstream-side estimation means (e.g., the separation filter 32, 32A, 32B described later) for modeling an estimated value (NOx_DW_hat) of the concentration of NOx in exhaust on a downstream side from the selective reduction catalyst with a value obtained by multiplying a predetermined purification coefficient (Kscr) by an output value (NOx_UP) of the upstream-side detection means; an identification means (e.g., the purification coefficient identifier 321A, 321B described later) for identifying a value of the purification coefficient so that error (e'id) between an output value (Ynox) of the exhaust gas sensor and an output value (NOx_DW_hat) of the downstream-side estimation means, or error (eid) of a value corresponding to a filter value of each of the output values becomes a minimum; and a supply amount determination means (e.g., the SCR catalyst state estimator 33, feed-forward controller 34, feedback controller 35, $NH_3$ storage controller 36, urea water injection amount calculation unit 31, etc. described later) for determining a supply amount of the reducing agent supply means based on the output value of the downstream-side estimation means. It should be noted that "concentration" in the present invention is defined to also include physical quantities for which units can be converted between concentration using a predetermined coefficient and a known arithmetic expression, such as concentration and an amount or concentration and an equivalence ratio, for example.

According to the first aspect of the present invention, the estimated value of the NOx concentration on the downstream side from the selective reduction catalyst is modeled with a value obtained by multiplying a predetermined purification coefficient by the output value of the upstream-side detection means, based on the similarity between the spectral distribution of the NOx concentration on the upstream side from the selective reduction catalyst, and the spectral distribution of the NOx concentration on the downstream side, and the estimated value of the NOx concentration on the downstream side is calculated according to this. In addition, the $NH_3$ amount fluctuates according to the reducing agent supply means, and the NOx amount fluctuates depending on the operating state of the internal combustion engine according to the driver; therefore, the overlap between the spectral distribution of $NH_3$ and the spectral distribution of NOx in the exhaust on the downstream side of the selective reduction catalyst decreases. With the present invention, using this, the estimated value of the downstream-side NOx concentration can be calculated with sufficient estimation accuracy by identifying so that the error between the output value of the exhaust gas sensor and the estimated value of the downstream-side NOx concentration, or error of values corresponding to these filter values, becomes a minimum. In addition, by using this estimated value of the downstream-side NOx concentration, it is possible to appropriately determine the supply amount of the reducing agent supply means so that $NH_3$ slip of the selective reduction catalyst is suppressed and the NOx purification rate can be maintained to be high.

In a case of the internal combustion engine being in a transient state, since the fluctuation in the $NH_3$ storage amount in the selective reduction catalyst increases, particularly the NOx purification rate tends to decline and $NH_3$ slip tends to occur. On the other hand, with the present invention, since the purification coefficient is identified using the separation of spectral distributions of $NH_3$ and NOx, the estimation accuracy rises particularly in the transient state of the internal combustion engine. For this reason, the present invention can realize the achievement of both an improvement in NOx purification rate and suppression of $NH_3$ slip in the transient state.

In addition, by subtracting the estimated value of the downstream-side NOx concentration from the output value of the exhaust gas sensor, the estimated value of the downstream-side $NH_3$ concentration can also be calculated without specially providing an $NH_3$ sensor. Therefore, the NOx concentration and $NH_3$ concentration on the downstream side of the selective reduction catalyst are appropriately grasped, and thus the appropriate supply amount of the reducing agent supply means can be determined in accordance thereto.

In addition, by estimating the downstream-side NOx concentration with high accuracy, the decline in NOx purification rate of the selective reduction catalyst will not be misrecognized as the occurrence of $NH_3$ slip, and the supply amount of the reducing agent supply means will not be mistakenly decreased. Conversely, the occurrence of $NH_3$ slip at the selective reduction catalyst will not be misrecognized as a decline in the NOx purification rate, and the supply rate of the reducing agent supply means will not be mistakenly increased.

According to a second aspect, in this case, it is preferable for the exhaust purification system to further include a transient extraction filter (e.g., the transient extraction filter 322B, 323B described later) that blocks a stationary component and that allows at least a frequency band corresponding to a increase-decrease request of drive power from a driver to pass therethrough from the output value (Ynox) of the exhaust gas sensor and the output value (NOX_UP) of the upstream-side detection means, and calculates a filter value (Ynox_f, NOx_UP_f) of each, in which the identification means identifies the value of the purification coefficient so that error (eid) between the filter value (Ynox_f) of the output value of the exhaust gas sensor and a value obtained by multiplying the purification coefficient (Kscr) by the filter value (NOx_UP_f) of the output value of the upstream-side detection means becomes a minimum.

The $NH_3$ amount fluctuates depending on the reducing agent supply means. For this reason, the peak of the spectral distribution of $NH_3$ in the exhaust on the downstream side of the selective reduction catalyst will be near the low frequency side of about 0 Hz. In contrast, the peak in the spectral distribution of NOx will be near a higher frequency side than the peak in the spectral distribution of $NH_3$ since the NOx amount fluctuates depending on the operating state of the internal combustion engine according to the driver. With the present invention, using this, it is possible to further improve the estimation accuracy of the downstream-side NOx concentration by extracting only the frequency component of NOx from the output value of the exhaust gas sensor and the output value of the upstream-side detection means by the transient extraction filter, and identifying the value of the purification coefficient using these filter values.

According to a third aspect, in this case, it is preferable for the exhaust purification system to further include a transient state determination means (e.g., the feedback controller 35 described later) for determining whether the internal combustion engine is in a transient state, in which the identification means updates the value of the purification coefficient in a case of having been determined as being a transient state.

Since the NOx amount fluctuates depending on the operating state of the internal combustion engine according to the driver as described above, the separation of peaks in the spectral distributions of $NH_3$ and NOx is particularly obvious in the transient state in which the operating state of the internal combustion engine greatly changes. With the present invention, it is possible to further improve the estimation accuracy of the downstream-side NOx concentration by updating the value of the purification coefficient at such a timing. It should be noted that, while the operating state of the internal combustion engine is not a transient state and the value of the purification coefficient is not updated, a decline in the NOx purification rate of the selective reduction catalyst can be prevented by combining with another method such as a method of determining the supply amount of the reducing agent supply means, while searching for extrema of the exhaust gas sensor.

According to a fourth aspect, in this case, it is preferable for the supply amount determination means to include a feedback controller (e.g., the feedback controller 35 described later) that determines a supply amount of the reducing agent supply means so that the output value (NOx_DW_hat) of the downstream-side estimation means becomes a predetermined downstream-side NOx concentration target value (NOx_DW_trgt), or so that the estimated value (ItaNOx_hat) of the NOx purification rate of the selective reduction catalyst calculated based on the output value (NOx_DW_hat) of the downstream-side estimation means becomes a predetermined NOx purification rate target value (ItaNOx_trgt).

According to the present invention, the NOx purification rate of the selective reduction catalyst can be maintained to be high by determining the supply amount of the reducing agent supply means by sending feedback of the estimated value of the downstream-side NOx concentration calculated with high estimation accuracy as described above.

According to a fifth aspect, in this case, it is preferable for the supply amount determination means to include a feedback controller (e.g., the feedback controller 35 described later) that sets a value obtained by subtracting the output value (NOx_DW_hat) of the downstream-side estimation means from the output value (Ynox) of the exhaust gas sensor as an estimated value (NH3_DW_hat) of an $NH_3$ concentration on a downstream side from the selective reduction catalyst, and determines the supply amount (Gurea) of the reducing agent supply means so that the estimated value (NH3_DW_hat) of the $NH_3$ concentration on the downstream side of the selective reduction catalyst converges to a predetermined downstream-side $NH_3$ concentration target value (NH3_DW_trgt).

According to the present invention, it is possible to realize the achievement of both suppression of $NH_3$ slip of the selective reduction catalyst and an improvement in NOx purification rate, by calculating the estimated value of the downstream-side $NH_3$ concentration from the estimated value of the downstream NOx concentration calculated with high estimation accuracy as described above, and determining the supply amount of the reducing agent supply means by sending this as feedback.

According to a sixth aspect, in this case, it is preferable for the NOx purification rate of the selective reduction catalyst to reach a local maximum at a predetermined optimum temperature; a maximum $NH_3$ storage amount that is a maximum value for an $NH_3$ amount that can be adsorbed to the selective reduction catalyst to decline as the temperature thereof rises; and the downstream-side $NH_3$ concentration target value (NH3_DW_trgt) to be set, in a case of a temperature of the selective reduction catalyst being less than the optimum temperature, in accordance with the NOx purification rate (ItaNOx_trgt) achieved by the selective reduction catalyst when $NH_3$ of an amount corresponding to the maximum $NH_3$ storage amount at the optimum temperature is adsorbed, and to be set, in a case of the temperature of the selective reduction catalyst being at least the optimum temperature, in accordance with the NOx purification rate (ItaNOx_trgt) achieved by the selective reduction catalyst when $NH_3$ of an amount corresponding to the maximum $NH_3$ storage amount at this temperature is adsorbed.

According to the present invention, during high load operation (while catalyst is high temperature) in which high NOx purification performance is demanded from the selective reduction catalyst, the NOx purification performance thereof can be raised by maximizing the $NH_3$ storage amount. In addition, during low load operation (while catalyst is low temperature), sufficient NOx purification performance is realized by making the $NH_3$ storage amount lower than the maximum value, while it is possible to prevent an abundance of $NH_3$ slip from occurring, even in a case of the temperature of the selective reduction catalyst suddenly rising due to sudden acceleration.

According to a seventh aspect, in this case, it is preferable for the downstream-side $NH_3$ concentration target value (NH3_DW_hat) to be set to 0 or a positive value in the vicinity of zero when the temperature of the selective reduction catalyst is less than the optimum temperature at which the NOx purification rate thereof reaches a local maximum, and to be set to a value larger than the value for when less than the optimum temperature if the temperature of the selective reduction catalyst is at least the optimum temperature.

With the present invention, during low load operation (when less than the optimum temperature), in a case of unintended $NH_3$ slip occurring due to degradation of the catalyst or the like, it is possible to suppress this promptly by establishing the downstream-side $NH_3$ concentration target value as described above. In addition, during high load operation (when at least the optimum temperature), since the $NH_3$ storage amount of the selective reduction catalyst can be stably maintained at the maximum $NH_3$ storage amount, it is possible to maintain the NOx purification rate of the selective reduction catalyst to be high.

According to an eighth aspect, in this case, when the estimated value (NH3_DW_hat) of the downstream-side $NH_3$ concentration is smaller than a predetermined threshold (NH3_DW_trgt+TH_NH3_SLIP_H) that is larger than the downstream-side $NH_3$ concentration target value (NH3_DW_trgt), it is preferable for the feedback controller to reduce a rate of decrease in deviation (E_fb) of the estimated value relative to the downstream-side $NH_3$ concentration target value, to less than in a case of the estimated value of the downstream-side $NH_3$ concentration being greater than the threshold.

With the present invention, in a case in which the estimated value of the downstream-side $NH_3$ concentration is lower than a predetermined threshold and it is considered that the estimation accuracy thereof is relatively insufficient, it is possible to prevent the supply amount of the reducing agent supply means from being mistakenly decreased in a state in which the estimation accuracy is insufficient, by reducing the rate of decrease in the deviation to slower than in a case of the estimated value of the downstream-side $NH_3$ concentration being larger than the threshold. In other words, it is possible to suppress the occurrence of excessive $NH_3$ slip, while preventing the supply amount of the reducing agent supply means from being excessively decreased and the NOx purification rate decreasing.

According to a ninth aspect, in this case, it is preferable for the feedback controller to determine the supply amount (Gurea) of the reducing agent supply means so that deviation (Enox) between the output value (NOx_DW_hat) of the downstream-side estimation means and a predetermined downstream-side NOx concentration target value (NOx_DW_trgt) becomes 0, in a case of the estimated value (NH3_DW_hat) of the downstream-side $NH_3$ concentration being smaller than a threshold (NH3_DW_trgt+TH_NH3_SLIP_L) that is larger than the downstream-side $NH_3$ concentration target value (NH3_DW_trgt); and to determine the supply amount (Gurea) of the reducing agent supply means so that deviation (Enh3) between the estimated value (NH3_DW_hat) of the downstream-side $NH_3$ concentration and the downstream-side $NH_3$ concentration target value (NH3_DW_trgt) becomes 0, in a case of the estimated value (NH3_DW_hat) of the downstream-side $NH_3$ concentration being at least the threshold (NH3_DW_trgt+TH_NH3_SLIP_L).

With the present invention, the two deviations of the deviation of the downstream-side NOx concentration and the deviation of the downstream-side $NH_3$ concentration are calculated, the supply amount is determined so that the deviation of the downstream-side NOx concentration becomes smaller in a case of the downstream-side $NH_3$ concentration being smaller than a predetermined threshold, and the supply amount is determined so that the deviation of the downstream-side $NH_3$ concentration is smaller in a case of the downstream-side $NH_3$ concentration being at least the threshold. In other words, with the present invention, among NOx and $NH_3$, the supply amount of the reducing agent supply means is determined so as to prioritize control of to suppress slip of $NH_3$. It is thereby possible to suppress the occurrence of excessive $NH_3$ slip, while maintaining the NOx purification to be high, since it is possible to maintain a state in which $NH_3$ is slightly slipped by the selective reduction catalyst.

According to a tenth aspect, in this case, it is preferable for the exhaust purification system to further include a failure determination means (e.g., the ECU 3 described later) for determining that the selective reduction catalyst has degraded in a case of the value of the purification coefficient becoming greater than a predetermined threshold (Kscr_AGD).

The purification coefficient corresponds to a ratio of the NOx concentration on the downstream side of the selective reduction catalyst to the NOx concentration on the upstream side, and thus can be used as a parameter for determining the NOx purification rate of the selective reduction catalyst. With the present invention, it is possible to raise the frequency of degradation determination by determining degradation of the selective reduction catalyst based on such a purification coefficient successively identified, and further, it is possible to raise the accuracy of degradation determination.

According to an eleventh aspect, in this case, it is preferable for the exhaust purification system to further include a failure determination means (e.g., the ECU 3 described later) for determining that the selective reduction catalyst has degraded in a case of the estimated value (NH3_DW_hat) of the downstream-side $NH_3$ concentration being larger than a predetermined failure determination threshold (NH3_AGD), and the estimated value (NOx_DW_hat) of the downstream-side estimation means being larger than a predetermined failure determination threshold (NOx_AGD).

In a case of the downstream-side NOx concentration also being relatively high despite the downstream-side $NH_3$ concentration being relative high, it is possible to determine that the NOx purification performance of the selective reduction catalyst has declined. With the present invention, by determining degradation of the selective reduction catalyst based on both the downstream-side $NH_3$ estimated value and the downstream-side NOx estimated value, it is possible to raise the frequency of degradation determination, and further, it is possible to raise the accuracy of degradation determination. It should be noted that, upon calculating the downstream-side $NH_3$ estimated value and the downstream-side NOx estimated value, since an $NH_3$ sensor is not necessarily required, the cost can be reduced by this amount.

In order to solve the above-mentioned problem, a twelfth aspect of the present invention provides an exhaust purification system (e.g., the exhaust purification system 2C described later) that includes: a selective reduction catalyst (e.g., the selective reduction catalyst 23 described later) that is provided in an exhaust channel (e.g., the exhaust channel 11 described later) of an internal combustion engine (e.g., the engine 1 described later) and purifies NOx in exhaust under the presence of $NH_3$; a reducing agent supply means (e.g., the urea-water injection device 25 described later) for supplying $NH_3$ or a precursor thereof to the selective reduction catalyst; and an exhaust gas sensor (e.g., the downstream-side $NH_3$ sensor 26C described later) that detects a concentration of $NH_3$ in exhaust on a downstream side from the selective reduction catalyst, wherein gain of the exhaust gas sensor changes under the presence of $O_2$. The exhaust purification system is characterized in including: an upstream-side detection means (e.g., the LAF sensor 29C described later) for detecting or estimating an $O_2$ concentration of exhaust on an upstream side from the selective reduction catalyst; a variation calculating means (e.g., the fluctuation component extraction unit 322C described later) for calculating a variation (DFAI_UP) from a predetermined base value (FAI_UP_BS) of an output value (FAI_UP) of the upstream-side detection means; a downstream-side estimation means (e.g., the separation filter 32C described later) for modeling an error component value (DNH3_comp) of the exhaust gas sensor with a value obtained by multiplying a predetermined correction coefficient (Kc) by the variation (DFAI_UP) calculated by way of the variation calculating means; a transient extraction filter (e.g., the transient extraction filter 323C, 324C described later) that blocks a stationary component and at least allows a frequency band corresponding to a increase-decrease request of drive power from a driver to pass from the output value (NH3_DW) of the exhaust gas sensor and the variation (DFAI_UP) calculated by way of the variation calculating means, and calculates a filter value of each; an identification means (e.g., the correction coefficient identifier 321C described later) for identifying a value of the correction coefficient so that error (eid) between the filter value (NH3_DW_f) of the output value of the exhaust gas sensor and a value (NH3_DW_f_hat) calculated by multiplying the correction coefficient (Kc) by the filter value (DFAI_UP_f) of the variation (DFAI_UP) calculated by way of the variation calculating means becomes a minimum; and a supply amount determination means (e.g., the SCR catalyst state estimator 33, feed-forward controller 34, feedback controller 35C, NH3 storage controller 36, urea water injection amount calculation unit 31, etc. described later) for determining a supply amount of the reducing agent supply means based on an $NH_3$ concentration estimated value obtained by removing the error component value calculated by way of the downstream-side estimation means from the output value of the exhaust gas sensor.

With the present invention, based on the similarity between the spectral distribution of the fluctuation of the $O_2$ concentration on an upstream side from the selective reduction catalyst and the spectral distribution of the error component of the exhaust gas sensor provided on a downstream side from the selective reduction catalyst, the error component value of the exhaust gas sensor is modeled with a value obtained by multiplying the predetermined correction coefficient by the variation of the variation calculating means, and the error component value of the exhaust gas sensor is calculated according thereto. In addition, the $NH_3$ amount fluctuates according to the reducing agent supply means, and the $O_2$ amount fluctuates depending on the operating state of the internal combustion engine according to the driver; therefore, the overlap between the spectral distribution of $NH_3$ in the exhaust on the downstream side of the selective reduction catalyst and the spectral distribution of error component of the exhaust gas sensor caused by the fluctuation in the $O_2$ amount NOx decreases. More specifically, the peak of $NH_3$ becomes near the low frequency side at about 0 Hz, and the peak of the error component of the exhaust gas sensor becomes closer to the high frequency side than the peak of $NH_3$. With the present invention, using this to extract only the fluctuation component of $O_2$ from the output value of the exhaust gas sensor and the fluctuation value of the fluctuation value calculating means by way of the transient extraction filter, and then identifying the value of the correction coefficient using these filter values, it is possible to not only calculate the error component value of the exhaust gas sensor with high accuracy, but also the $NH_3$ concentration estimated value. In addition, by using this estimated value of the downstream $NH_3$ concentration, it is possible to appropriately determine the supply amount of the reducing agent supply means so that $NH_3$ slip of the selective reduction catalyst is suppressed and the NOx purification rate can be maintained to be high. In addition, by estimating the downstream $NH_3$ concentration with high accuracy, the decline in NOx purification rate of the selective reduction catalyst will not be misrecognized as the occurrence of $NH_3$ slip, and the supply amount of the reducing agent supply means will not be mistakenly decreased. Conversely, the occurrence of $NH_3$ slip at the selective reduction catalyst will not be misrecognized as a decline in the NOx purification rate, and the supply rate of the reducing agent supply means will not be mistakenly increased.

BRIEF DESCRIPTION OF THE DRAWINGS

FIG. 25 is a flowchart showing the sequence of urea-water injection control;

FIG. 26 is a table summarizing the conditions of simulation for each experiment;

FIG. 27 provides graphs showing the simulation results of Experiment 1;

DETAILED DESCRIPTION OF THE INVENTION

First Embodiment

Hereinafter, a first embodiment of the present invention will be explained while referencing the drawings.

Figure 1:
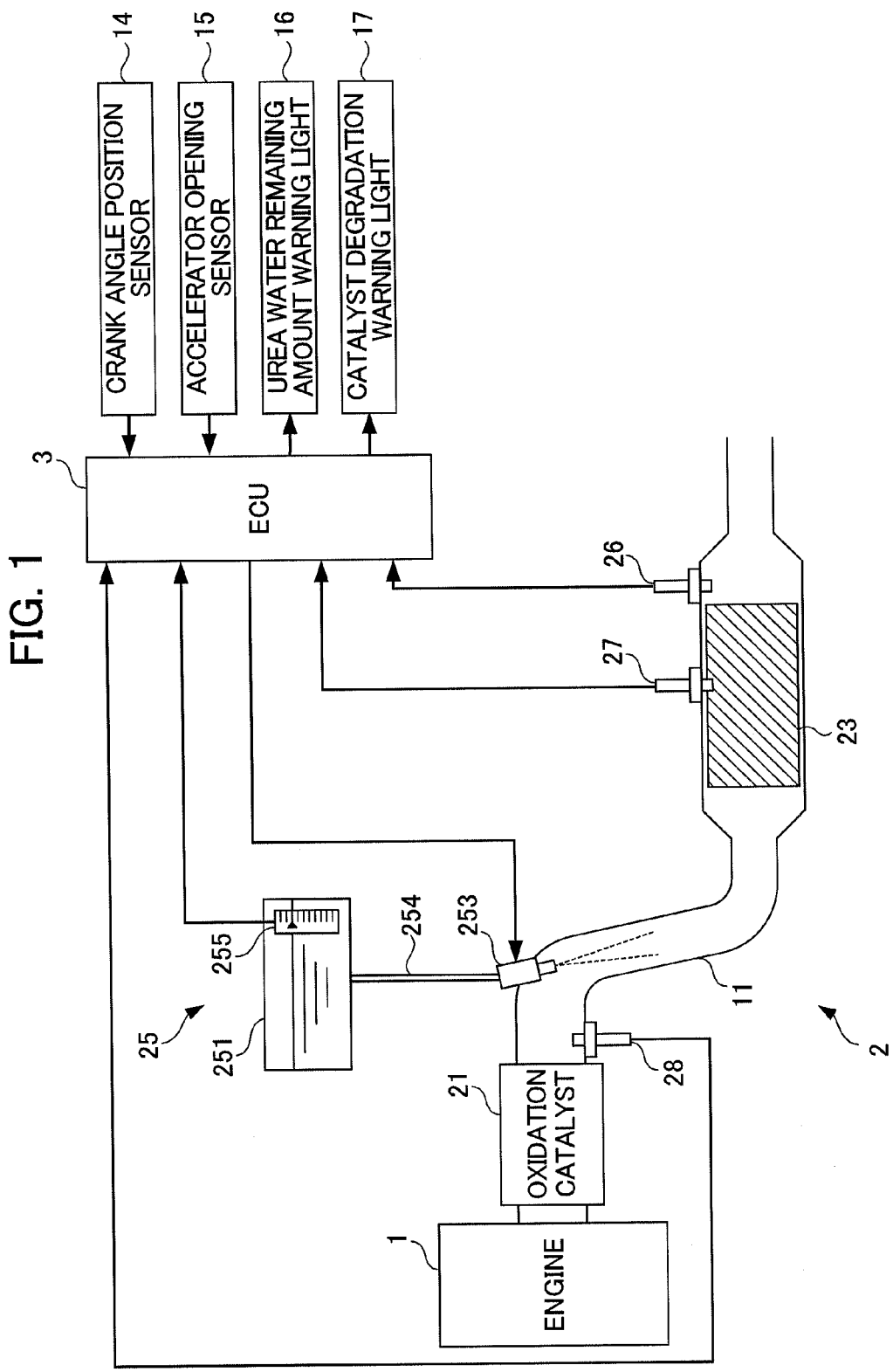
FIG. 1 is a view showing the configurations of an engine and an exhaust purification system thereof according to a first embodiment of the present invention.

FIG. 1 is a view showing the configurations of an internal combustion engine (hereinafter referred to as "engine") 1 and an exhaust purification system 2 thereof according to the present embodiment. The engine 1 is a gasoline engine of lean-burn operation type or a diesel engine, and is equipped to a vehicle that is not illustrated.

The exhaust purification system 2 is configured to include a selective reduction catalyst 23 provided in an exhaust channel 11 of the engine 1 that purifies nitrogen oxides (hereinafter referred to as "NOx") in the exhaust flowing through this exhaust channel 11 under the presence of ammonia, which serves as a reducing agent; a urea-water injection device 25 that supplies urea water serving as a source of the reducing agent into the exhaust channel 11 on an upstream side of the selective reduction catalyst 23; and an electronic control unit (hereinafter referred to as "ECU") 3. In addition to the selective reduction catalyst 23, an oxidation catalyst 21 is provided in the exhaust channel 11.

The urea-water injection device 25 includes a urea water tank 251 and a urea water injector 253. The urea water tank 251 stores urea water, and is connected to the urea water injector 253 via a urea water supply pipe 254 and a urea water pump, which is not illustrated. A urea water level sensor 255 is provided to this urea water tank 251. The urea water level sensor 255 detects the water level of the urea water in the urea water tank 251, and outputs a detection signal substantially proportional to this water level to the ECU 3. The urea water injector 253 is connected to the ECU 3, operates according to a control signal from the ECU 3, and injects urea water into the exhaust plumbing 11 in accordance with this control signal. In other words, urea-water injection control is executed.

The oxidation catalyst 21 is provided in the exhaust channel 11 further upstream than the selective reduction catalyst 23 and the urea water injector 253, and promotes the reduction of NOx in the selective reduction catalyst 23 by converting a part of the NO in the exhaust to $NO_2$.

The selective reduction catalyst (hereinafter referred to as "SCR catalyst" (Selective Catalytic Reduction)) 23 selectively reduces NOx in the exhaust under an atmosphere in which a reducing agent such as $NH_3$ is present. More specifically, when urea water is injected by the urea-water injection device 25, this urea water is thermally decomposed or hydrolyzed by the heat of the exhaust and $NH_3$ is generated. The generated $NH_3$ is supplied to the SCR catalyst 23, and the NOx in the exhaust is selectively reduced by this ammonia.

This SCR catalyst 23 has a function of reducing the NOx in the exhaust by the $NH_3$ generated from urea water, as well as having a function of adsorbing only a predetermined amount of the generated $NH_3$. Hereinafter, the $NH_3$ amount being adsorbed in the SCR catalyst 23 is defined as the $NH_3$ storage amount, and the $NH_3$ amount that can be adsorbed to the SCR catalyst 23, i.e. maximum value of the $NH_3$ amount, is defined as the maximum $NH_3$ storage amount.

In this way, the $NH_3$ stored in the SCR catalyst 23 is consumed as appropriate in the reduction of the NOx in the exhaust. For this reason, the NOx purification rate of the SCR catalyst 23 rises accompanying the $NH_3$ storage amount increasing. On the other hand, when the $NH_3$ storage amount reaches the maximum $NH_3$ storage amount and the SCR catalyst 23 becomes saturated, the NOx purification rate also reaches a maximum value; however, $NH_3$ slip occurs in which $NH_3$ not contributing to the reduction of NOx and has become surplus is discharged to the downstream side of the SCR catalyst 23. In order to suppress the $NH_3$ discharged from the SCR catalyst 23 to the downstream side of the selective reduction catalyst 23 from discharging to outside the system, a slip suppressing catalyst, which adsorbs and oxidizes $NH_3$ and is not illustrated, is provided.

As sensors for detecting the state of the exhaust purification system 2, a downstream-side NOx sensor 26, catalyst temperature sensor 27, upstream-side NOx sensor 28, crank angle position sensor 14 and accelerator opening sensor 15 are connected to the ECU 3.

The downstream-side NOx sensor 26 is provided in the exhaust channel 11 on a downstream side of the SCR catalyst 23, detects the concentration of a component combining NOx and $NH_3$ in the exhaust on a downstream side from the SCR catalyst 23, and supplies a detection signal substantially proportional to the detection value to the ECU 3. The catalyst temperature sensor 27 detects the temperature of the SCR catalyst 23, and supplies a detection signal substantially proportional to the detection value to the ECU 3. The upstream-side NOx sensor 28 is provided in the exhaust channel 11 between the oxidation catalyst 21 and urea water injector 253, detects the concentration of the component combining NOx and $NH_3$ in the exhaust flowing into the SCR catalyst 23, and supplies a detection signal substantially proportional to the detection value to the ECU 3. However, since $NH_3$ is almost not contained in the exhaust at the detection position of the upstream-side NOx sensor 28, the upstream-side NOx sensor 28 detects the concentration of substantially only NOx in the exhaust.

The crank angle position sensor 14 detects the rotation angle of the crank shaft of the engine 1 as well as generating a pulse every 1 degree of crank angle, and supplies a pulse signal thereof to the ECU 3. The revolution speed of the engine 1 is calculated by the ECU 3 based on this pulse signal. The accelerator opening sensor 15 detects a depression amount (hereinafter referred to as "accelerator opening") of the accelerator pedal, which is not illustrated, of the vehicle, and supplies a detection signal substantially proportional to the accelerator opening thus detected to the ECU 3. A demanded torque of the engine 1 is calculated based on the detected accelerator opening and revolution speed by the ECU 3.

In addition, a urea water remaining amount warning light 16 and catalyst degradation warning light 17 for notify various warnings to a driver are connected to the ECU 3. The urea water remaining amount warning light 16, for example, is provided to the instrument panel of the vehicle, and illuminates in response to the remaining amount of urea water in the urea water tank 251 having become less than a predetermined remaining amount (refer to S8 of FIG. 24 described later). The driver is thereby warned that the remaining amount of urea water in the urea water tank 251 has become small.

The catalyst degradation warning light 17, for example, is provided to the instrument panel of the vehicle, and illuminates in response to it having been determined that the SCR catalyst 23 has degraded (refer to S22 of FIG. 25 described later). The driver is thereby warned of being a state in which the SCR catalyst 23 has degraded.

The ECU 3 is provided with an input circuit having functions such as of shaping input signal waveforms from various sensors, correcting the voltage levels to predetermined levels, and converting analog signal values to digital signal values, and a central processing unit (hereinafter referred to as "CPU"). In addition to this, the ECU 3 is provided with a storage circuit that stores various calculation programs executed by the CPU, calculation results, and the like, and an output circuit that outputs control signals to the engine 1, urea water injector 253, and the like.

Next, a sequence of urea-water injection control will be explained.

Figure 2:
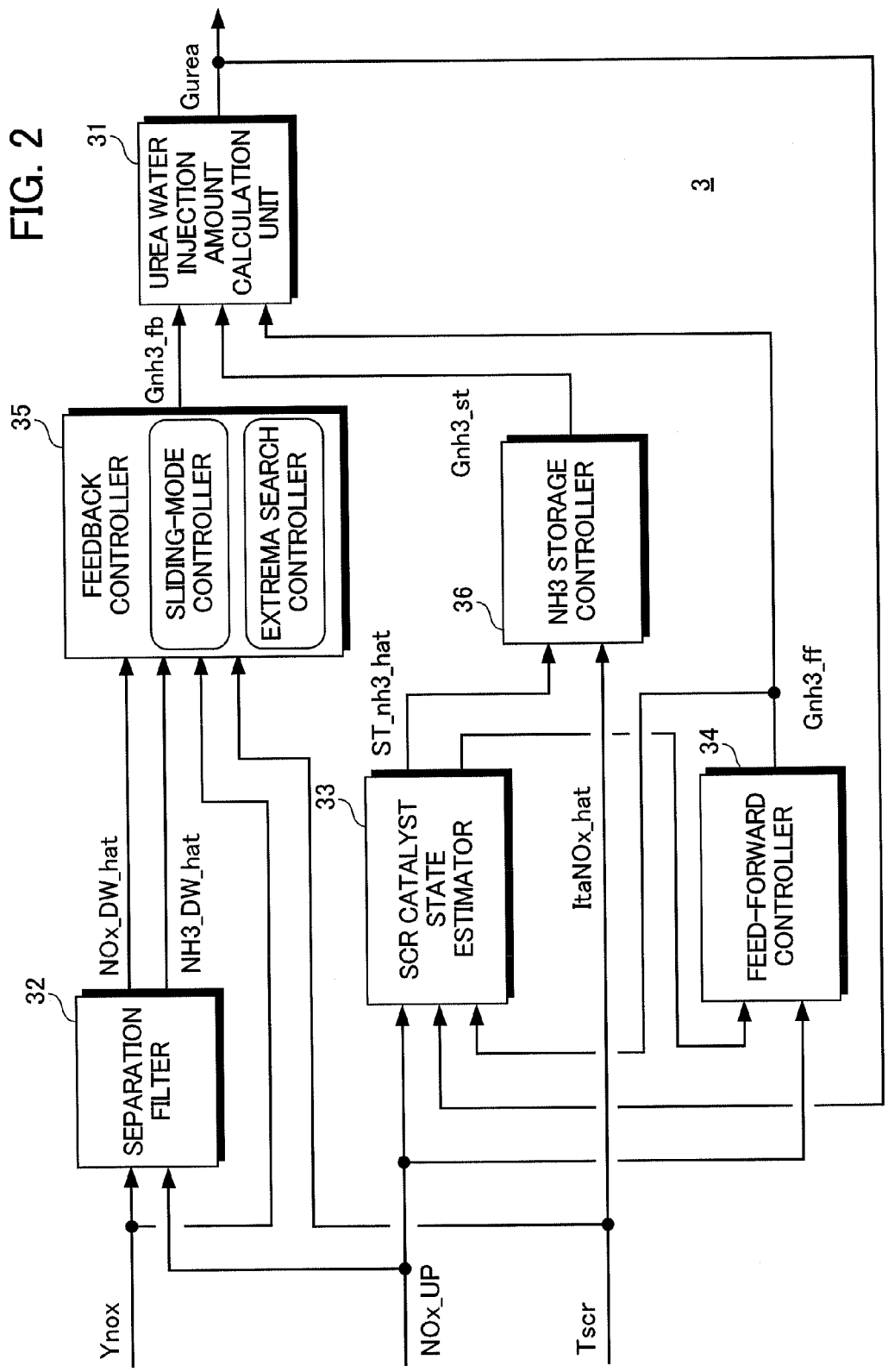
FIG. 2 is a block diagram for executing urea-water injection control of the embodiment.

FIG. 2 is a block diagram related to the execution of urea-water injection control of the ECU 3.

At least three among an output value Ynox of the downstream-side NOx sensor corresponding to a concentration value of the component combining NOx and $NH_3$ in the exhaust on a downstream side from the SCR catalyst, an output value Tscr of the catalyst temperature sensor corresponding to a temperature value of the SCR catalyst, and output value NOx_UP of the upstream-side NOx sensor corresponding to a concentration value of NOx in the exhaust on an upstream side from the SCR catalyst are inputted as observables indicating the state of the exhaust purification system to the ECU 3. The ECU 3 determines a value Gurea of the urea water injection amount corresponding to a control input of the urea-water injection device, based on the above-mentioned at least three observables. It should be noted that, among these observables, the output value NOx_UP of the upstream-side NOx sensor may be substituted by a value estimated from parameters indicating the operating state of the engine, without using a sensor. In addition, the output value Tscr of the catalyst temperature sensor may also be substituted by a value estimated from the operating state of the engine without using a sensor; a value estimated from the output value of a temperature sensor detecting a temperature other than the SCR catalyst; or the like.

The urea-water injection control is realized by combining the functional blocks such as of a urea water injection amount calculation unit 31, separation filter 32, SCR catalyst state estimator 33, feed-forward controller 34, feedback controller 35 and $NH_3$ storage controller 36.

The separation filter 32 separates the NOx sensor output value Ynox corresponding to a concentration value of the component combining NOx and $NH_3$ as mentioned above, into a downstream NOx estimated value NOx_DW_hat corresponding to a concentration value of NOx on a downstream side from the SCR catalyst, and a downstream $NH_3$ estimated value NH3_DW_hat corresponding to a concentration value of $NH_3$ on a downstream side from the SCR catalyst.

The SCR catalyst state estimator 33 calculates the values of a plurality of parameters indicating the state of the SCR catalyst, more specifically, an $NH_3$ storage amount estimated value ST_nh3_hat corresponding to an estimated value of the amount of $NH_3$ adsorbed to the SCR catalyst, and a NOx purification rate estimated value ItaNOx_hat corresponding to an estimated value of the NOx purification rate of the SCR catalyst.

The feed-forward controller 34 calculates, upon taking account of the state of the SCR catalyst, a value Gnh3_ff of a feed-forward input corresponding to an amount of $NH_3$ required in the SCR catalyst in order to purify the NOx in the exhaust flowing into the SCR catalyst.

The $NH_3$ storage controller 36 calculates a value Gnh3_st of a storage correction input corresponding to an amount of $NH_3$ required in the SCR catalyst in order to maintain the $NH_3$ storage amount estimated value ST_nh3_hat at a predetermined target value set in accordance with the state of the SCR catalyst.

The feedback controller 35 calculates a value Gnh3_fb of a feedback input corresponding to an amount of $NH_3$ required in the SCR catalyst in order to cause values such as the output value Ynox of the NOx sensor and the downstream NOx estimated value NOx_DW_hat and downstream $NH_3$ estimated value NH3_DW_hat obtained by separating this to converge to predetermined target values.

The urea water injection amount calculation unit 31 calculates the urea water injection amount Gurea by calculating an amount of $NH_3$ needed to inject to the SCR catalyst based on input values Gnh3_ff, Gnh3_fb and Gnh3_st calculated by the three controllers 34 to 36, and then converting this into an amount of urea water.

Hereinafter, a specific sequence of operations in these respective blocks will be explained in order while referencing the drawings.

Separation Filter

The concept of the operations performed in the separation filter 32 and the specific sequence thereof will be explained.

Figure 3:
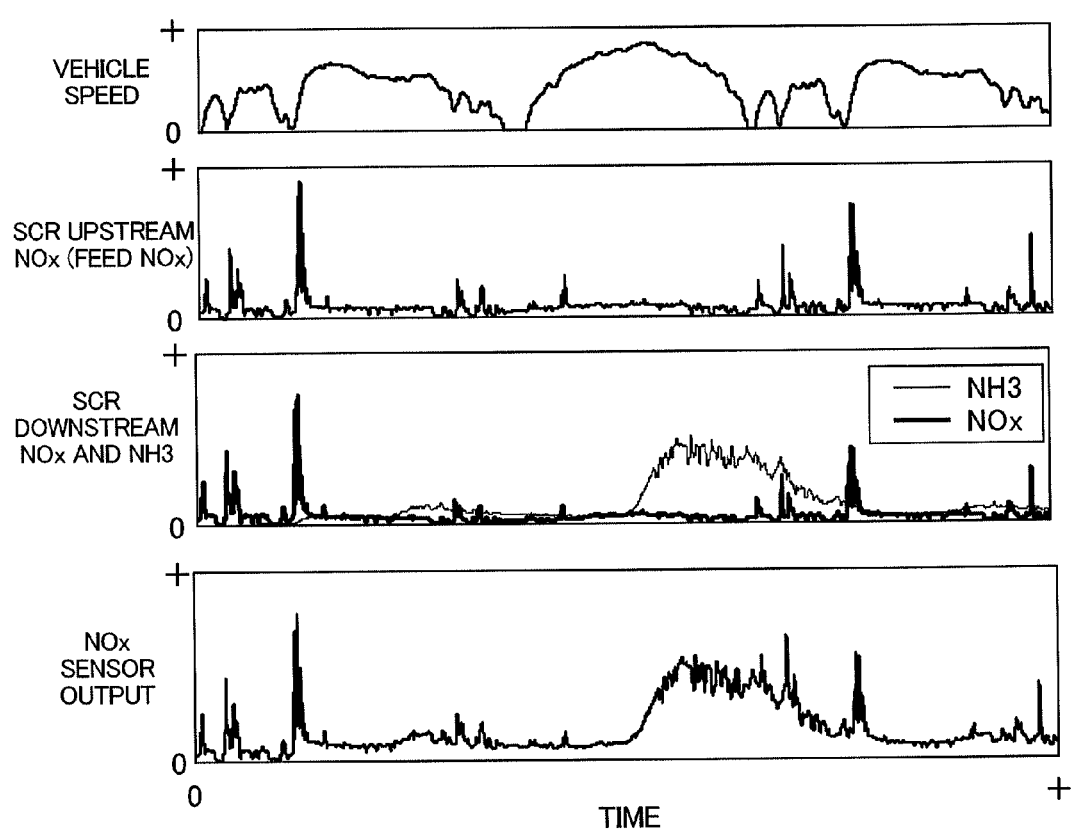
FIG. 3 provides graphs showing the relationship between the vehicle speed, NOx concentration on an upstream side of an SCR catalyst, NOx concentration (bold line) and $NH_3$ concentration (thin line) on a downstream side of the SCR catalyst, and output value of a downstream-side NOx sensor.

FIG. 3 provides graphs showing the relationship between the vehicle speed, NOx concentration on an upstream side of the SCR catalyst, NOx concentration (bold line) and $NH_3$ concentration (thin line) on a downstream side of the SCR catalyst, and output value of the downstream-side NOx sensor. It should be noted that graphs in which the scale of the vertical axis is omitted are shown in FIG. 3. However, the scales of the vertical axes of the two fields from the bottom are several times smaller than the scales of the vertical axes of the two from the top.

As shown in FIG. 3, when the vehicle speed fluctuates, NOx is intermittently discharged from the engine. Most of the NOx discharged from the engine (hereinafter referred to as "feed NOx") is reduced by passing through the SCR catalyst, which is under on the presence of $NH_3$. At this time, the exhaust gas sensor called the NOx sensor senses $NH_3$ in addition to the NOx, which is the detection target, as mentioned above. For this reason, the output value of the NOx sensor becomes a value combining the NOx concentration and $NH_3$ concentration, as is clear from comparing the field indicating the NOx and $NH_3$ concentration on the downstream side of the SCR catalyst and the field indicating the output value of the NOx sensor in FIG. 3.

However, as shown in FIG. 3, the fluctuation behavior of the feed NOx is coupled to the timing at which the vehicle speed sharply rises, i.e. the increase-decrease requests of drive power. In addition, after having passed through the SCR catalyst, this fluctuation behavior of the feed NOx mostly takes over the fluctuation behavior of the output value of the NOx sensor. It should be noted that, since the increase-decrease request for drive power by the driver is at most about 3 Hz, the fluctuation behavior of the feed NOx and the NOx concentration on the downstream side of the SCR catalyst are considered to mostly include frequency components of no more than 3 Hz.

On the other hand, as shown in the two fields from the bottom in FIG. 3, when comparing the fluctuation behaviors between the NOx concentration and $NH_3$ concentration of the exhaust on the downstream side of the SCR catalyst, the fluctuation behavior of $NH_3$ is qualitatively more gradual than the fluctuation behavior of NOx. This means that the spectral distribution of the fluctuation behavior of $NH_3$ on the downstream side of the SCR catalyst has a peak approaching the low frequency side, when compared with the spectral distribution of NOx.

Figure 4:
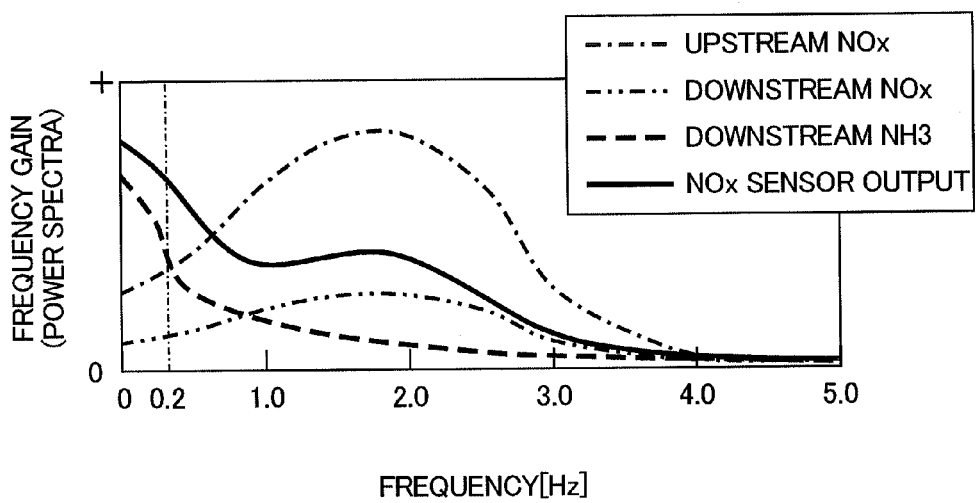
FIG. 4 is a graph showing the spectral distributions of an upstream NOx concentration, downstream NOx concentration, downstream $NH_3$ concentration and output of the downstream-side NOx sensor.

FIG. 4 is a graph showing the spectral distributions of the upstream NOx concentration (one-dot dashed line), downstream NOx concentration (two-dot dashed line), downstream $NH_3$ concentration (dashed line) and output of the downstream-side NOx sensor.

As explained while referencing FIG. 3, the fluctuation behavior of feed NOx becomes coupled to the increase-decrease request of drive power by the driver. For this reason, the spectral distribution of the upstream NOx concentration shows an upward convex characteristic with a 1 to 2 Hz peak generally, despite varying according to driver.

The spectral distribution of the downstream NOx concentration shows an upward convex characteristic with a 1 to 2 Hz peak, generally.

The spectral distribution of the downstream $NH_3$ concentration has a peak near the low frequency side when compared with the upstream NOx concentration or downstream NOx concentration, and thus the stationary component becomes the largest.

The spectral distribution of the NOx sensor output combines the downstream NOx concentration and downstream $NH_3$ concentration.

In addition, when comparing the spectral distributions of the downstream $NH_3$ concentration and downstream NOx concentration, they both clearly differ qualitatively despite having some overlap. On the other hand, the downstream NOx concentration and upstream NOx concentration have a strong correlation with the fluctuation behavior as mentioned above. For this reason, when comparing the spectral distributions of the downstream NOx concentration and upstream NOx concentration, the gain declines for the downstream NOx concentration by the amount reduced by the SCR catalyst, but is substantially the same qualitatively. In other words, the NOx flowing into the SCR catalyst is considered to be reduced by the SCR catalyst in a proportion substantially equal to the overall frequency component.

This means that, if a ratio between the frequency gain of the upstream NOx concentration and the frequency gain of the downstream NOx concentration can be calculated, the value of the downstream $NH_3$ concentration can be extracted (separated) from the output value of the NOx sensor by estimating the value of the downstream NOx concentration from the value of the upstream NOx concentration, and further subtracting the estimated value of the downstream NOx concentration from the output value of the NOx sensor. Hereinafter, the configuration of the separation filter 32 that separates the NOx sensor output value Ynox into the downstream NOx estimated value NOx_DW_hat and the downstream $NH_3$ estimated value NH3_DW_hat based on such a principle will be explained.

Separation Filter of Example 1

Figure 5:
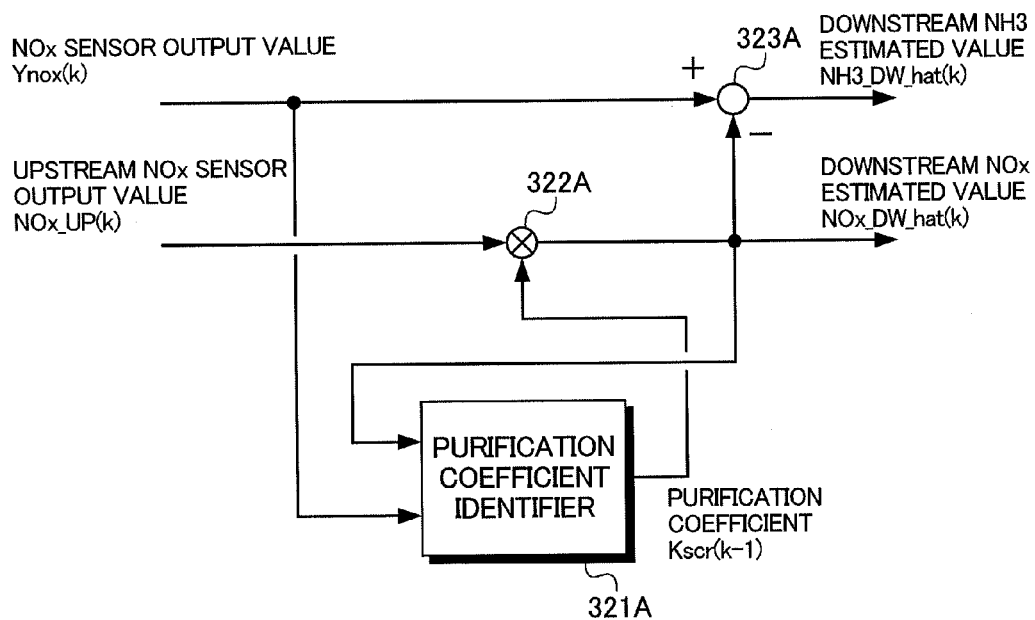
FIG. 5 is a block diagram showing the configuration of a separation filter of Example 1.

FIG. 5 is a block diagram showing the configuration of a separation filter 32A of Example 1.

The separation filter 32A calculates the downstream NOx estimated value NOx_DW_hat and the downstream $NH_3$ estimated value NH3_DW_hat when the NOx sensor output value Ynox and upstream NOx sensor output value NOx_UP are inputted. The separation filter 32A includes a purification coefficient identifier 321A, a multiplier 322A, and adder 323A.

As explained while referencing FIG. 4, since it is considered that the assumption is appropriate in that the NOx flowing into the SCR catalyst is reduced by the SCR catalyst in a proportion substantially equal to the overall frequency component, it is possible to model the downstream NOx estimated value NOx_DW_hat with a value obtained by multiplying the predetermined multiplier coefficient Kscr by the upstream NOx sensor output value NOx_UP, as shown in the below formula (1). Herein, the multiplier coefficient Kscr(k) corresponds to a ratio of the NOx concentration on the upstream side to the NOx concentration on the downstream side, and can be considered a parameter indicating the NOx purification performance of the SCR catalyst, and thus is hereinafter referred to as a purification coefficient. It should be noted that "k" in the below formula (1) is a sample period, and corresponds to a discrete time of the ECU. In addition, "d" corresponds to a dead time until exhaust on the upstream side passes through the SCR catalyst. The multiplier 322A calculates the downstream NOx estimated value NOx_DW_hat(k) by multiplying the purification coefficient Kscr(k−1) for which the value thereof is identified by the purification coefficient identifier 321A described later, by the upstream NOx sensor output value NOx_UP(k−d) for which a dead time d has past.

$$\text{NOx\_DW\_hat}(k) = Kscr(k-1) \cdot \text{NOx\_UP}(k-d) \quad (1)$$

The adder 323A calculates the downstream $NH_3$ estimated value NH3_DW_hat(k) by subtracting the downstream NOx estimated value NOx_DW_hat(k) from the NOx sensor output value Ynox(k), as shown in the below formula (2).

$$\begin{aligned}\text{NH3\_DW\_hat}(k) &= Ynox(k) - \text{NOx\_DW\_hat}(k) \\ &= Ynox(k) - Kscr(k-1) \cdot \text{NOx\_UP}(k-d)\end{aligned} \quad (2)$$

Under the assumption that the spectral distribution of the downstream NOx estimated value NOx_DW_hat calculated according to the above formula (1) substantially matches the spectral distribution of the NOx sensor output value Ynox, the purification coefficient identifier 321A identifies the value of the purification coefficient Kscr(k) so that the square of the error eid' (refer to the below formula (3-1)) of the both becomes a minimum. The so-called recursive least-squares method algorithm shown by the below formulas (3-2) to (3-4) is suited as an algorithm identifying this value of the purification coefficient Kscr(k), for example.

$$e'_{id}(k) = Ynox(k) - \text{NOx\_DW\_hat}(k) \quad (3\text{-}1)$$

$$Kscr(k) = Kscr(k-1) + K'_p(k) \cdot e'_{id}(k) \quad (3\text{-}2)$$

$$K'_p(k) = \frac{P'(k) \cdot \text{NOx\_UP}(k-d)}{1 + P'(k) \cdot \text{NOx\_UP}(k-d)^2} \quad (3\text{-}3)$$

$$P'(k+1) = \frac{1}{\lambda_1}\left(1 - \frac{\lambda_2 \cdot P'(k) \cdot \text{NOx\_UP}(k-d)^2}{\lambda_1 + \lambda_2 P'(k)\text{NOx\_UP}(k-d)^2}\right)P'(k) \quad (3\text{-}4)$$

In the above formulas (3-2) to (3-4), "P" is an adaptive gain, and the initial value "P'(0)" thereof is set to a positive value. In addition, $\lambda_1$ and $\lambda_2$ are weighting parameters, and the identification algorithms are classified into three algorithms indicated below, according to the setting of these parameters.

$\lambda_1 = 1, \lambda_2 = 1$

Figure 6:
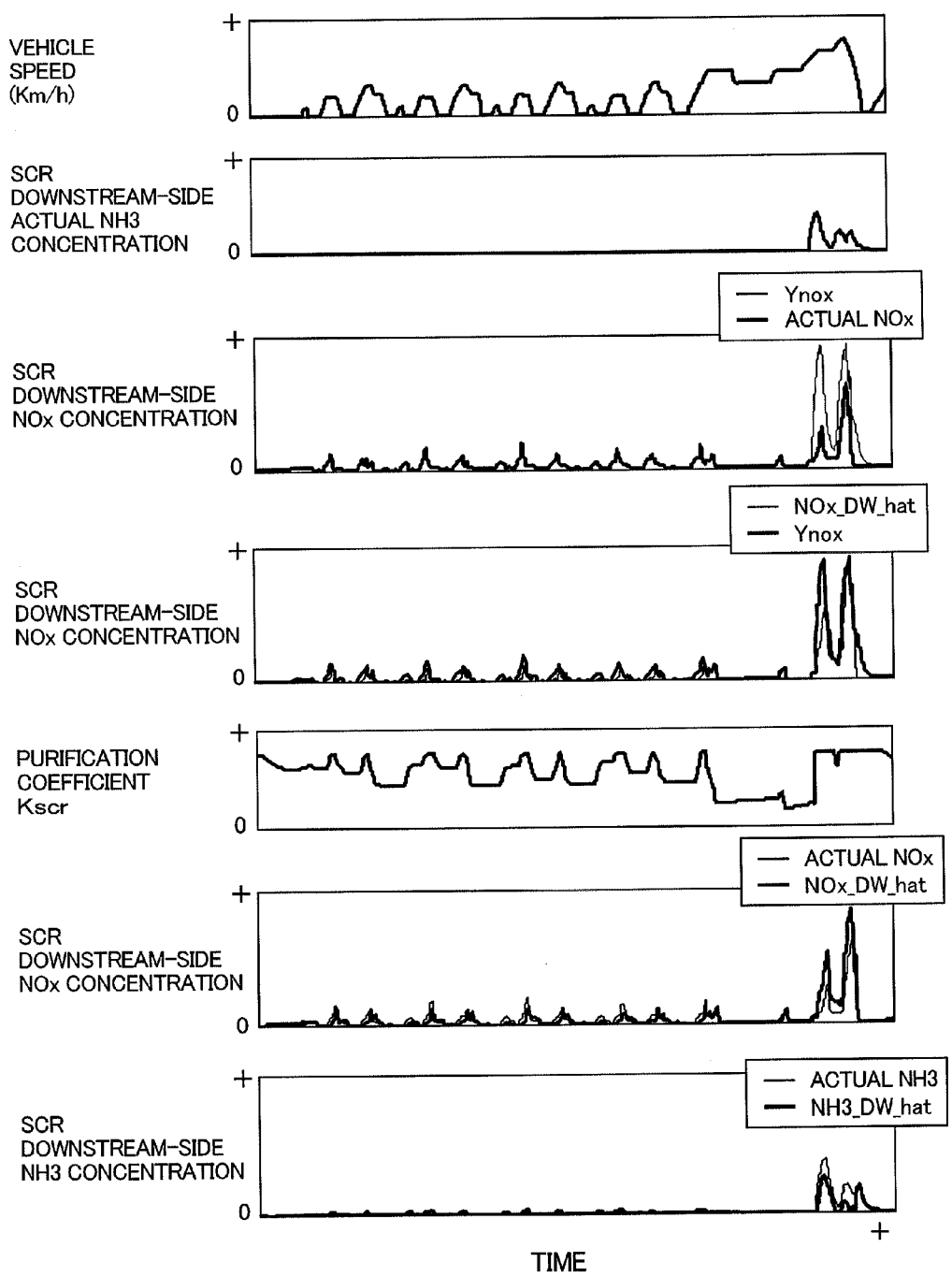
FIG. 6 provides graphs showing the simulation results of the separation filter of Example 1.

Least-Squares Method Algorithm $\lambda_1 = \lambda (0 < \lambda \leq 1), \lambda_2 = 1$ Weighted Least-Squares Method Algorithm $\lambda_1 = 1, \lambda_2 = 0$ Fixed Gain Algorithm FIG. 6 provides graphs showing the simulation results of the separation filter of Example 1.

In sequence from the top, FIG. 6 shows the vehicle speed, actual $NH_3$ concentration on the downstream side of the SCR catalyst, NOx concentration on the downstream side (comparing NOx sensor output and actual NOx concentration), NOx concentration on the downstream side (comparing NOx sensor output and downstream NOx estimated value NOx_DW_hat), purification coefficient Kscr, NOx concentration on the downstream side (comparing actual NOx concentration and downstream NOx estimated value NOx_DW_hat), and $NH_3$ concentration on the downstream side (comparing actual $NH_3$ concentration and downstream $NH_3$ estimated value NH3_DW_hat).

As shown in FIG. 6, when $NH_3$ slip occurs, a great difference arises between the NOx sensor output value Ynox and the actual NOx concentration; whereas, the actual NOx concentration and the downstream-side NOx estimated value NOx_DW_hat mostly match, and further, the actual $NH_3$ concentration and the downstream-side $NH_3$ estimated value NH3_DW_hat also mostly coincide, and thus the separation filter is considered able to appropriately extract the estimated value NOx_DW_hat and estimated value NH3_DW_hat from the NOx sensor output Ynox. Although the respective estimation accuracies are not considered high, they certainly have effectiveness, and thus can withstand practical use. Next, the separation filter of Example 2 in which this estimation accuracy is further improved will be explained.

Separation Filter of Example 2

Next, the separation filter of Example 2 will be explained.

Figure 7:
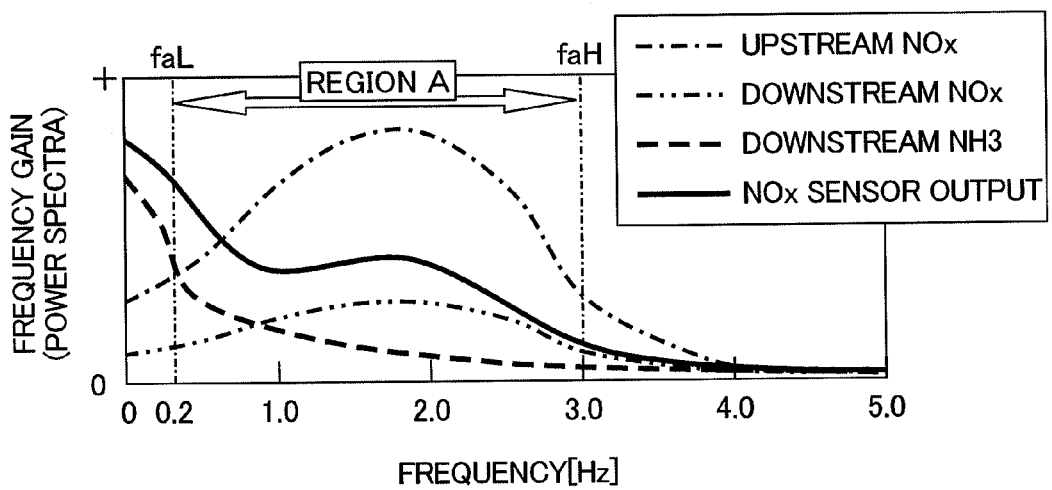
FIG. 7 is a graph showing the spectral distribution of the upstream NOx concentration, downstream NOx concentration, downstream $NH_3$ concentration, and output of the downstream-side NOx sensor.

As shown in "Region A" in FIG. 7, with the separation filter of Example 2, within the frequency band in which the frequency component of $NH_3$ is small and the frequency component of NOx is large, i.e. only within the frequency band corresponding to the increase-decrease request of drive power by the driver, the output of the NOx sensor is actively extracted, and then the value of the purification coefficient Kscr is identified.

First, an explanation will be provided based on the principle of the operations in the separation filter of Example 2.

The time-series behavior of the upstream NOx sensor output value NOx_UP and downstream NOx estimated value NOx_DW_hat can be represented by a function expanded into a Fourier series, as shown in the below formulas (4-1) and (4-2), respectively.

$$\begin{aligned}\text{NOx\_UP}(k) &= C_{up} + \sum_{i=1}^{N/2} A_{up\_i} \cdot \sin(2\pi \Delta f i k \Delta T) + B_{up\_i} \cdot \\ &\quad \cos(2\pi \Delta f i k \Delta T) \\ &\equiv C_{up} + \sum_{i=1}^{N/2} \text{NOx\_UP\_i}(k)\end{aligned} \quad (4\text{-}1)$$

$$\text{NOx\_DW\_hat}(k) = C_{dw} + A\sum_{i=1}^{N/2} A_{dw\_i} \cdot \sin(2\pi \Delta fik\Delta T) + \quad (4\text{-}2)$$
$$B_{dw\_i} \cdot \cos(2\pi \Delta fik\Delta T)$$
$$\equiv C_{dw} + \sum_{i=1}^{N/2} \text{NOx\_DW\_hat\_i}(k)$$

Herein, "NOx_UP_i" in the above formula (4-1) is an $i^{th}$ frequency component of the upstream NOx sensor output, "$A_{up\_1}$" and "$B_{up\_1}$" are amplitudes of the $i^{th}$ frequency component, "$C_{up}$" is an offset constant of the upstream NOx sensor output, "f_i" is the frequency of the $i^{th}$ frequency component, "N" is a sample number, "$\Delta f$" and "$\Delta T$" are the sample frequency and sample time, respectively, and have the relationship of "$\Delta f = 1/\Delta T$".

In addition, "NOx_DW_hat_i" in the above formula (4-2) is the $i^{th}$ frequency component of the downstream NOx estimated value, "$A_{dw\_i}$" and "$B_{dw\_i}$" are amplitudes of the $i^{th}$ frequency component, and "$C_{dw}$" is an offset constant of the downstream NOx estimated value.

Figure 8:
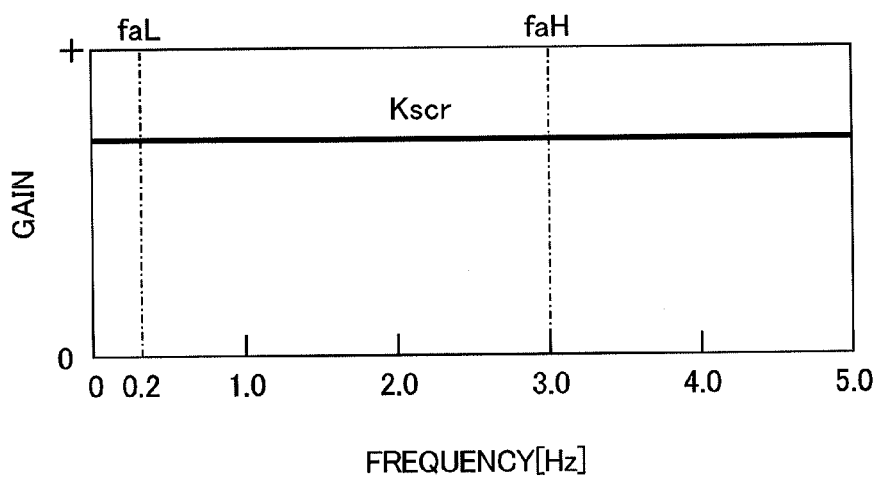
FIG. 8 is a graph showing the gain characteristic of a purification coefficient Kscr.

As explained while referencing FIG. 4, it is considered that the assumption is appropriate in that the NOx flowing into the SCR catalyst is reduced by the SCR catalyst in a proportion substantially equal to the overall frequency component. This means that, as shown in FIG. 8, according to the purification coefficient Kscr having a gain characteristic (steady gain characteristic) equal to the input of the overall frequency, the same relational expression as the above formula (1) is realized for the upstream NOx sensor output value NOx_UP and downstream NOx estimated value NOx_DW_hat expanded into a Fourier series. Accordingly, the below formula (5) is derived.

$$C_{dw} + \sum_{i=1}^{N/2} \text{NOx\_DW\_i}(k) = Kscr \left\{ C_{up} + \sum_{i=1}^{N/2} \text{NOx\_UP\_i}(k-d) \right\} = \quad (5)$$
$$Kscr \cdot C_{up} + Kscr \sum_{i=1}^{N/2} \text{NOx\_UP\_i}(k-d) =$$
$$Kscr \cdot C_{up} + \sum_{i=1}^{N/2} Kscr \cdot \text{NOx\_UP\_i}(k-d)$$

In addition, the below formula (6) is derived from the above formula (5). In other words, the same relational expression as the above formula (1) is realized using the purification coefficient Kscr for the respective Fourier components of both sides.

$$\text{NOx\_DW\_hat\_i}(k) = Kscr \cdot \text{NOx\_UP\_i}(k-d), i=1 \ldots N/2 \quad (6)$$

Therefore, as shown in the below formulas (7-1) to (7-2), the relationship of formula (1) is realized even for the sum of the frequency components with Region A specified by the upper limit frequency faH and lower limit frequency faL in FIG. 7. It should be noted that $iaL = faL/\Delta f$ and $iaH = faH/\Delta f$ are defined in the below formulas (7-1) and (7-2).

$$\sum_{i=iaL}^{iaL} \text{NOx\_DW\_hat\_i}(k) = \text{NOx\_DW\_hat\_a}(k) \quad (7\text{-}1)$$

$$Kscr \cdot \sum_{i=iaL}^{iaH} \text{NOx\_UP\_i}(k-d) = Kscr \cdot \text{NOx\_UP\_a}(k-d) \quad (7\text{-}2)$$

$$\text{NOx\_DW\_hat\_a}(k) = Kscr \cdot \text{NOx\_UP\_a}(k-d) \quad (7\text{-}3)$$

Figure 9:
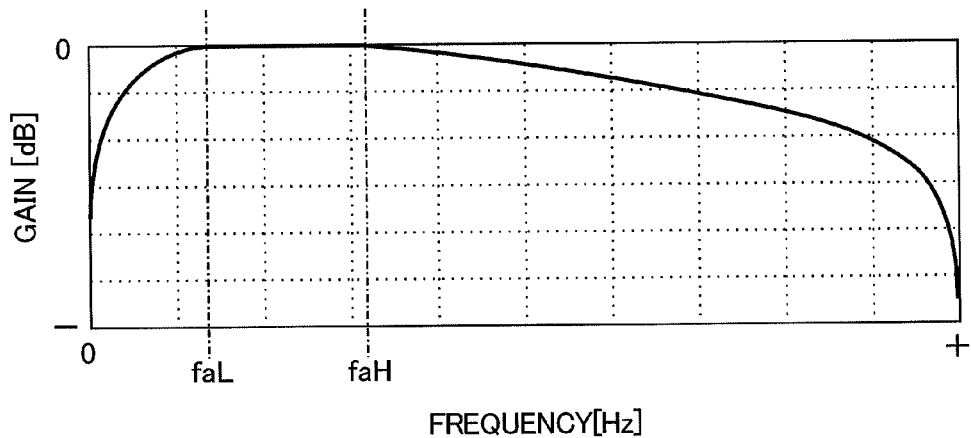
FIG. 9 is a graph showing the gain characteristic of a band-pass filter.

Thereamong, the above formula (7-3) extracts the frequency components NOx_DW_hat_a and NOx_UP_a in the region A from the downstream NOx estimated value NOx_DW_hat and upstream NOx sensor output value NOx_UP by way of a band-pass filter with the Region A as shown in FIG. 9 as a pass band, and means that the value of the purification coefficient Kscr identified using these matches the value identified using the values NOx_DW_hat and NOx_UP not passing through the filter.

As mentioned above, in the NOx sensor output value Ynox, the frequency component due to $NH_3$ slip is contained largely on the low frequency side, and this is a cause of decreasing the estimation accuracy of Example 1. In contrast, the above formula (7-3) suggests that the estimation accuracy can be improved by blocking from the NOx sensor output value Ynox the spectra on such a low frequency side. Hereinafter, the specific configuration of a separation filter 32B of Example 2 that accurately separates the NOx sensor output value Ynox into the downstream NOx estimated value NOx_DW_hat and the downstream $NH_3$ estimated value NH3_DW_hat based on such a principle will be explained.

Figure 10:
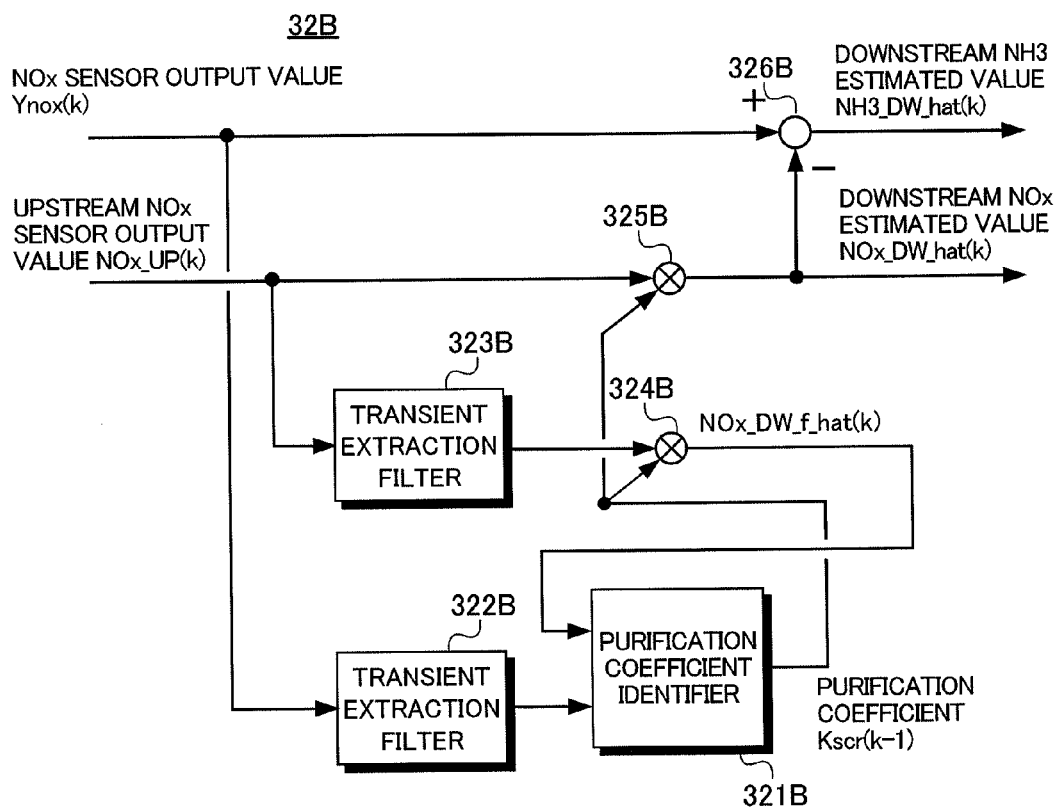
FIG. 10 is a block diagram showing the configuration of a separation filter of Example 2.

FIG. 10 is a block diagram showing the configuration of the separation filter 32B of Example 2.

The separation filter 32B includes a purification coefficient identifier 321B, transient extraction filter 322B for the downstream NOx sensor output value, transient extraction filter 323B for the upstream NOx sensor output value, multipliers 324B and 325B, and adder 326.

The multiplier 325B multiplies the purification coefficient Kscr identified by the purification coefficient identifier 321B by the upstream NOx sensor output value NOx_UP to calculate the downstream NOx estimated value NOx_DW_hat (refer to below formula (8-1)). In addition, the adder 326B calculates the downstream $NH_3$ estimated value NH3_DW_hat by subtracting the downstream NOx estimated value NOx_DW_hat from the NOx sensor output value Ynox (refer to below formula (8-2)).

$$\text{NOx\_DW\_hat}(k) = Kscr(k-1)\text{NOx\_UP}(k-d) \quad (8\text{-}1)$$

$$\text{NH3\_DW\_hat}(k) = Ynox(k) - \text{NOx\_DW\_hat}(k) \quad (8\text{-}2)$$

The transient extraction filter 322B calculates a filter value Ynox_f of the NOx sensor output value Ynox by performing an operation as shown in the below formula (9). Herein, the filter coefficients a1 to a4 and b1 to b5 in the below formula (9) are set to values such that the Region A in FIG. 7 is obtained, i.e. a band-pass filter characteristic in which the frequency faL for which the spectrum of $NH_3$ in the output of the NOx sensor is considered to sufficiently decline is set as the lower cut-off frequency, and the frequency faH for which the spectrum of NOx in the output of the NOx sensor is considered to sufficiently decline is set as the upper cut-off frequency.

$$\text{Ynox\_f}(k) = \quad (9)$$
$$a1 \cdot \text{Ynox\_f}(k-1) + a2 \cdot \text{Ynox\_f}(k-2) + a3 \cdot \text{Ynox\_f}(k-3) +$$

$$a4 \cdot Ynox\_f(k-4) + b1 \cdot Ynox(k) + b2 \cdot Ynox(k-1) +$$
$$b3 \cdot Ynox(k-2) + b4 \cdot Ynox(k-3) + b5 \cdot Ynox(k-4)$$

The transient extraction filter 323B calculates the filter value NOx_UP_f of the upstream NOx sensor output value NOx_UP by performing operations as shown in the below formula (10).

The filter coefficient of this transient extraction filter 323B preferably uses the same value as in the above-mentioned transient extraction filter 323B.

$$NOx\_UP\_f(k) = a1 \cdot NOx\_UP\_f(k-1) + \qquad (10)$$
$$a2 \cdot NOx\_UP\_f(k-2) + a3 \cdot NOx\_UP\_f(k-3) +$$
$$a4 \cdot NOx\_UP\_f(k-4) + b1 \cdot NOx\_UP(k) + b2 \cdot NOx\_UP(k-1) +$$
$$b3NOx\_UP(k-2) + b4NOx\_UP(k-3) + b5NOx\_UP(k-4)$$

It should be noted that the above-mentioned transient extraction filters 322B and 323B may be high-pass filters not limited to band-pass filters, so long as blocking a stationary component and allowing a frequency band corresponding to the increase-decrease request of drive power by the driver to pass.

The multiplier 324B calculates a value NOx_DW_f_hat corresponding to the filter value of the downstream NOx estimated value NOx_DW_hat, by multiplying the purification coefficient Kscr identified by the purification coefficient identifier 321B by the filter value NOx_UP_f of the upstream NOx sensor output value, as shown in the below formula (11).

$$NOx\_DW\_f\_hat(k) = Kscr(k-1) \cdot NOx\_UP\_f(k-d) \qquad (11)$$

The purification coefficient identifier 321B identifies the value of the purification coefficient Kscr(k) so that the square of the error eid between the filter value NOx_UP_f of the NOx sensor output value and the value NOx_DW_f_hat corresponding to the filter value of the downstream NOx estimated value (refer to below formula (12-1)) becomes a minimum. The recursive least-squares method algorithm shown by the below formulas (12-2) to (12-4) is used as an algorithm identifying this value of the purification coefficient Kscr(k), for example, similarly to the above Example 1.

$$eid(k) = Ynox\_f(k) - NOx\_DW\_f\_hat(k) \qquad (12\text{-}1)$$
$$Kscr(k) = Kscr(k-1) + K_p(k) \cdot e_{id}(k) \qquad (12\text{-}4)$$
$$K_p(k) = \frac{P(k) \cdot NOx\_UP\_f(k-d)}{1 + P(k) \cdot NOx\_UP\_f(k-d)^2} \qquad (12\text{-}3)$$
$$P(k+1) = \frac{1}{\lambda_1}\left(1 - \frac{\lambda_2 P(k) \cdot NOx\_UP\_f(k-d)^2}{\lambda_1 + \lambda_2 P(k) \cdot NOx\_UP\_f(k-d)^2}\right)P(k) \qquad (12\text{-}4)$$

Figure 11:
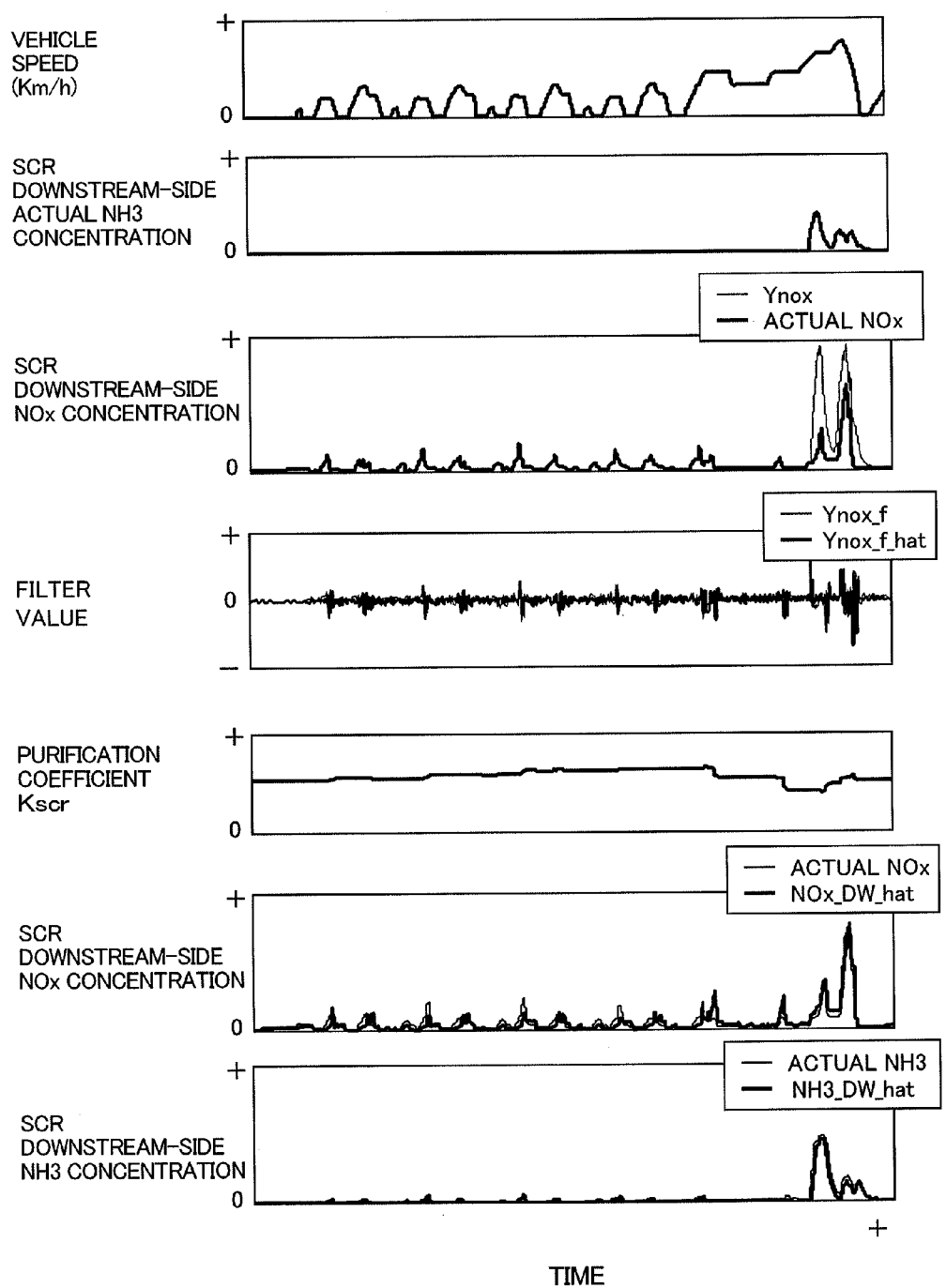
FIG. 11 provides graphs showing the simulation results of the separation filter of Example 2.

FIG. 11 provides graphs showing the simulation results of the separation filter of Example 2.

In sequence from the top, FIG. 11 shows the vehicle speed, actual NH₃ concentration on the downstream side of the SCR catalyst, NOx concentration on the downstream side (comparing NOx sensor output and actual NOx concentration), filter value (comparing filter value Ynox_f of the NOx sensor output value and value NOx_DW_f_hat corresponding to the filter value of the downstream NOx estimated value), purification coefficient Kscr, NOx concentration on the downstream side (comparing actual NOx concentration and downstream NOx estimated value NOx_DW_hat), and NH₃ concentration on the downstream side (comparing actual NH₃ concentration and downstream NH₃ estimated value NH3_DW_hat).

By combining with the transient extraction filter, the separation filter of Example 2 is successful in suppressing the influence of NH₃ slip on the output value Ynox of the NOx sensor to stabilize the identification behavior of the purification coefficient Kscr. In addition, as is evident by comparing with FIG. 6, the downstream NOx estimated value NOx_DW_hat and the actual NOx concentration substantially match, and the downstream NH₃ estimated value NH3_DW_hat and actual NH₃ concentration also substantially match, and thus it is successful in calculating the estimated values NOx_DW_hat and NH3_DW_hat with high accuracy.

Herein, the usefulness of the separation filter of Example 1 will be considered in detail.

First, with the separation filter of Example 2, by using a transient extraction filter, the filter value Ynox_f blocking the influence from NH₃ slip is calculated from the NOx sensor output value Ynox, and then the value of the purification coefficient Kscr is identified using this filter value. In this way, it is clear that the separation filter of Example 2 includes a process to actively eliminate the influence of NH₃ from the output value of the NOx sensor. In contrast, despite including a process to actively eliminate the influence of NH₃ from the output value of the NOx sensor not being clear with the separation filter of Example 1, it is a filter exerting adequate effects, as explained while referencing FIG. 6. This is considered to be for the following such reasons.

Figure 12:
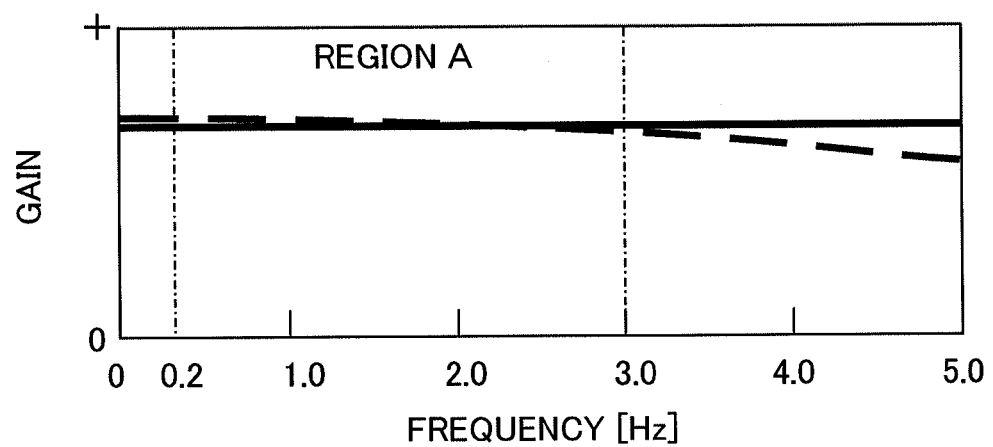
FIG. 12 is a graph showing the gain characteristic of the purification coefficient Kscr.

FIG. 12 is a graph showing the gain characteristic of the purification coefficient Kscr.

As explained while referencing the above formulas (1) and (5), considering the assumption that the NOx flowing into the SCR catalyst is reduced by the SCR catalyst in a proportion substantially equal to the overall frequency component is valid, then the purification coefficient Kscr was treated as having a gain characteristic equal to the input of all of the frequencies, as shown by the solid line in FIG. 12. However, with an actual SCR catalyst, the purification rate for the input on the high frequency side lowers according to the characteristics of gas flow, lag characteristics by chemical reaction, etc. In other words, the SCR catalyst being the control target has a low-pass characteristic for an input, which means that the actual purification coefficient Kscr has a gain characteristic declining at the high frequency side as shown by the dashed line in FIG. 12.

On the other hand, a typical transfer function G(z) of a control target is represented as in the below formula (13), using polynomial transfer functions A(z) and B(z). Herein, "z" is a Z transformation operator.

$$G(z) = \frac{B(z)}{A(z)} \qquad (13)$$

In the algorithm identifying the model parameter of the control target so that error of a certain output value and an estimated value thereof for the control target represented by such a transfer function is minimized, a weighting characteristic W as represented by the following formula (14) is generally included. Herein, "N" is an input/output data number used in identification.

$$W(e^{jwm}) = |A(e^{jwm})|^2, \quad e^{jwm} = \frac{2\pi m}{N} \quad (14)$$

Figure 13:
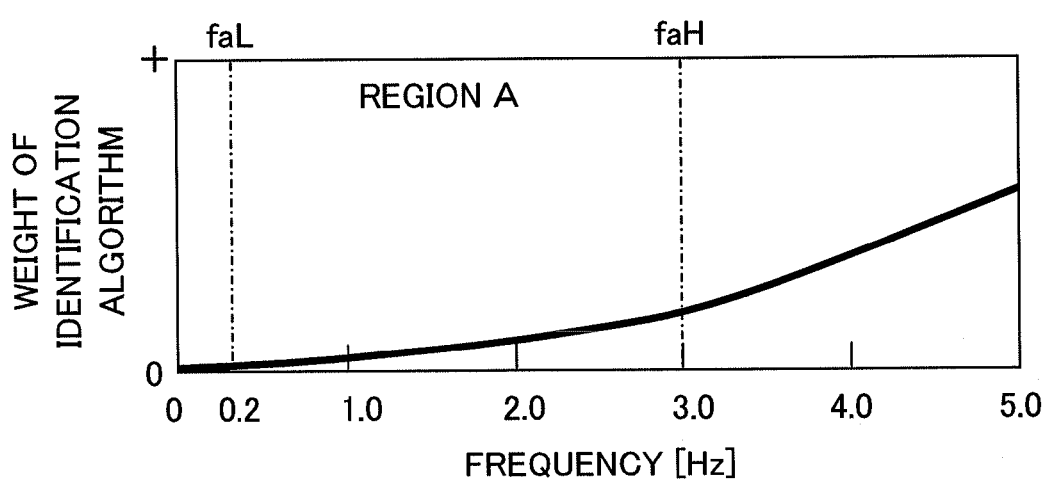
FIG. 13 is a graph showing an identification algorithm weighting characteristic in a case of a control target having a low-pass characteristic.

This, i.e. a case of the control target having a low-pass characteristic, means that the weighting characteristic W of the identification algorithm comes to be a high-pass characteristic. In other words, as the frequency of the identification error inputted to this identification algorithm becomes higher, the influence imparted on the model parameter thereof increases, and conversely, as the frequency of the identification error becomes lower, the influence imparted on the model parameter thereof decreases (refer to FIG. 13).

When this is applied to the purification coefficient identifier 321A of Example 1, it corresponds to identifying the value of the purification coefficient Kscr by placing a weight on the high frequency side, which has almost no frequency component of $NH_3$ in the NOx sensor output, upon minimizing the identification error eid' according to the algorithm shown in formulas (3-1) to (3-4), i.e. upon minimizing the error between the NOx sensor output value Ynox corresponding to the solid line in FIG. 7 and the downstream NOx estimated value NOx_DW_hat corresponding to the two-dot dashed line, with the purification coefficient identifier 321A. In other words, the purification coefficient identifier 321A uses the fact that there is a low-pass characteristic in the control target, and identifies the value of the purification coefficient Kscr by placing more weight on the high frequency side than the low frequency side which mostly contains the frequency component of $NH_3$ in the NOx sensor output value Ynox; therefore, it is considered an identifier for which an adequate separation effect is obtained as explained while referencing FIG. 6.

SCR Catalyst State Estimator

Referring back to FIG. 2, the specific sequence of operations performed by the SCR state estimator 33 will be explained.

The SCR state estimator 33 calculates the $NH_3$ storage amount estimated value ST_nh3_hat and NOx purification rate estimated value ItaNOx_hat of the SCR catalyst according to the sequence shown below.

The estimator 33 first calculates the effective $NH_3$ amount Gnh3_scr(k), by adding the present $NH_3$ injection amount Gnh3(k) to a previous $NH_3$ storage amount estimated value ST_nh3(k−1), and further subtracting a previous $NH_3$ consumed amount Gnh3_cns(k−1), as shown in the below formula (15). This effective $NH_3$ amount Gnh3_scr corresponds to the amount of $NH_3$ that can contribute to the reduction of NOx in the SCR catalyst.

$$Gnh3\_scr(k) = ST\_nh3(k-1) - Gnh3\_cns(k-1) + Gnh3(k) \quad (15)$$

In addition, herein, for the $NH_3$ consumed amount Cnh3_cns(k), a feed-forward input value Gnh3_ff or effective $NH_3$ amount Gnh3_scr is used by the below formula (16). More specifically, in a case of the effective $NH_3$ amount Gnh3_scr being at least the feed-forward input value Gnh3_ff, it means that the required amount of $NH_3$ in order to purify NOx in the SCR catalyst is adsorbed; therefore, the feed-forward input value Gnh3_ff corresponds to the $NH_3$ consumed amount Gnh3_cns. In addition, in the case of the effective $NH_3$ amount Gnh3_scr being smaller than the feed-forward input value Gnh3_ff, it means that the required amount of $NH_3$ in order to purify NOx in the SCR catalyst is not adsorbed; therefore, the effective $NH_3$ amount Gnh3_scr corresponds to the $NH_3$ consumed amount Gnh3_cns.

$$Gnh3\_cns(k) = \begin{cases} Gnh3\_ff(k) & (Gnh3\_scr(k) \geq Gnh3\_ff(k)) \\ Gnh3\_scr(k) & (Gnh3\_scr(k) < Gnh3\_ff(k)) \end{cases} \quad (16)$$

Figure 14:
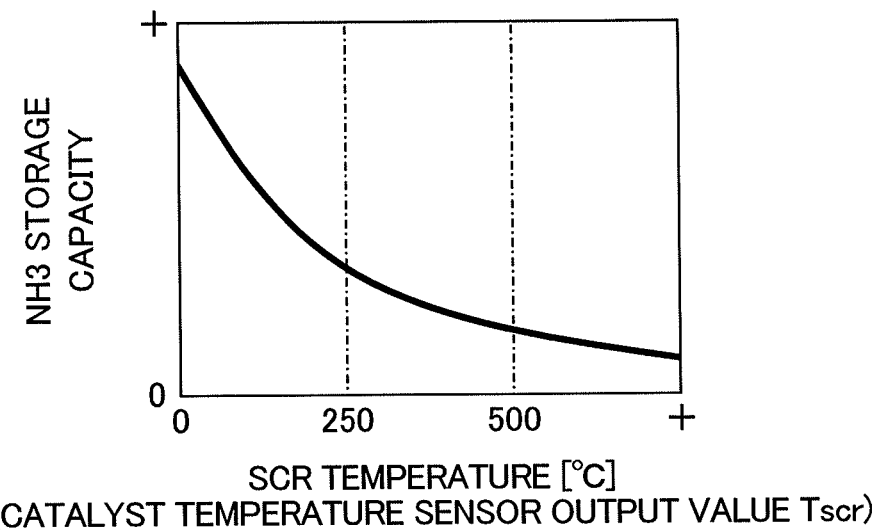
FIG. 14 is a graph showing an example of a map for calculating an estimated value of a maximum $NH_3$ storage capacity with the catalyst temperature as the argument.

Next, the estimator 33 calculates the estimated value ST_nh3_cap(k) of the maximum storage capacity corresponding to the maximum value of the $NH_3$ amount that can be adsorbed by the SCR catalyst, i.e. maximum value of the $NH_3$ storage amount. This maximum storage capacity estimated value ST_nh3_cap can be calculated by searching a map as shown in FIG. 14, for example, with the output value Tscr of the catalyst temperature sensor as the argument, for example. As shown in FIG. 14, the maximum storage capacity of a common SCR catalyst declines accompanying the catalyst temperature rising.

Next, the estimator 33 calculates the $NH_3$ storage amount estimated value ST_nh3(k) by comparing sizes of the calculated effective $NH_3$ amount Gnh3_scr(k) and the maximum storage capacity estimated value ST_nh3_cap(k). More specifically, in a case of Gnh3_scr(k) being at least ST_nh3_cap(k), ST_nh3(k)=ST_nh3_cap(k) is established, in a case of Gnh3_scr(k) being at least 0 and less than ST_nh3_cap(k), ST_nh3(k)=Gnh3_scr(k) is established, and in a case of Gnh3_scr(k) being less than 0, St_nh3(k)=0 is established (refer to below formula (17)). In other words, the upper limit value of the $NH_3$ storage amount estimated value ST_nh3(k) is ST_nh3_cap(k), and the lower limit value becomes 0.

$$ST\_nh3(k) = \begin{cases} ST\_nh3\_cap(k) & (Gnh3\_scr(k) \geq ST\_nh3\_cap(k)) \\ Gnh3\_scr(k) & (0 \leq Gnh3\_scr(k) < ST\_nh3\_cap(k)) \\ 0 & (Gnh3\_scr(k) < 0) \end{cases} \quad (17)$$

The estimator 33 calculates the $NH_3$ storage rate R_nh3_st(k) in the SCR catalyst according to the below formulas (18-1) and (18-2), based on the calculated effective $NH_3$ amount Gnh3_scr and maximum $NH_3$ storage amount ST_nh3_cap. This $NH_3$ storage rate R_nh3_st corresponds to a proportion of the effective $NH_3$ amount to the maximum $NH_3$ storage capacity, as shown in the below formula (18-1), and is a value between 0 and 1.

$$R\_nh3\_st\_temp(k) = \frac{Gnh3\_scr(k)}{ST\_nh3\_cap(k)} \quad (18\text{-}1)$$

$$R\_nh3\_st(k) = \begin{cases} 1 & (1 < R\_nh3\_st\_temp(k)) \\ R\_nh3\_st\_temp(k) & (0 \leq R\_nh3\_st\_temp(k) \leq 1) \end{cases} \quad (18\text{-}2)$$

Figure 15:
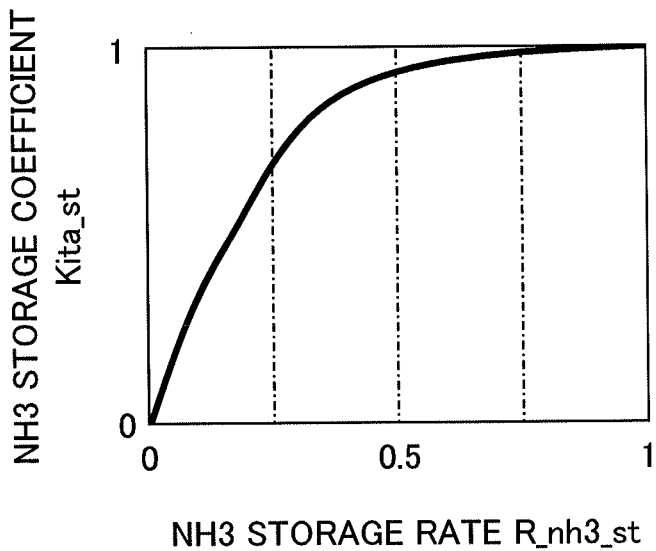
FIG. 15 is a graph showing an example of a map for calculating an $NH_3$ storage coefficient with the $NH_3$ storage rate as the argument.

Next, the estimator 33 calculates a $NH_3$ storage coefficient Kita_st(k) serving as one of the indices indicating the level of the NOx purification performance of the SCR catalyst, by searching a map as shown in FIG. 15, for example, with the calculated $NH_3$ storage rate R_nh3_st(k) as the argument. As shown in FIG. 15, as the $NH_3$ storage rate becomes large, the $NH_3$ storage coefficient also increases, and thus the NOx purification performance of the SCR catalyst becomes high as well.

Figure 16:
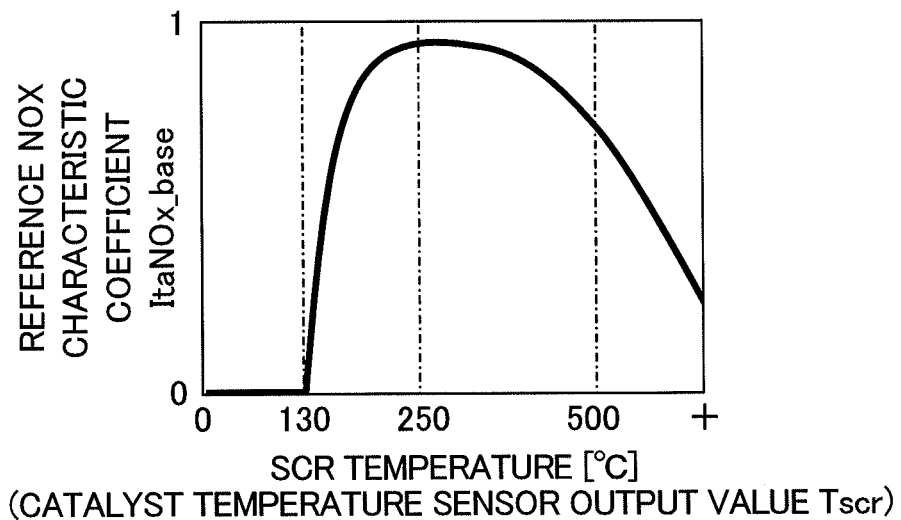
FIG. 16 is a graph showing an example of a map for calculating a base NOx characteristic coefficient with the catalyst temperature as the argument.

Next, the estimator 33 calculates a base NOx characteristic coefficient ItaNOx_base(k) serving as a standard index indicating the level of the NOx purification performance of the SCR catalyst, by searching a map as shown in FIG. 16, for example, with the catalyst temperature sensor output value Tscr as the argument. As shown in FIG. 16, with a common SCR catalyst, the NOx purification performance is almost nothing when the temperature thereof is no higher than the activation temperature on the order of about 130° C., and the NOx purification performance reaches a maximum at this activation temperature or higher at an optimum temperature on the order of about 250° C.

Figure 17:
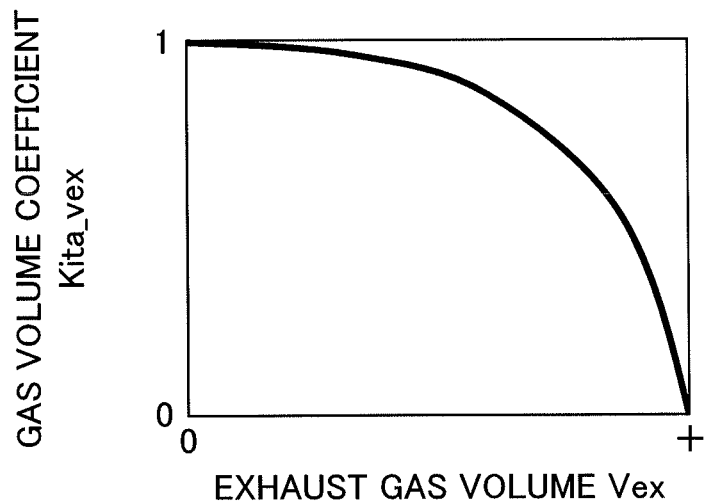
FIG. 17 is a graph showing an example of a map for calculating a gas volume coefficient with the exhaust gas volume as the argument.

Next, the estimator 33 calculates a gas volume coefficient Kita_vex(k) serving as one of the indices indicating the level of NOx purification performance of the SCR catalyst, by searching a map as shown in FIG. 17, for example, with the exhaust gas volume Vex calculated by processing that is not illustrated as the argument. As shown in FIG. 17, as the exhaust gas volume becomes large, the gas volume coefficient decreases, and the NOx purification performance of the SCR catalyst also becomes low.

Next, the estimator 33 calculates a final NOx purification rate estimated value ItaNOx_hat(k), by multiplying the coefficients ItaNOx_base, Kita_st and Kita_vex calculated from the dimensional different three parameters catalyst temperature Tscr, the $NH_3$ storage rate R_nh3_st and the exhaust gas volume Vex.

$$ItaNOx\_hat(k)=Kita\_vex(k)Kita\_st(k)ItaNOx\_base(k) \quad (19)$$

Feed-Forward Controller

Referring back to FIG. 2, the specific sequence of operations performed by the feed-forward controller 34 will be explained.

The feed-forward controller 34 calculates the value Gnh3_ff of the feed-forward input by the sequence shown below.

The controller 34 first calculates the purifiable NOx amount RedNOx corresponding to the amount of NOx that can be purified in the SCR catalyst, according to the below formula (20). The purifiable NOx amount RedNOx is calculated by multiplying together the NOx purification rate estimated value ItaNOx_hat(k) (refer to formula (17)), NOx specific gravity Rnox, exhaust gas volume Vex, and upstream NOx sensor output value NOx_UP.

$$RedNOx(k)=ItaNOx\_hat(k-1)RnoxNOx\_UP(k)Vex(k) \quad (20)$$

The controller 34 sets, as the feed-forward input Gnh3_ff, the result of multiplying the conversion factor Knox_nh3 for calculating the $NH_3$ amount required in order to reduce NOx, by this purifiable NOx amount RedNOx (refer to below formula (21)). For this conversion factor Knox_nh3, a constant value that basically does not change with time (e.g., 0.56) is used. However, the amount of NOx that can be reduced by the SCR catalyst changes also according to the ratio of $NO_2$ to NO flowing into the SCR catalyst, for example; therefore, it may be configured to change the above-mentioned conversion factor Knox_nh3 according to the amount of $NO_2$ generated by the oxidation catalyst on the upstream side of the SCR catalyst.

$$Gnh3\_ff(k)=Knox\_nh3RedNOx(k) \quad (21)$$

$NH_3$ Storage Controller

Next, the specific sequence of operations performed by the $NH_3$ storage controller 36 will be explained.

The $NH_3$ storage controller 36 sets a target $NH_3$ storage amount ST_nh3_trgt corresponding to a target value for the $NH_3$ storage amount estimated value ST_nh3_hat by way of the sequence shown below, and calculates the storage correction input Gnh3_st for maintaining the estimated value ST_nh3_hat at this target value ST_nh3_trgt. Hereinafter, the sequence of setting the target $NH_3$ storage amount ST_nh3_trgt and the sequence of calculating the storage correction input Gnh3_st will be explained.

Figure 18:
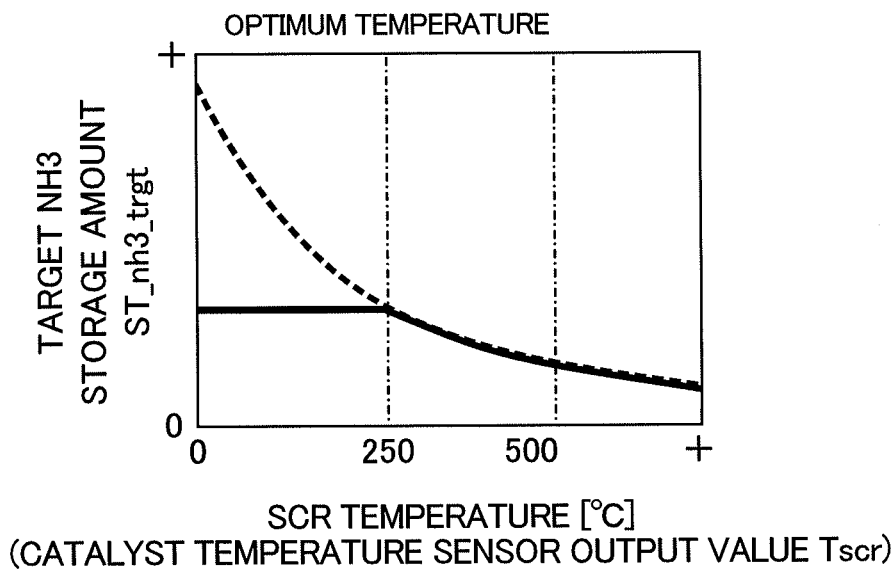
FIG. 18 is a graph showing the relationship between the catalyst temperature and the maximum $NH_3$ storage amount.

FIG. 18 is a graph showing the relationship between the temperature of the SCR catalyst and the maximum $NH_3$ storage amount. In FIG. 18, the dashed line corresponds to the maximum $NH_3$ storage amount, the solid line corresponds to the target $NH_3$ storage amount set relative to the maximum $NH_3$ storage amount of such a characteristic.

As shown in FIG. 18, the maximum $NH_3$ storage amount has a characteristic of decreasing accompanying the temperature rising. In addition, in the example of FIG. 18, the optimum temperature of the SCR catalyst at which the NOx purification rate of the SCR catalyst reaches a local maximum is about 250° C. Hereinafter, the preferred magnitude of the $NH_3$ storage amount will be explained by dividing into the temperature of the SCR catalyst during high load operating (case of being at least the optimum temperature) and during low load operating (case of being less than the optimum temperature).

With a lean-burn engine, since the feed NOx amount increases when the operating load rises, the NOx purification rate required in the SCR catalyst also rises. First, as explained while referencing FIG. 15, when viewed from the magnitude of the $NH_3$ storage amount, the NOx purification rate of the SCR catalyst rises the most when the $NH_3$ storage amount has reached a maximum; therefore, it is preferable to maintain the $NH_3$ storage amount at the maximum $NH_3$ storage amount to maximize the NOx purification rate. Since the exhaust temperature of the engine also rises during high load operation in which the feed NOx increases, the temperature of the SCR catalyst also rises. For this reason, in order to maximize the NOx purification rate during high load operation, at the optimum temperature or higher at which the NOx purification rate of the SCR catalyst reaches a maximum, the target $NH_3$ storage amount is set the maximum $NH_3$ storage amount according to this temperature (catalyst temperature sensor output value Tscr).

As shown in FIG. 18, the slope of the change in the maximum $NH_3$ storage amount according to the catalyst temperature at the optimum temperature or higher is more gradual than at less than the optimum temperature. Therefore, at such conditions, the maximum $NH_3$ storage amount will not drastically decline, even if the temperature of the SCR catalyst suddenly rises due to sudden acceleration, for example. Therefore, even if controlling the $NH_3$ storage amount to the maximum $NH_3$ storage amount at the optimum temperature or higher, the downstream $NH_3$ concentration will not excessively rise due to a sudden temperature rise in the SCR catalyst.

With a lean-burn engine, since the feed NOx during low load operation will become extremely low, the NOx purification rate required in the SCR catalyst will not get as high as during the above-mentioned high load operation. On the other hand, when the operating conditions of the engine suddenly change from low load to high load, the exhaust temperature of the engine suddenly rises, and the temperature of the SCR catalyst also suddenly rises accompanying this. At this time, at less than the optimum temperature, if the $NH_3$ storage amount is set to the maximum $NH_3$ storage amount according to the temperature of the SCR catalyst, $NH_3$ adsorbed to the SCR catalyst will suddenly be released due to the sudden decline in the maximum $NH_3$ storage amount accompanying a temperature rise, and thus there is concern over the $NH_3$ concentration downstream of the SCR catalyst rising. Due to this, in preparation for operations (sudden acceleration, hill climbing, filter regeneration, etc.) accompanied by a sudden rise in the SCR catalyst temperature during low load operation for which the required NOx purification rate is not very high, the target $NH_3$ storage amount is set so as to reach the maximum $NH_3$ storage amount when at the optimum temperature.

The controller 36 prepares the catalyst temperature sensor output value Tscr(k) and catalyst temperature predicted value Tscr_pre(k) as arguments for searching the map shown in FIG. 18 in order to determine the target $NH_3$ storage amount ST_nh3_trgt. Among these, the catalyst temperature predicted value Tscr_pre(k) corresponds to the estimated value of the future temperature of the SCR catalyst, and is calculated by a process that is not illustrated, based on the sensor output value Tscr, operating state of the engine, etc. More specifically, the catalyst temperature predicted value Tscr_pre(k) is calculated by adding a heat mass rise obtained by inputting the temperature of equipment on an upstream side from the SCR catalyst into a predetermined lag model, to a base value obtained by extrapolating from a current sensor output value Tscr, based on a predetermined algorithm, for example.

The controller 36 compares the target maximum $NH_3$ storage amount ST_NH3_p(k) obtained by searching the map of FIG. 18 with the sensor output value Tscr(k) as the argument, and the target maximum $NH_3$ storage amount ST_NH3_a(k) obtained by searching the map of FIG. 18 with the catalyst temperature predicted value Tscr_pre(k) as the argument, and defines the smaller thereamong as the target maximum $NH_3$ storage amount (refer to below formula (22)).

$$ST\_NH3\_trgt(k) = \min(ST\_NH3\_p(k), ST\_NH3\_a(k)) \quad (22)$$

In the above way, using the two arguments of the sensor output value Tscr and the catalyst temperature predicted value Tscr_pre, and further setting the smaller one as the target maximum $NH_3$ storage amount, it is possible to decrease the urea water injection amount prior to the temperature of the SCR catalyst suddenly rising, for example, and thus use the $NH_3$ adsorbed on the SCR catalyst in the purification of NOx.

Next, a sequence of calculating the storage correction input Gnh3_st using the target $NH_3$ storage amount ST_nh3_trgt calculated in the above way will be explained. In the present embodiment as mentioned above, the final $NH_3$ injection amount Gnh3 is calculated using the input values Gnh3_ff, Gnh3_fb and Gnh3_st calculated by the three controllers 34, 35 and 36. Thereamong, the $NH_3$ storage controller 36 and the feedback controller 35 may interfere with each other. For this reason, in order to configure so that interference with the feedback controller 35 is avoided, the $NH_3$ storage controller 36 determines the storage correction input Gnh3_st by a sliding-mode control algorithm that can designate the attenuation characteristic of the deviation input.

The controller 36 calculates a deviation input E_st by subtracting the target maximum $NH_3$ storage amount ST_nh3_trgt from the $NH_3$ storage amount estimated value ST_nh3_hat (refer to below formula (23)).

$$E\_st(k) = ST\_nh3\_hat(k) - ST\_nh3\_trgt(k) \quad (23)$$

Next, the controller 36 calculates a conversion function σ_st according to a conversion function setting parameter Vpole_st (refer to below formula (24-1)), which is shifted between a low gain value Vpole_st_L and a high gain value Vpole_st_H (refer to below formula (24-2)).

$$Vpole\_st(k) = \begin{cases} Vpole\_st\_L & (F\_FB\_PRIOR = 1) \\ Vpole\_st\_H & (F\_FB\_PRIOR = 0) \end{cases} \quad (24\text{-}1)$$

$$\sigma\_st(k) = E\_st(k) + Vpole\_st(k)E\_st(k-1) \quad (24\text{-}2)$$

In the above formula (24-1), "F_FB_PRIOR" is a feedback controller priority flag, and is switched as appropriate by a feedback controller described later. In other words, in a case of the feedback controller priority flag F_FB_PRIOR being "0", the conversion function setting parameter Vpole_st is set to the high gain value Vpole_st_H (e.g., 0.4), and in the case of the flag F_FB_PRIOR being "1", in order to prioritize the input of the feedback controller 35, the conversion function setting parameter Vpole_st of the $NH_3$ storage controller 36 is shifted to the low gain value Vpole_st_L (e.g., −0.98).

As described in detail later, the feedback controller priority flag F_FB_PRIOR is set from "0" to "1" when the downstream $NH_3$ estimated value NH3_DW_hat has become excessive, when the downstream NOx estimated value NOx_DW_hat has greatly drifted from the target value thereof, etc. (refer to formula (34) described later). The $NH_3$ storage controller 36, in such a case, shifts the value of the parameter Vpole_st to the low gain value Vpole_st_L to lose the restraint speed of the deviation input E_st, and causes control to decrease the urea water injection amount by the feedback controller 35 to be prioritized, thereby suppressing the interference between the two.

The controller 36 calculates a reaching-law input Gnh3_st_rch and an adaptive-law input Gnh3_st_adp using the conversion function σ_st set in the above way (refer to below formulas (25-2) and (25-3)), and calculates an input combining these as a storage correction input Gnh3_st (refer to below formula (25-1)).

$$Gnh3\_st(k) = Gnh3\_st\_rch(k) + Gnh3\_st\_adp(k) \quad (25\text{-}1)$$

$$Gnh3\_st\_rch(k) = Krch\_st\sigma\_st(k) \quad (25\text{-}2)$$

$$Gnh3\_st\_adp(k) = Kadp\_st\sum_{i=0}^{k} \sigma\_st(i) \quad (25\text{-}3)$$

Feedback Controller

Referring back to FIG. 2, the concept of operations performed by the feedback controller 35 and the specific sequence thereof will be explained.

In the above described way, the separation filter adopts the correlation between the upstream NOx and downstream NOx, and extracts the downstream $NH_3$ estimated value NH3_DW_hat and downstream NOx estimated value NOx_DW_hat from the NOx sensor output Ynox. For this reason, in order to extract NH3_DW_hat and NOx_DW_hat accurately, it is necessary for the upstream NOx to fluctuate. In other words, if the vehicle enters a perfect cruise state, the separation filter cannot distinguish which of $NH_3$ and NOx is being discharged to downstream of the SCR catalyst.

Due to this, in a transient condition in which the vehicle performs acceleration, the feedback controller sets the target downstream NOx concentration NOx_DW_trgt based on the target NOx purification rate of the SCR, and calculates the feedback input Gnh3_fb so that the downstream NOx estimated value NOx_DW_hat becomes NOx_DW_trgt. In addition, the input Gnh3_fb is simultaneously calculated so as to become the downstream $NH_3$ estimated value NH3_DW_trgt. At this time, the input Gnh3_fb is calculated by a sliding-mode controller. On the other hand, since the accuracy of the separation filter declines during cruise operation, the input Gnh3_fb is calculated by an extrema search controller so that the NOx sensor output value Ynox becomes a minimum (additional value of downstream $NH_3$ and downstream NOx is minimum).

Therefore, with the feedback controller, it is determined if the engine is in a transient state or a cruise state, and in the case of being in a transient state, the input Gnh3_fg is determined by the sliding-mode controller; whereas, in the case of being in a cruise state, the input Gnh3_fb is determined by the extrema search controller.

First, the controller 35 divides the operating states of the engine (vehicle) into the two of a transient operating state and cruise operating state, and sequentially determines to which the current operating state belongs. More specifically, the controller 35 calculates, from the change in exhaust volume Vex, a transient determination parameter Ptr serving as an index indicating being a transient operating state, as shown in the below formula (26-1). Herein, "Fgt_tr" is a forgetting factor that is set in order to define the transient determination parameter, and is 0.995, for example. The controller 35 determines being the transient operating state in the case of the transient determination parameter Ptr being at least a predetermined threshold Th_Ptr, and sets a transient condition flag F_trans to "1", and determines being the cruise operating state in the case of the transient determination parameter Ptr being less than the threshold Th_Ptr, and resets the transient condition flag F_trans to "0".

$$Ptr(k) = \text{Fgt\_tr} Ptr(k-1) + (Vex(k) - Vex(k-1))^2 \qquad (26\text{-}1)$$

$$F\_trans(k) = \begin{cases} 1 & (Ptr(k) \geq \text{Th\_Ptr}) \\ 0 & (Ptr(k) < \text{Th\_Ptr}) \end{cases} \qquad (26\text{-}2)$$

Furthermore, the controller 35 sets an input value Gnh3_smc(k) calculated by the sliding-mode controller as the feedback input Gnh3_fb(k) in a case of being in the transient operating state (F_trans=1), and sets the input value Gnh3_exs(k) calculated by the extrema search controller as the feedback input Gnh3_fb(k), in a case of being the cruise operating state (F_trans=0), as shown in the below formula (27). In other words, in a case of being the transient operating state, the feedback input Gnh3_fb is calculated by the feedback controller, and is calculated by the extrema search controller in the case of being the cruise operating state.

$$Gnh3\_fb(k) = \begin{cases} Gnh3\_smc(k) & (F\_trans(k) = 1) \\ Gnh3\_exs(k) & (F\_trans(k) = 0) \end{cases} \qquad (27)$$

Feedback Controller (During Transient Operation)

The sequence of operations of the feedback controller during transient operation (F_trans=1) will be explained. In other words, the sequence of calculating the feedback input Gnh3_smc by the sliding-mode controller will be explained. The sliding-mode controller calculates an input Gnh3_smc so as to achieve both an improvement in NOx purification rate and suppression of $NH_3$ slip, by the sequence shown below.

First, the sequence of calculating the target NOx purification rate in the sliding-mode controller will be explained. The NOx purification rate of the SCR catalyst rises with higher $NH_3$ storage rate, as explained by referencing FIG. 15. Therefore, a state in which the $NH_3$ storage amount of the SCR catalyst is maintained at the target $NH_3$ storage amount explained by referencing FIG. 18 is considered the optimum state that can be realized by urea-water injection control, when viewed from the NOx purification rate. Therefore, the NOx purification rate in a state in which the $NH_3$ storage amount is maintained at the target $NH_3$ storage amount is defined as the target NOx purification rate.

More specifically, the controller calculates the target $NH_3$ storage amount by searching a map like that shown in FIG. 18 with the catalyst temperature sensor output value Tscr as the argument, and defines this as an ideal $NH_3$ storage amount ST_nh3_ideal(k). The controller calculates an ideal $NH_3$ storage rate R_nh3_st_ideal with the below formula (28), using this ideal $NH_3$ storage amount ST_nh3_ideal(k).

$$R\_nh3\_st\_ideal(k) = \frac{Gnh3(k-1) + ST\_nh3\_ideal(k-1)}{ST\_nh3\_cap(k-1)} \qquad (28)$$

The controller calculates an $NH_3$ storage coefficient by searching the map shown in FIG. 15 with this ideal $NH_3$ storage rate R_nh3_st_ideal as the argument, and defines this as an ideal $NH_3$ storage coefficient Kita_st_ideal. The target NOx purification rate ItaNOx_trgt(k) is calculated by multiplying together the base NOx characteristic coefficient ItaNOx_base, exhaust gas volume coefficient Kita_vex and ideal $NH_3$ storage coefficient Kita_st_ideal, as shown in the below formula (29).

$$Ita\text{NOx\_trgt}(k) = Kita\_vex(k) Kita\_st\_ideal(k) Ita\text{NOx\_base}(k) \qquad (29)$$

It should be noted that the target concentration (hereinafter downstream NOx target value) NOx_DW_trgt on the downstream side of the SCR catalyst corresponding to this target NOx purification rate is calculated by the below formula (30), using the upstream NOx sensor output value NOx_UP.

$$\text{NOx\_DW\_trgt}(k) = (1 - Ita\text{NOx\_trgt}(k))\text{NOx\_UP}(k-1) \qquad (30)$$

Next, the deviation input of the sliding-mode controller will be explained. The two of the estimated values NOx_DW_hat and NH3_DW_hat calculated by the separation filter are inputted to this sliding-mode controller. Therefore, this controller defines the downstream NOx deviation Enox(k) and downstream $NH_3$ deviation Enh3(k) for the respective estimated values NOx_DW_hat and NH3_DW_hat, as shown in the below formulas (31-1) and (32-2). However, in the definition of the downstream NOx deviation Enox(k), in the case of NOx_DW_hat having become larger than NOx_DW_trgt, the usual symbol for the definition of deviation is reversed so that the urea water injection amount is adjusted to the increasing side.

$$Enox(k) = -(\text{NOx\_DW\_hat}(k) - \text{NOx\_DW\_trgt}(k)) \qquad (31\text{-}1)$$

$$Enh3(k) = \text{NH3\_DW\_hat}(k) - \text{NH3\_DW\_trgt}(k) \qquad (31\text{-}2)$$

Figure 19:
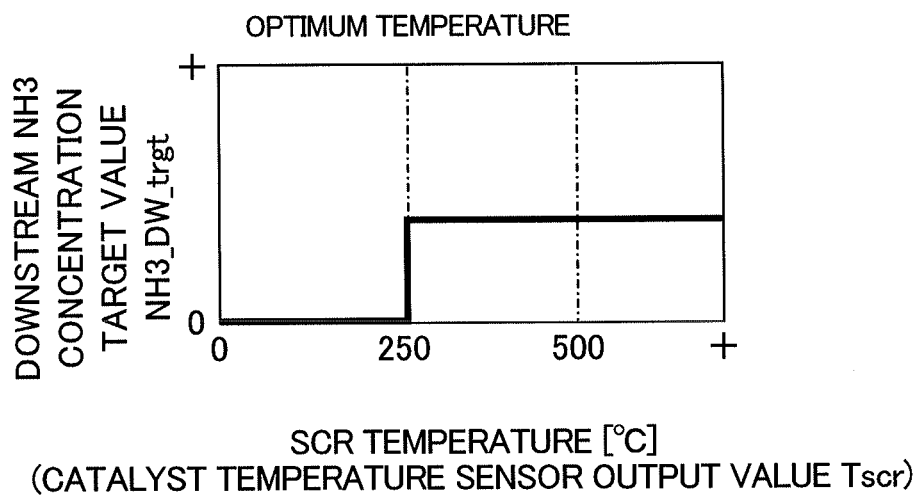
FIG. 19 is a graph showing an example of a map for calculating a downstream $NH_3$ concentration target value for downstream $NH_3$ deviation.

FIG. 19 is graph showing an example of a map for calculating the downstream $NH_3$ concentration target value NH3_DW_trgt of the above-mentioned downstream $NH_3$ deviation Enh3.

The downstream $NH_3$ concentration target value NH3_DW_trgt is established so as to correspond to the target $NH_3$ storage amount ST_nh3_trgt explained while referencing FIG. 18. As mentioned above, in the case of the catalyst temperature being at least the optimum temperature, the target $NH_3$ storage amount ST_nh3_trgt is set to substantially the same value as the maximum $NH_3$ storage amount at this time, and in the case of the catalyst temperature being lower than the optimum temperature, is set to a value smaller than the maximum $NH_3$ storage amount at this time.

In accordance thereto, the downstream $NH_3$ concentration target value NH3_DW_trgt is set to a value somewhat larger than 0 (e.g., about 8 ppm) so that the $NH_3$ storage amount is reliably maintained at the maximum $NH_3$ storage amount, in the case of the temperature sensor output value Tscr being at least the optimum temperature, and is set to 0 so that the $NH_3$ storage amount reliably becomes smaller than the maximum $NH_3$ storage amount in the case of the temperature sensor output value Tscr being lower than the optimum temperature.

The sliding-mode controller defines a single deviation input E_fb(k) as shown in the below formula (32), based on the two deviations Enox and Enh3. In the present embodiment, in a case of the deviation Enh3 being at least a predetermined threshold TH_NH3_SLIP_L, the downstream $NH_3$ deviation Enh3 is set to the deviation input E_fb in order to prioritize the suppression of $NH_3$ slip, and in the case of the deviation Enh3 being smaller than the threshold TH_NH3_SLIP_L, the downstream NOx deviation Enox is set as the deviation input E_fb.

$$E\_fb(k) = \begin{cases} Enh3(k) & (Enh3(k) \geq TH\_NH3\_SLIP\_L) \\ Enox(k) & (Enh3 < TH\_NH3\_SLIP\_L) \end{cases} \quad (32)$$

Figure 20:
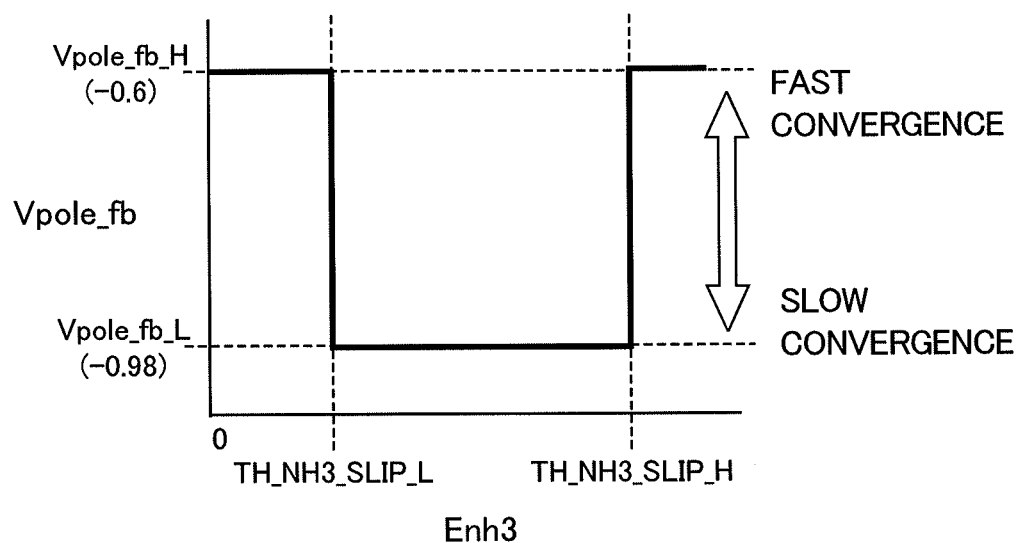
FIG. 20 is a graph schematically showing setting of a conversion function in a sliding-mode controller of a feedback controller.

FIG. 20 is a graph schematically showing the setting of the conversion factor σ_fb in the sliding-mode controller.

The sliding-mode controller defines the conversion factor σ_fb as shown in the below formula (33-2), using the conversion factor setting parameter Vpole_fb, which is shifted between the low gain value Vpole_fb_L (e.g., −0.98) and the high gain value Vpole_fb_H (e.g., −0.6) depending on the magnitude of the downstream $NH_3$ deviation. As shown in the below formula (33-1), in a case considering the downstream $NH_3$ deviation Enh3 to be relatively small, and the estimation accuracy of the separation filter not being very high, more specifically, in a case of the downstream $NH_3$ deviation Enh3 being between the threshold TH_NH3_SLIP_L and the threshold TH_NH3_SLIP_H, the conversion factor setting parameter Vpole_fb is shifted to the relatively small low gain value Vpole_fb_L, so that the convergence behavior of the deviation input E_fb(k) becomes slow.

$$Vpole\_fb(k) = \begin{cases} Vpole\_fb\_H & (Enh3 < TH\_NH3\_SLIP\_L) \\ Vpole\_fb\_L & (TH\_NH3\_SLIP\_L \leq Enh3(k) \leq TH\_NH3\_SLIP\_H) \\ Vpole\_fb\_H & (Enh3 > TH\_NH3\_SLIP\_H) \end{cases} \quad (33\text{-}1)$$

$$\sigma\_fb(k) = E\_fb(k) + Vpole\_fb(k)E\_fb(k-1) \quad (33\text{-}2)$$

The sliding-mode controller calculates the feedback input Gnh3_smc according to the below formulas (34-1) to (34-3), using the conversion factor σ_fb(k) defined as above.

$$Gnh3\_smc(k) = Gnh3\_fb\_rch(k) + Gnh3\_fb\_adp(k) \quad (34\text{-}1)$$

$$Gnh3\_fb\_rch(k) = Krch\_fb\sigma\_fb(k) \quad (34\text{-}2)$$

$$Gnh3\_fb\_adp(k) = Kadp\_fb\sum_{i=0}^{k}\sigma\_fb(k) \quad (34\text{-}3)$$

Furthermore, the sliding-mode controller sets the feedback controller priority flag F_FB_PRIOR to 1 in order to give the feedback input Gnh3_fb priority over the input Gnh3_st of the $NH_3$ storage controller, in the case of excessive NOx being discharged or a case of excessive $NH_3$ being discharged to downstream of the SCR catalyst. More specifically, the controller sets the flag F_FB_PRIOR to 1 in a case of the downstream NOx deviation Enox being larger than the threshold NOx_DW_HIGH or the case of the downstream $NH_3$ estimated value NH3_DW_hat being larger than the threshold TH_$NH_3$ SLIP_H, and sets the flag F_FB_PRIOR to 0 in cases other than these (refer to below formula (35)).

$$F\_FB\_PRIOR(k) = \begin{cases} 1 & \left(\begin{array}{l} Enox(k) > NOx\_DW\_HIGH \text{ or} \\ NH3\_DW\_hat(k) > TH\_NH3\_SLIP\_H \end{array}\right) \\ 0 \end{cases} \quad (35)$$

Feedback Controller (During Cruise Operation)

The sequence of operations of the feedback controller during cruise operation (F_trans=0) will be explained. In other words, the sequence of calculating the feedback input Gnh3_exs by the extrema search controller will be explained.

Figure 21:
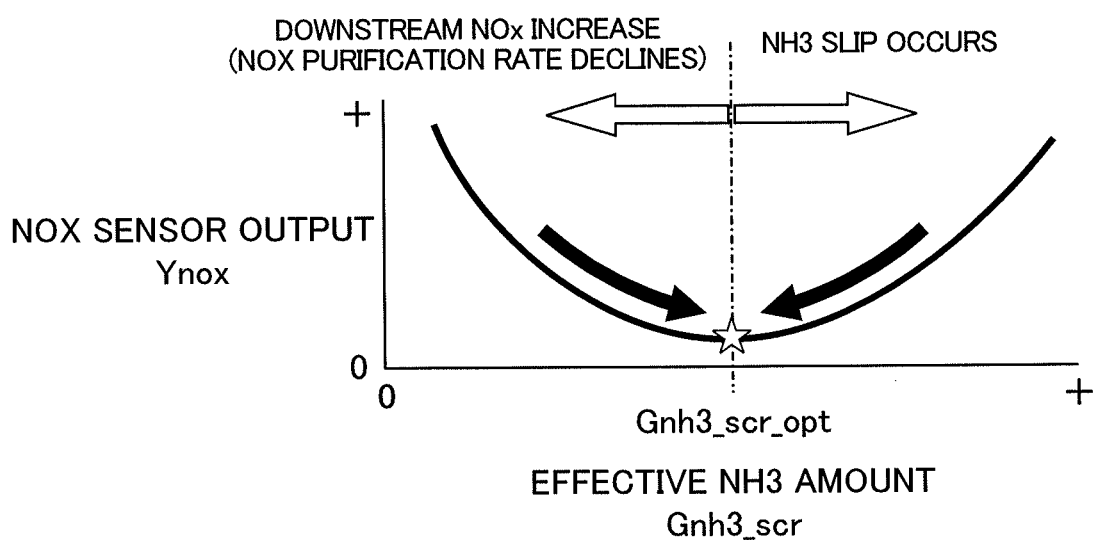
FIG. 21 is a graph illustrating the concept of operations in an extrema search controller.

FIG. 21 is a graph illustrating the concept of operations in the extrema search controller.

In FIG. 21, the vertical axis is the effective $NH_3$ amount Gnh3_scr of the SCR catalyst (refer to formula (15)), and the horizontal axis is the output value Ynox of the downstream-side NOx sensor. As shown in FIG. 21, the output value Ynox of the NOx sensor exhibits a downward convex characteristic relative to the effective $NH_3$ amount Gnh3_scr. Herein, when correcting the urea water injection amount from a state of the output value Ynox being at a point that is the minimum to an increasing side so as to enlarge the effective $NH_3$ amount Gnh3_scr, $NH_3$ slip occurs at the SCR catalyst. On the other hand, when correcting the urea water injection amount from a state of the output value Ynox being at a point that is the minimum to a decreasing side so as to decrease the effective $NH_3$ amount Gnh3_scr, the NOx purification rate in the SCR catalyst declines, and the amount of NOx discharged to the downstream side without being purified increases. In other words, by adjusting the effective $NH_3$ amount Gnh3_scr to an optimum value Gnh3_scr_opt so that the output value Ynox becomes the minimum, the achievement of both the suppression of $NH_3$ slip and an improvement in NOx purification rate is realized.

Figure 22:
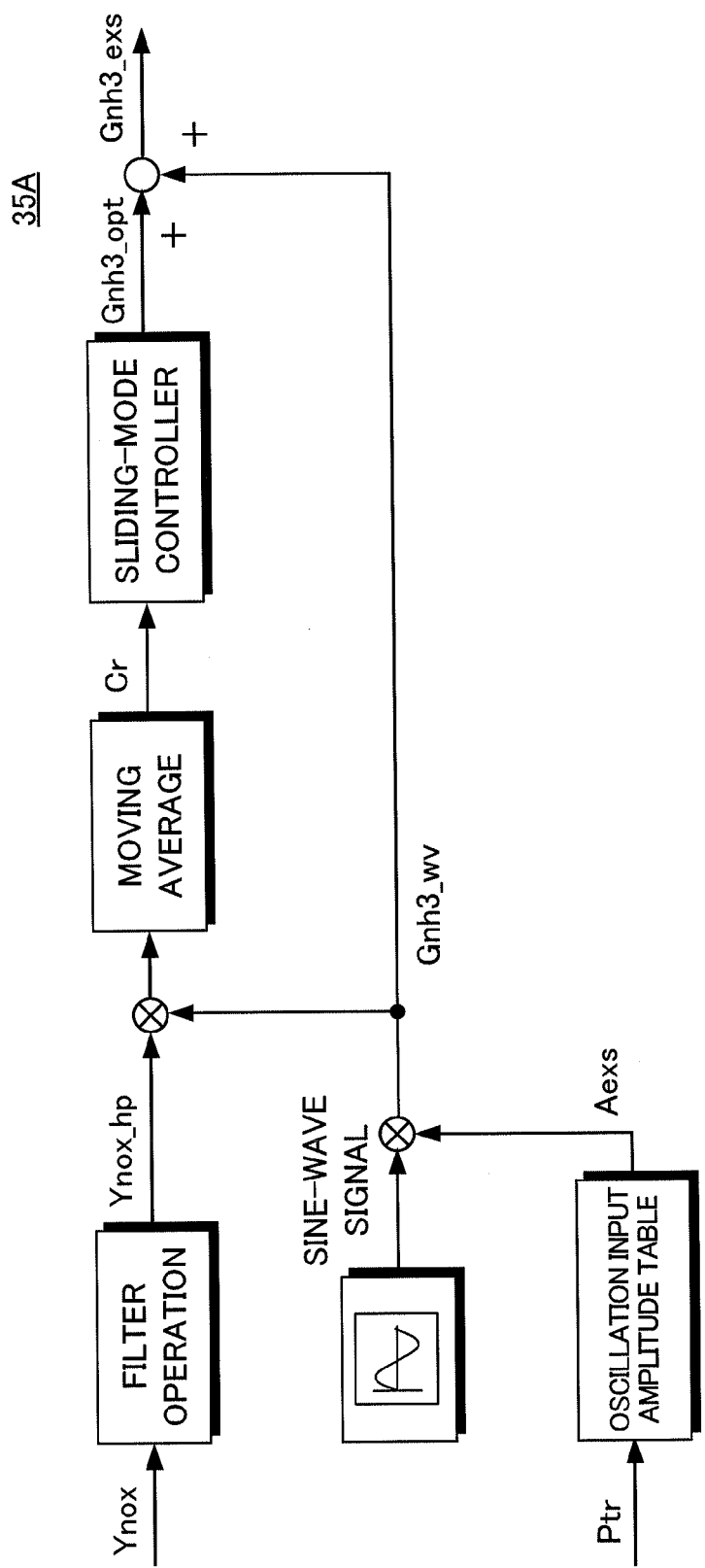
FIG. 22 is a block diagram showing the configuration of the extrema search controller.

FIG. 22 is a block diagram showing the configuration of an extrema search controller 35A.

The extrema search controller 35A calculates the feedback input Gnh3_exs by totaling an excitation input Gnh3_wv in which sine wave signals are superimposed, and an optimum input Gnh3_opt calculated by the sliding-mode controller so that the NOx sensor output value Ynox becomes the minimum (refer to below formula (36)).

$$Gnh3\_exs(k) = Gnh3\_opt(k) + Gnh3\_wv(k) \quad (36)$$

Figure 23:
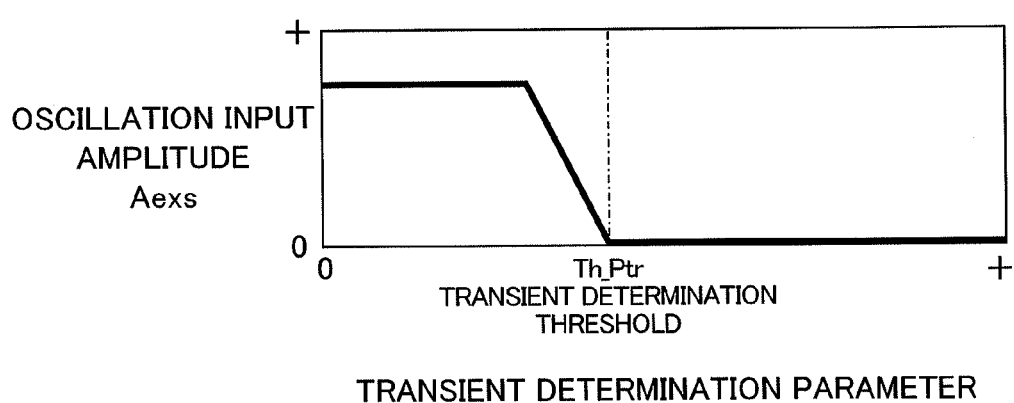
FIG. 23 is a graph showing an example of a table for determining an excitation input amplitude.

The excitation input Gnh3_wv(k) is an input for detecting the slope of the NOx sensor output value Ynox, and is calculated by multiplying a predetermined excitation input amplitude Aexs by the sine wave signal of a predetermined excitation input frequency fexs, for example (refer to below formula (37)). This excitation input frequency fexs is set to a sufficiently slow frequency (e.g., 0.05 to 0.5 Hz), by taking account of the response delay of the SCR catalyst serving as the control target. In addition, the excitation input amplitude Aexs is calculated by searching a table as shown in FIG. 23, for example, with the transient determination parameter Ptr as the argument.

$$Gnh3\_wv(k) = Aexs(k)\sin(2\pi fexs\, k\Delta T) \quad (37)$$

The feed NOx amount is substantially constant during cruise operation; therefore, the spectrum of the output value Ynox of the NOx sensor includes the component of the excitation input frequency fexs according to the excitation input Gnh3_wv, in addition to the stationary component. As shown in FIG. 22, the extrema search controller 35A calculates a filter value Ynox_hp at least excluding the stationary component from the NOx sensor output value Ynox, calculates a correlation value Cr between this filter value Ynox_hp and excitation input Gnh3_wv, and calculates the optimum input Gnh3_opt by the sliding-mode controller with this correlation value Cr as the deviation input. Hereinafter, the specific operation sequence thereof will be explained.

The extrema search controller 35A calculates the filter value Ynox_hp excluding the stationary component from the NOx sensor output value Ynox, by performing operations as shown in the below formula (38). Herein, the filter coefficients a1_h to a4_h and b1_h to b5_h in the below formula (37) are set to values so that a band-pass filter characteristic or a high-pass filter characteristic containing the excitation input frequency fexs in the passing band is obtained.

$$Ynox\_hp(k) = a1\_h \cdot Ynox\_hp(k-1) + \qquad (38)$$
$$a2\_h \cdot Ynox\_hp(k-2) + a3\_h \cdot Ynox\_hp(k-3) +$$
$$a4\_h \cdot Ynox\_hp(k-4) + b1\_h \cdot Ynox(k) + b2\_h \cdot Ynox(k-1) +$$
$$b3\_h \cdot Ynox(k-2) + b4\_h \cdot Ynox(k-3) + b5\_h \cdot Ynox(k-4)$$

Next, the extrema search controller 35A calculates a moving average deviation over to the sampling number Nexs of the product between the filter value Ynox_hp and the excitation input Gnh3_wv, as shown in the below formula (39-1), and defines this as the correlation value Cr. Herein, the sampling number Nexs is set as shown in the below formula (39-2) so that the moving average corresponds to one period of the excitation input Gnh3_wv.

$$Cr(k) = \sum_{i=0}^{Nexs} Ynox\_hp(k-i)Gnh3\_wv(k-dexs-i) \qquad (39-1)$$

$$Nexs = 1/\Delta Tfexs \qquad (39-2)$$

The extrema search controller 35A calculates the optimum input Gnh3_opt so that the correlation value Cr becomes the minimum, based on the below formulas (40-1) to (40-5).

$$\sigma exs(k) = Cr(k) + SexsCr(k-1) \qquad (40\text{-}1)$$

$$Gnh3\_opt(k) = Gnh3\_opt\_rch(k) + Gnh3\_opt\_adp(k) \qquad (40\text{-}2)$$

$$Gnh3\_opt\_rch(k) = Krch\_exs\sigma exs(k) \qquad (40\text{-}3)$$

$$Gnh3\_opt\_adp\_temp(k) = Kadp\_exs \sum_{i=0}^{k} \sigma exs(i) \qquad (40\text{-}4)$$

$$Gnh3\_opt\_adp(k) = \begin{cases} Gnh3\_opt\_adp\_H(k) & (Gnh3\_opt\_adp\_H(k) < Gnh3\_opt\_adp\_temp(k)) \\ Gnh3\_opt\_adp\_temp(k) & (Gnh3\_opt\_adp\_L(k) \le Gnh3\_opt\_adp\_temp(k) \le Gnh3\_opt\_adp\_H(k)) \\ Gnh3\_opt\_adp\_L(k) & (Gnh3\_opt\_adp\_temp(k) < Gnh3\_opt\_adp\_L(k)) \end{cases} \qquad (40\text{-}5)$$

Herein, as shown in formulas (40-4) and (40-5), the adaptive-law input Gnh3_opt_adp was limited to between the upper limit value Gnh3_opt_adp_L and the lower limit value Gnh3_opt_adp_H.

This upper limit value Gnh3_opt_adp_L and the lower limit value Gnh3_opt_adp_H are expressed by the below formulas (41-1) to (41-4). "Kgnh3_L" in formula (41-3) is the lower limit coefficient, and is set to 0.4, for example. In addition, "Kgnh3_H" in formula (41-4) is the upper limit coefficient, and is set to 2.0, for example. The value of this upper limit coefficient Kgnh3_H is not necessarily a fixed value, and may be made to vary depending on the temperature of the SCR catalyst or operating state. For example, in the case of the temperature of the SCR catalyst being near 200° C., it is set to a smaller value in order to prevent the precipitation of urea water inside the plumbing. In addition, during high load operation in which the catalyst temperature rises, the upper limit coefficient Kgnh3_H may be set to a smaller value in order to protect from the solenoid of the injector overheating and failing, by a great amount of urea water continuously being injected.

$$Gnh3\_opt\_adp\_L(k) = Gnh3\_L(k) - Gnh3\_ff(k) - Gnh3\_st(k) - Gnh3\_opt\_rch(k) + Aexs \qquad (41\text{-}1)$$

$$Gnh3\_opt\_adp\_H(k) = Gnh3\_H(k) - Gnh3\_ff(k) - Gnh3\_st(k) - Gnh3\_opt\_rch(k) + Aexs \qquad (41\text{-}1)$$

$$Gnh3\_L(k) = K\_gnh3\_L \, Gnh3\_ff(k) \qquad (41\text{-}3)$$

$$Gnh3\_H(k) = K\_gnh3\_H \, Gnh3\_ff(k) \qquad (41\text{-}4)$$

With the extrema search controller 35A, by limiting the adaptive-law input Gnh3_opt_adp in this way, it is made so that the optimization processing to maintain the urea water injection amount Gurea so that the output value of the downstream NOx sensor becomes a minimum, and the processing to limit the urea water injection amount Gurea for urea water precipitation prevention and injection protection do not interfere.

Urea Water Injection Amount Calculation Unit

Referring back to FIG. 2, the sequence of operations of the urea water injection amount calculation unit 31 will be explained.

The urea water injection amount calculation unit 31 calculates the NH$_3$ injection amount by way of the following sequence, based on the inputs from the three controllers 34, and 36.

The urea water injection amount calculation unit 31 calculates a first provisional value Gnh3_temp1 by totaling Gnh3_ff, Gnh3_st and Gnh3_fb, as shown in the below formula (42-1). The urea water injection amount calculation unit 31 calculates a second provisional value Gnh3_temp2 (refer to formula (42-4)), by limiting this first provisional value Gnh3_temp1 by an injection amount lower limit value Gnh3_L (refer to formula (42-2)) and an injection amount upper limit value Gnh3_H (refer to formula (42-3)) obtained by multiplying the lower limit coefficient Kgnh3_L or upper limit coefficient Kgnh3_H by the feed-forward input Gnh3_ff.

$$Gnh3\_temp1(k) = Gnh3\_ff(k) + Gnh3\_st(k) + Gnh3\_fb(k) \quad (42\text{-}1)$$

$$Gnh3\_L(k) = K\_gnh3\_L \; Gnh3\_ff(k) \quad (42\text{-}2)$$

$$Gnh3\_H(k) = K\_gnh3\_H \; Gnh3\_ff(k) \quad (42\text{-}3)$$

$$Gnh3\_temp2(k) = \begin{cases} Gnh3\_H(k) & (Gnh3\_H(k) < Gnh3\_temp1(k)) \\ Gnh3\_temp1(k) & (Gnh3\_L(k) \le Gnh3\_temp1(k) \le Gnh3\_H(k)) \\ Gnh3\_L(k) & (Gnh3\_temp1(k) < Gnh3\_H(k)) \end{cases} \quad (42\text{-}4)$$

The urea water injection amount calculation unit 31 determines whether the catalyst temperature sensor output value Tscr is at least a predetermined threshold Tscr_inj in order to determine whether the injected urea water is hydrolyzed so that an appropriate amount of $NH_3$ is generated, and in the case of Tscr being at least the threshold Tscr_inj, sets the second provisional value Gnh3_temp2 as the $NH_3$ injection amount Gnh3, and in the case of Tscr being less than the threshold Tscr_inj, sets the $NH_3$ injection amount as 0 (refer to below formula (43)). Herein, the threshold Tscr_inj is set to about 180 to 200° C., for example.

$$Gnh3(k) = \begin{cases} Gnh3\_temp2(k) & (Tscr(k) \ge Tscr\_inj) \\ 0 & (Tscr(k) < Tscr\_inj) \end{cases} \quad (43)$$

The urea water injection amount calculation unit 31 calculates the urea water injection amount Gurea by multiplying a conversion factor K_nh3_urea established from the concentration of urea water by the calculated $NH_3$ injection amount Gnh3 (refer to formula (44)).

$$Gurea(k) = K\_nh3\_urea \; Gnh3(k) \quad (44)$$

Flowchart

Figure 24:
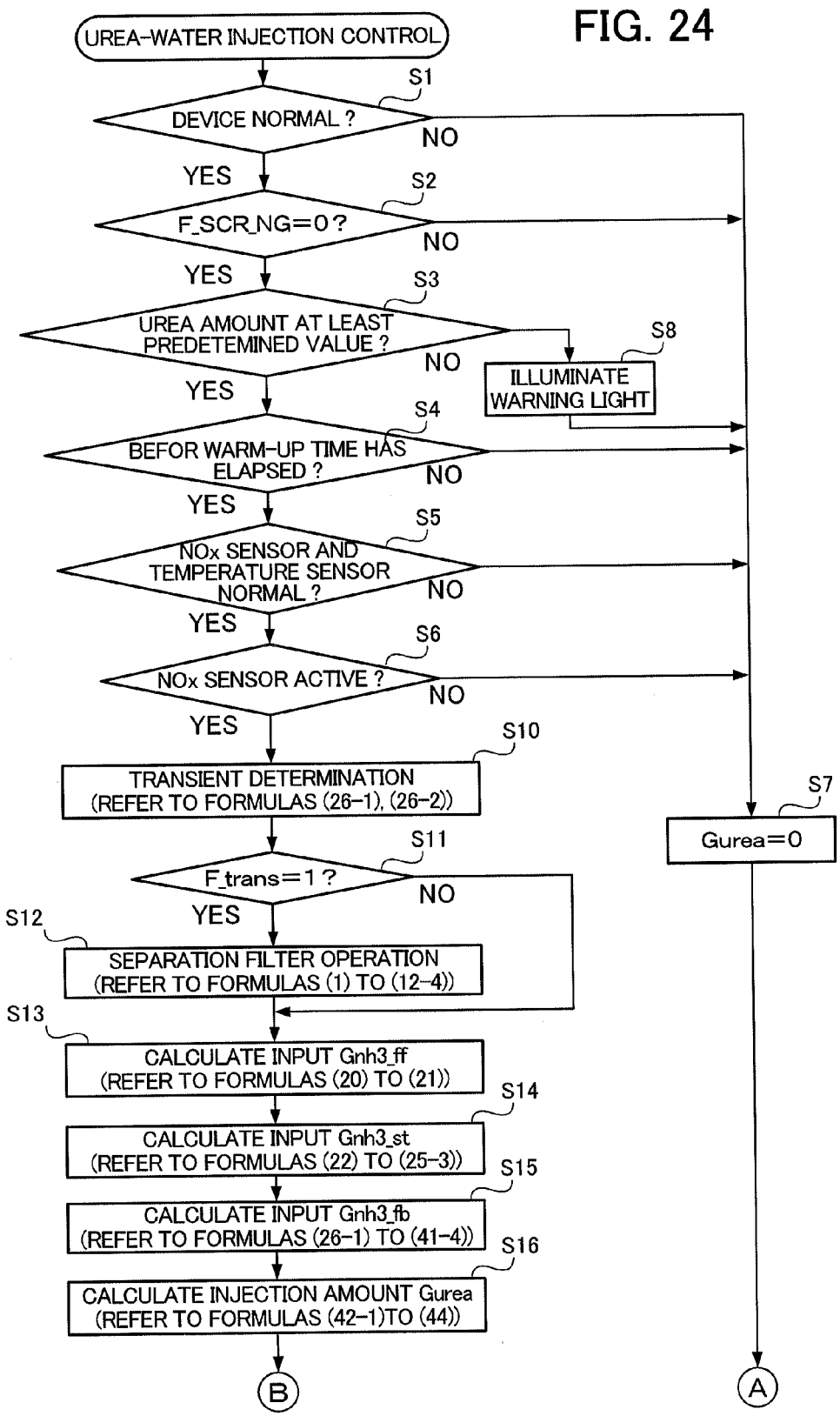
FIG. 24 is a flowchart showing the sequence of urea-water injection control.

FIGS. 24 and 25 are flowcharts showing sequences of urea-water injection control.

In S1, it is determined whether the urea-water injection device is normal. In the case of this determination being YES, the processing advances to S2. In S2, it is determined whether a degradation flag F_SCR_NG indicating a state in which the SCR catalyst has degraded is "0". This degradation flag F_SCR_NG is updated in S22 described later. In the case of the determination in S2 being YES, the processing advances to S3. In S3, it is determined whether the urea water remaining amount is at least a predetermined value. In the case of the determination in S3 being YES, the processing advances to S4. In S4, it is determined whether a warm-up time of the oxidation catalyst has elapsed. In the case of the determination in S4 being YES, the processing advances to S5. In S5, it is determined whether the downstream NOx sensor and catalyst temperature sensor are normal. In the case of the determination in S5 being YES, the processing advances to S6. In S6, it is determined whether the NOx sensor has reached activation. In the case of this determination being YES, the processing advances to S10. In the case of any among these determinations in S1 to S6 being NO, the processing advances to S7, and the urea water injection amount Gurea is forcibly set to 0. It should be noted that, in the case of the determination in S3 being NO, the warning light is illuminated (S8) in order to notify the driver of being in a state in which the urea water remaining amount is insufficient, and then the processing advances to S7.

In S10, the transient determination parameter Ptr is calculated, the transient condition flag F_trans is updated (refer to formulas (26-1) and (26-2)), and the processing advances to S11. In S11, it is determined whether the transient condition flag F_trans is "1". In the case of the determination in S11 being YES and being a transient state, the processing advances to S12, and the operations of the separation filter are performed. More specifically, in other words, the value of the purification coefficient Kscr is updated, as well as calculating the downstream NOx estimated value NOx_DW_hat and downstream $NH_3$ estimated value NH3_DW_hat (refer to formulas (1) to (12-4)), and the processing advances to S13. In the case of the determination in S11 being NO and being in a cruise state, the processing advances to S13 without performing the operations of the separation filter.

In S13, the feed-forward input Gnh3_ff is calculated (refer to formulas (20) to (21)), and the processing advances to S14. In S14, the storage correction input Gnh3_st is calculated (refer to formulas (22) to (25-3)), and the processing advances to S15. In S15, the feedback input Gnh3_fb is calculated, and the processing advances to S16. Herein, in the case of being a transient state, the input Gnh3_fb is calculated by the sliding-mode controller (refer to formulas (26-1) to (35)), and in the case of being the cruise state, the input Gnh3_fb is calculated by the extrema search controller (refer to formulas (36) to (41-4)). In S16, the urea water injection amount Gurea is calculated, and the processing advances to S20 (refer to formulas (42-1) to (44)).

In S20, it is determined whether the transient condition flag F_trans is "1". In the case of the determination in S20 being NO and being in a cruise state, the processing advances to S21. In S21, it is determined whether the optimum input Gnh3_opt calculated by the extrema search controller (refer to formula (40-2)) is less than a predetermined failure determination threshold Gnh3_opt_AGD. The optimum input Gnh3_opt as described above is an input for optimizing the output of the NOx sensor. In contrast, when degradation of the SCR catalyst progresses, the optimum value Gnh3_scr_opt (refer to FIG. 21) of the effective $NH_3$ amount Gnh3_scr decreases, and the optimum input Gnh3_opt also decreases. For this reason, the optimum input Gnh3_opt is one of the indices for determining the degradation of the SCR catalyst. Therefore, in the case of the determination in S21 being YES, it is determination that the SCR catalyst is normal, and this processing is ended. In the case of the determination in S21 being NO, it is determined that the SCR catalyst is in a degraded state, the processing is advanced to S22, the degradation warning light is illuminated, and further, the degradation flag F_SCR_NG is set to "1", and this processing is ended.

In the case of the determination in S20 being YES and being in a transient state, the processing advances to S23. In S23, it is determined whether the purification coefficient Kscr is larger than a predetermined failure determination threshold Kscr_AGD. In the case of the determination in S23 being YES, it is determined that the NOx purification performance of the SCR catalyst has declined, the degradation warning light is illuminated, and this processing is ended. In the case of the determination in S23 being NO, the processing advances to S24. In S24, it is determined whether the downstream $NH_3$ estimated value NH3_DW_hat is larger than a predetermined failure determination threshold NH3_AGD, and the downstream NOx estimated value NOx_DW_hat is larger than a predetermined failure determination threshold NOx_AGD. In the case of the determination in S24 being YES, it is determined that the NOx purification performance of the SCR catalyst has declined, the processing advances to S22, the degradation warning light is illuminated, and this processing is ended. In the case of the determination in S24 being NO, it is determined that the SCR catalyst is normal, and this processing is ended.

Simulation Results

Hereinafter, the results of seven simulations performed in order to verify the effects of the above embodiment will be explained.

FIG. 26 is a table summarizing the conditions of simulation in each experiment.

In Experiments 1 to 7, the presence or absence of input from the feed-forward controller, the presence or absence of input from the $NH_3$ storage controller, and the presence or absence of input from the feedback controller were assigned as simulation conditions. Particularly with the feedback controller, the presence or absence of input from the separation filter, the presence or absence of input from the sliding-mode controller, and the presence or absences of input from the extrema search controller were assigned as simulation conditions. In addition, in order to verify the adaptive ability of these controllers in the case of error arising in the system, error was arbitrarily generated by dividing the quality of the urea water injectors as simulation conditions. It should be noted that upper-limit article for the urea water injector indicates an article having a flowrate error that is +15% relative to a reference article, and the lower-limit article indicates an article having a flowrate error that is −15% relative to the reference article.

FIG. 27 provides graphs showing the simulation results of Experiment 1.

In Experiment 1, only the inputs from the feed-forward controller and $NH_3$ storage controller were used. In addition, in Experiment 1, the urea water injector was the reference article.

In the system of Experiment 1, since the input of the feedback controller is cut, it is only feed-forward controlled in response to predetermined engine conditions; however, with the urea water injector set as the reference article, since there is no source of error in the system, the NOx purification rate mostly matches the target NOx purification rate ItaNOx_trgt, and it is considered that an ideal state is maintained.

It should be noted that there are some places of the actual NOx purification rate falling below the target NOx purification rate ItaNOx_trgt (e.g., refer to time t3 in FIG. 27). This is because, although the maximum $NH_3$ storage amount increases by the vehicle speed suddenly declining, and thus the SCR catalyst temperature (sensor value Tscr) declining, a lag occurs in the increase in the $NH_3$ storage amount relative to such a sudden increase in maximum $NH_3$ storage amount. In addition, this lag in the increase in $NH_3$ storage amount must be permitted since the injection limit in the urea water in effect is a major cause thereof, due to the injection amount upper limit Gnh3_H set in order to prevent precipitation of urea water inside the plumbing greatly dropping.

It should be noted that, even if there is no cause of error in the system, when the temperature of the SCR catalyst suddenly rises, just a little $NH_3$ slips from the SCR catalyst (e.g., refer to times t1 and t2 in FIG. 27).

Figure 28:
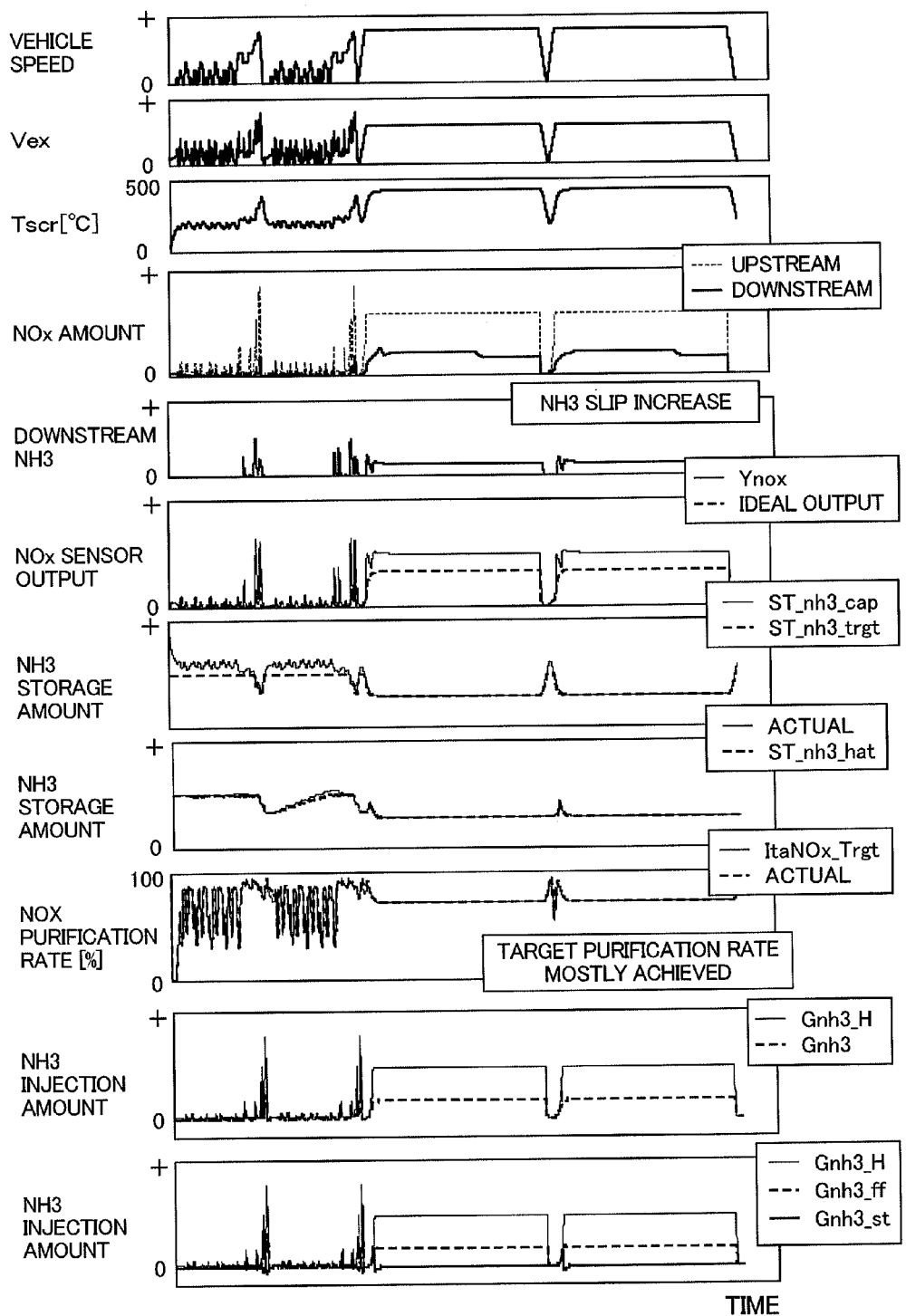
FIG. 28 provides graphs showing the simulation results of Experiment 2.

FIG. 28 provides graphs showing the simulation results of Experiment 2.

In Experiment 2, only the inputs from the feed-forward controller and $NH_3$ storage controller were used, similarly to Experiment 1. However, the urea water injector was the upper-limit article.

In the system of Experiment 2, since the input of the feedback controller is cut, even if error occurs, an input to compensate for this will not be present. For this reason, the urea water ($NH_3$) is always injected more abundantly than the command value Gnh3. Therefore, compared with the results of Experiment 1 (refer to FIG. 27), the NOx purification rate can be achieved up to almost the same degree; however, $NH_3$ slip steadily occurs even in the cruise state.

Figure 29:
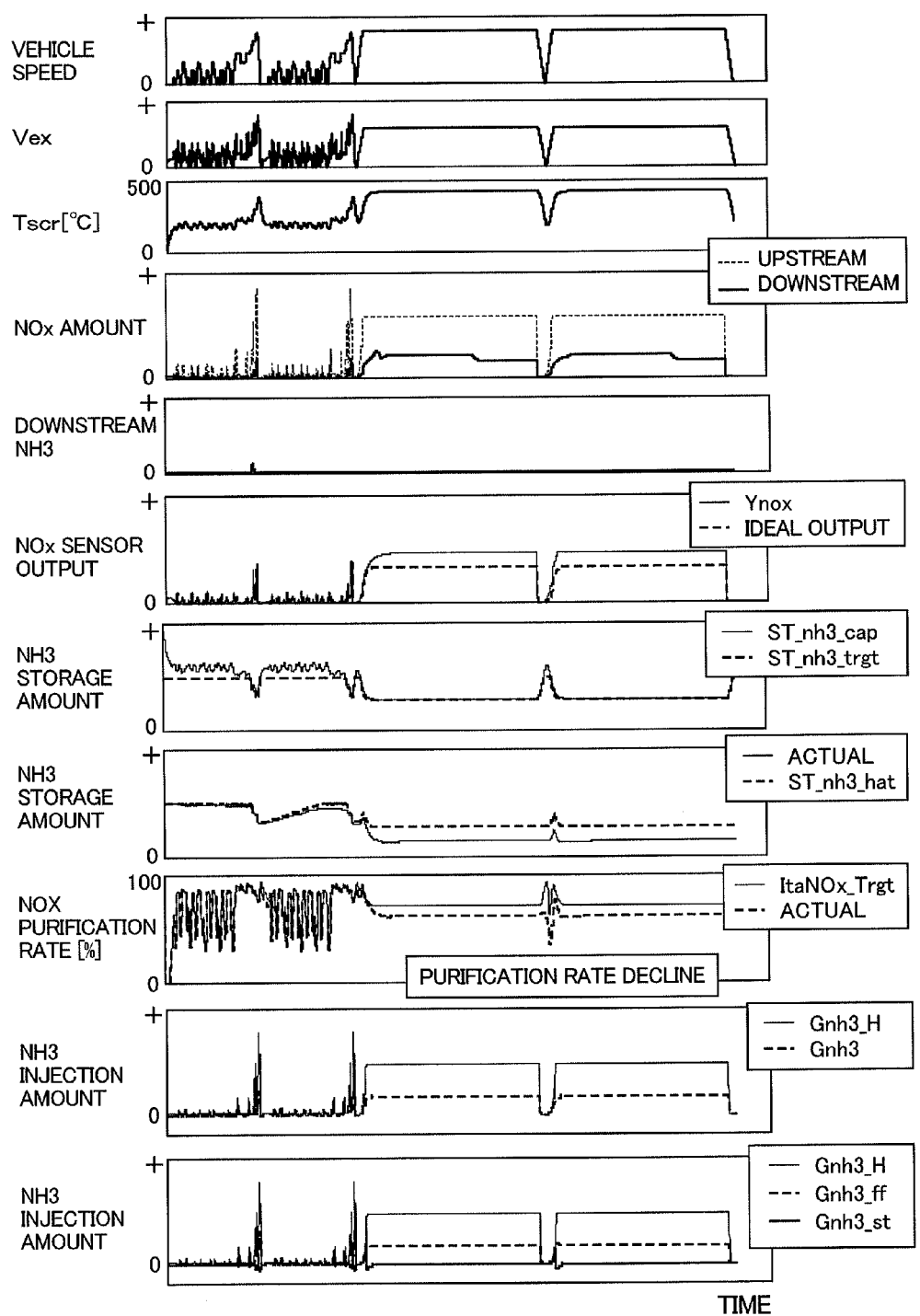
FIG. 29 provides graphs showing the simulation results of Experiment 3.

FIG. 29 provides graphs showing the simulation results of Experiment 3.

In Experiment 3, only the inputs from the feed-forward controller and $NH_3$ storage controller were used, similarly to Experiment 1. However, the urea water injector was the lower-limit article.

The system of Experiment 3 also cuts the input of the feedback controller; therefore, even if error occurs, an input to compensate for this will not be present. For this reason, the urea water ($NH_3$) is always less than the command value Gnh3; therefore, the actual $NH_3$ storage amount and the estimated value thereof ST_nh3_hat greatly diverge. As a result, the NOx purification rate continues a state of being lower than the target NOx purification rate ItaNOx_trgt.

Figure 30:
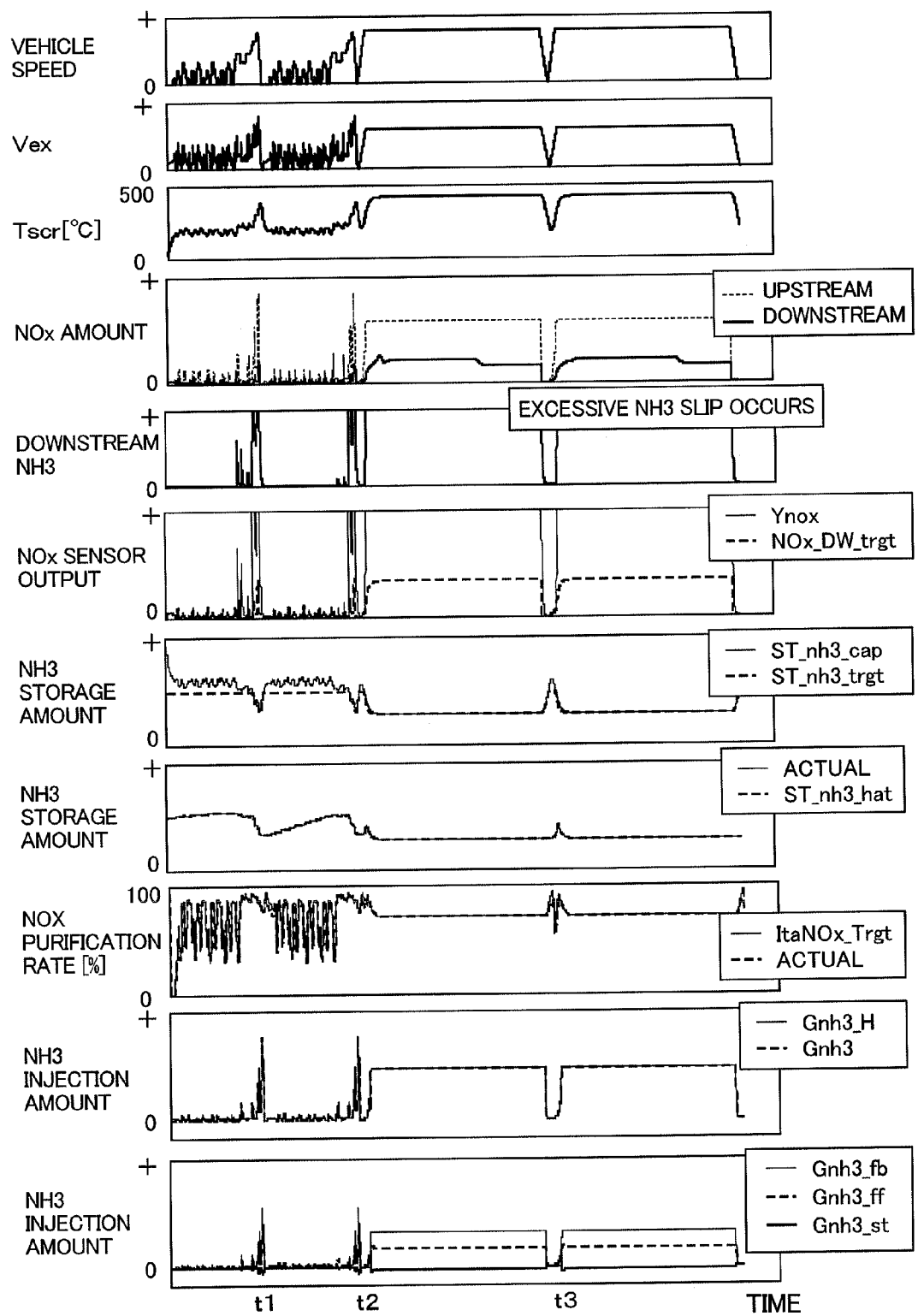
FIG. 30 provides graphs showing the simulation results of Experiment 4.

FIG. 30 provides graphs showing the simulation results of Experiment 4.

In Experiment 4, only the inputs from the feed-forward controller, $NH_3$ storage controller and sliding-mode controller of the feedback controller were used. It should be noted that the sliding-mode controller allowed operating in both the transient state and cruise state. In addition, in Experiment 4, the urea water injector was the reference article.

The system of Experiment 4 cuts the input from the separation filter to the sliding-mode controller; therefore, the sliding-mode controller calculates the feedback input Gnh3_fb so as to cause the NOx sensor output value Ynox to converge to the target value NOx_DW_trgt.

In this case, as shown at times t1, t2, t3, etc. in FIG. 30, when $NH_3$ slip occurs temporarily due to the temperature of the SCR catalyst suddenly rising, the sliding-mode controller will misrecognize the increase in the output Ynox of the NOx sensor as a decline in the NOx purification rate, and make the feedback input Gnh3_fb increase to compensate for this. At this time, since the $NH_3$ slip will further increase if the urea water injection amount is made to increase, as a result, the state of the $NH_3$ injection amount Gnh3 clinging to the upper limit value thereof. Gnh3_H continues, and excessive $NH_3$ slip occurs.

Figure 31:
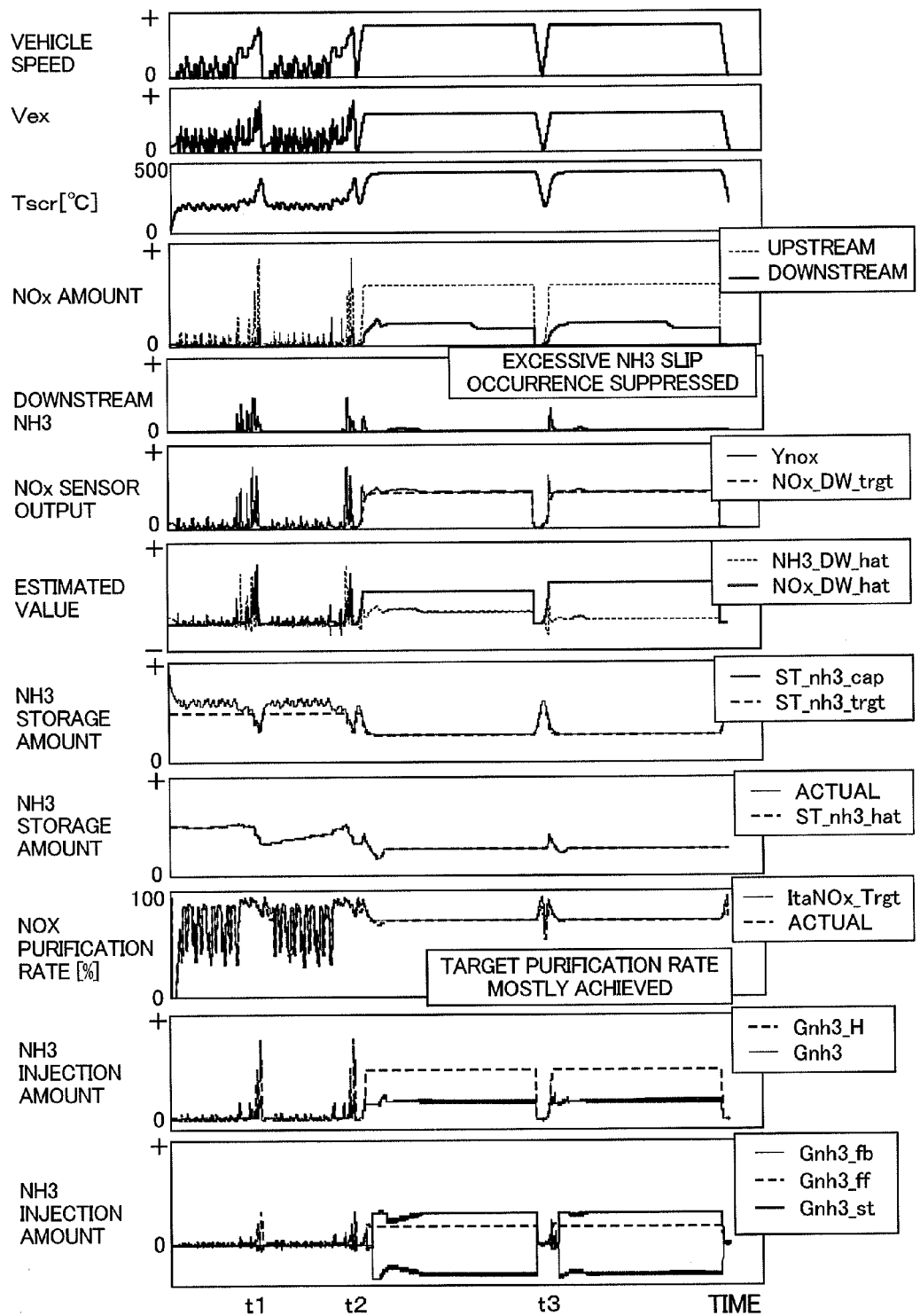
FIG. 31 provides graphs showing the simulation results of Experiment 5.

FIG. 31 provides graphs showing the simulation results of Experiment 5.

In Experiment 5, all of the inputs from the feed-forward controller, $NH_3$ storage controller and feedback controller were used. In addition, in Experiment 5, the urea water injector was the reference article.

With the system of Experiment 5, as time passes and the identification of the purification coefficient Kscr progresses, since the sliding-mode controller will appropriately discriminates between NOx slip and $NH_3$ slip, the urea water injection amount will not be made to increase due to misrecognizing the occurrence of $NH_3$ slip (refer to times t1, t2 and t3 in FIG. 31) as a decline in NOx purification rate. For this reason, there is a tendency for excessive $NH_3$ slip not to occur as in the case of Experiment 4, and the amount of $NH_3$ slipping to decrease as the identification of the purification coefficient Kscr progresses.

In addition, in the cruise state from t2 or from t3, since the accuracy of the separation filter will no longer be maintained as described above, the calculation of the feedback input Gnh3_fb is switched from the sliding-mode controller to the extrema search controller. Even in this case, the extrema of the NOx sensor output value Ynox will be appropriately found with the elapse of time, and $NH_3$ slip will be suppressed while maintaining the NOx purification rate at the target value.

Figure 32:
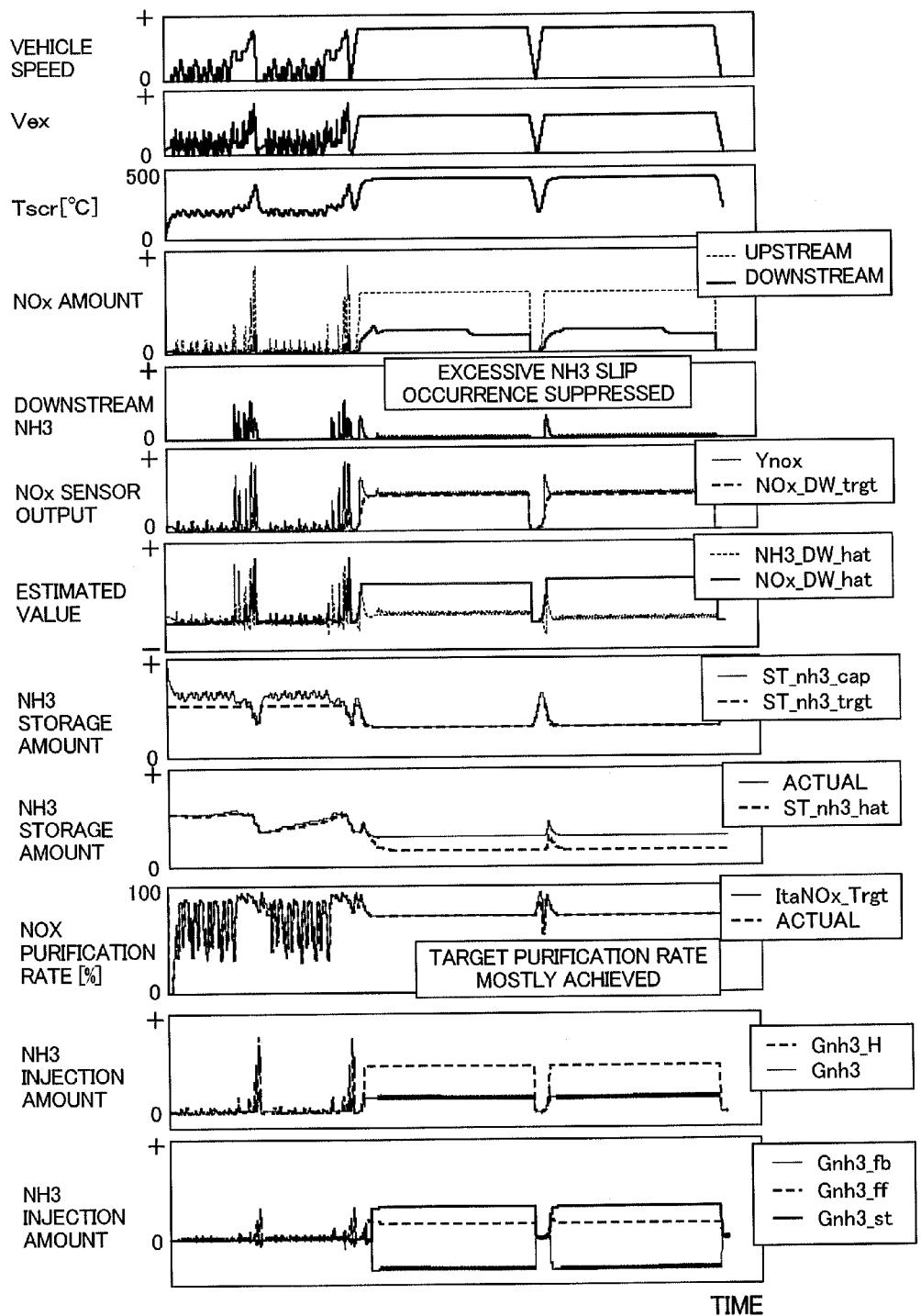
FIG. 32 provides graphs showing the simulation results of Experiment 6.

FIG. 32 provides graphs showing the simulation results of Experiment 6.

In Experiment 6, all of the inputs from the feed-forward controller, $NH_3$ storage controller and feedback controller were used. However, it differed from the above Experiment 5 in the aspect of the urea water injector being the upper-limit article.

With the system of Experiment 6, since there is a +15% injection amount error, the amount of $NH_3$ slip is large when compared with the results of Experiment 5; however, continuous slip did not occur so long as excessive slip does not occur. In addition, the NOx purification rate will not decline due to the $NH_3$ storage amount being insufficient.

Figure 33:
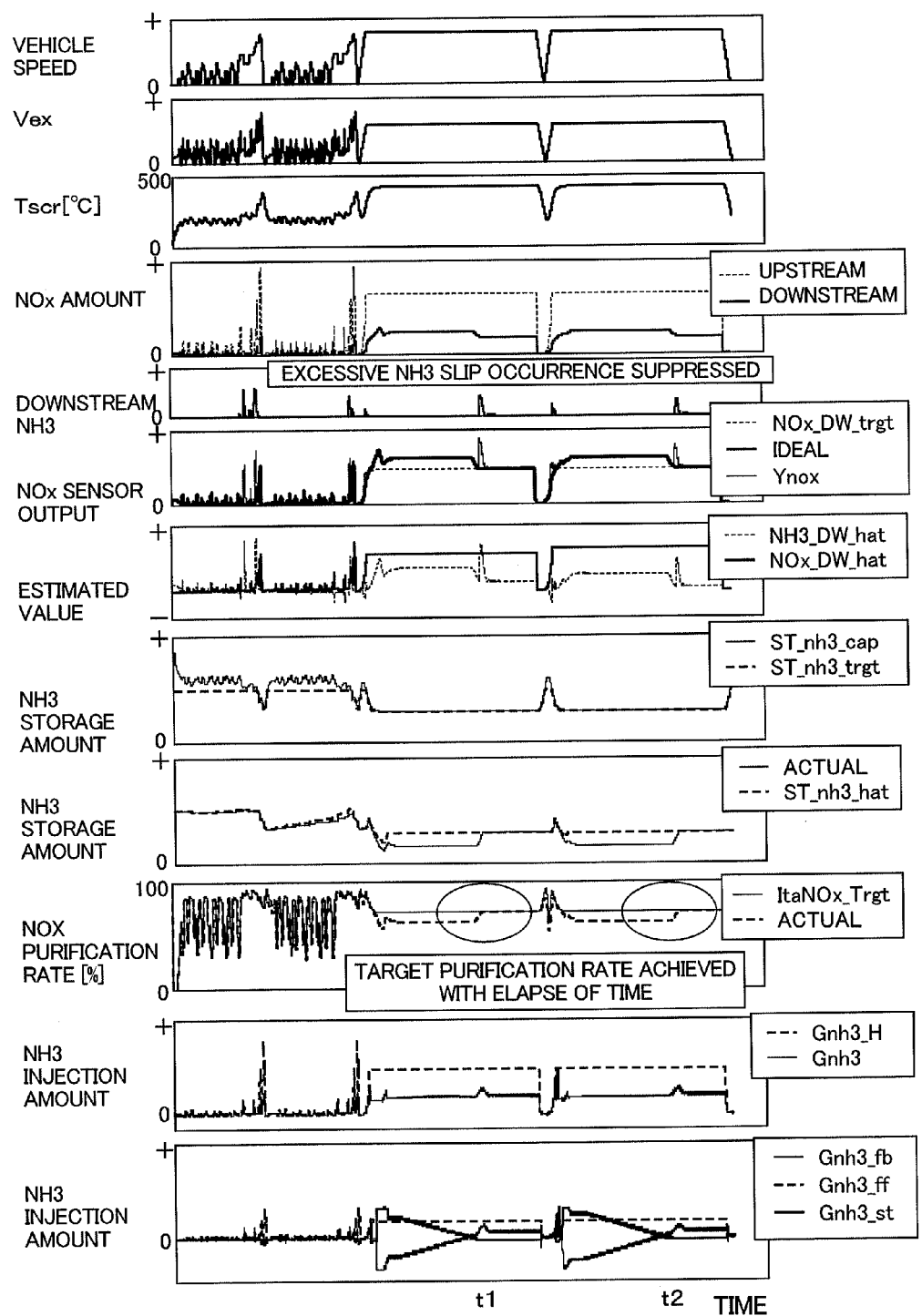
FIG. 33 provides graphs showing the simulation results of Experiment 7.

FIG. 33 provides graphs showing the simulation results of Experiment 7.

In Experiment 7, all of the inputs from the feed-forward controller, $NH_3$ storage controller and feedback controller were used. However, it differed from the above Experiment 5 in the aspect of the urea water injector being the lower-limit article.

In the system of Experiment 7, the urea water injection amount was always small relative to the command value; therefore, as shown in the above results of Experiment 2, if there is no input from the feedback controller, the $NH_3$ storage amount will be less than the target value thereof. In contrast, with the system of Experiment 7, excessive $NH_3$ slip is not allowed to occur, and it is successful in causing the $NH_3$ storage amount to return to the target value thereof (refer to times t1 and t2 in FIG. 33).

Effects of Separation Filter

Next, the effects of the aforementioned separation filter 32B will be explained in further detail.

As explained while referencing FIG. 4, the spectral distribution of the downstream NOx concentration of the SCR catalyst exhibits an upward convex characteristic generally with a peak at 1 to 2 Hz; whereas, the spectral distribution of the downstream $NH_3$ concentration has a peak near a low frequency side when compared to the downstream NOx concentration, and the stationary component becomes the largest.

Figure 34:
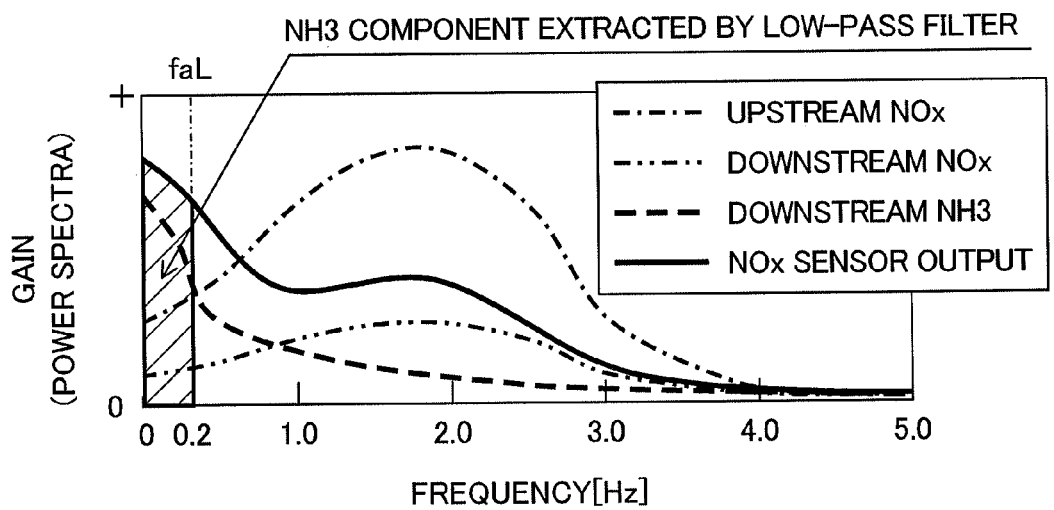
FIG. 34 is a graph showing the spectral distributions of the upstream NOx concentration, downstream NOx concentration, downstream $NH_3$ concentration, and output of the downstream-side NOx sensor.

If based only on such a consideration, then setting, as the estimated value of the downstream $NH_3$ concentration, a value obtained by passing the output value Ynox of the downstream-side NOx sensor through a low-pass filter with the frequency faL as the cut-off frequency is considered appropriate. In this case, the region indicated by hatching in FIG. 34 is extracted from the output of the NOx sensor as the $NH_3$ component. However, as shown in FIG. 34, in the component extracted from the output of the NOx sensor as the $NH_3$ component by this method, not only is it not possible to include the frequency component of $NH_3$ that is higher than the cut-off frequency faL, but the frequency component of NOx that is lower than the cut-off frequency faL comes to be included. Therefore, for the estimated value obtained by passing the sensor output through a filter to achieve sufficient accuracy, the operating conditions are limited to operating states further limited to transient states, and the estimation accuracy will considerably decline at other conditions.

Figure 35:
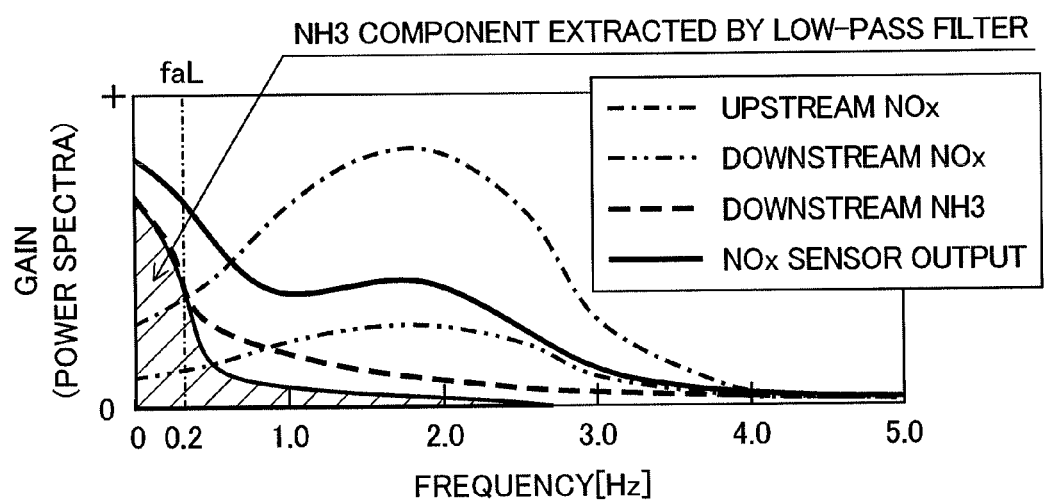
FIG. 35 is a graph showing the spectral distributions of the upstream NOx concentration, downstream NOx concentration, downstream $NH_3$ concentration, and output of the downstream-side NOx sensor.

In contrast, with the aforementioned separation filter 32B, since the frequency components lower than the cut-off frequency faL are blocked by the high-pass filter or band-pass filter from the downstream NOx sensor output value Ynox and upstream NOx sensor output value NOx_UP by way of the transient extraction filter 322B and 323B, the value of the purification coefficient Kscr will be identified so that the identification error eid calculated from these filter values (refer to formula (12-1)) becomes a minimum, and the downstream NOx estimated value NOx_DW_hat and downstream $NH_3$ estimated value NH3_DW_hat are calculated. In other words, with the separation filter 32B, the value obtained by passing the downstream NOx sensor output value Ynox through a high-pass filter or band-pass filter having a lower cut-off frequency faL is not simply set as the downstream NOx estimated value. Therefore, the region extracted from the output of the downstream NOx sensor as the $NH_3$ component by the separation filter 32B is included not all around from the low frequency component to the high frequency component, as shown by the hatching in FIG. 35. In other words, the separation filter 32B is configured so as to remove the NOx frequency components of the low frequency range, and to include the high frequency component of $NH_3$ that does not have a correlation to the upstream NOx, and thus can extract the $NH_3$ component from the output of the downstream NOx sensor.

Second Embodiment

Hereinafter, a second embodiment of the present invention will be explained while referencing the drawings.

Figure 36:
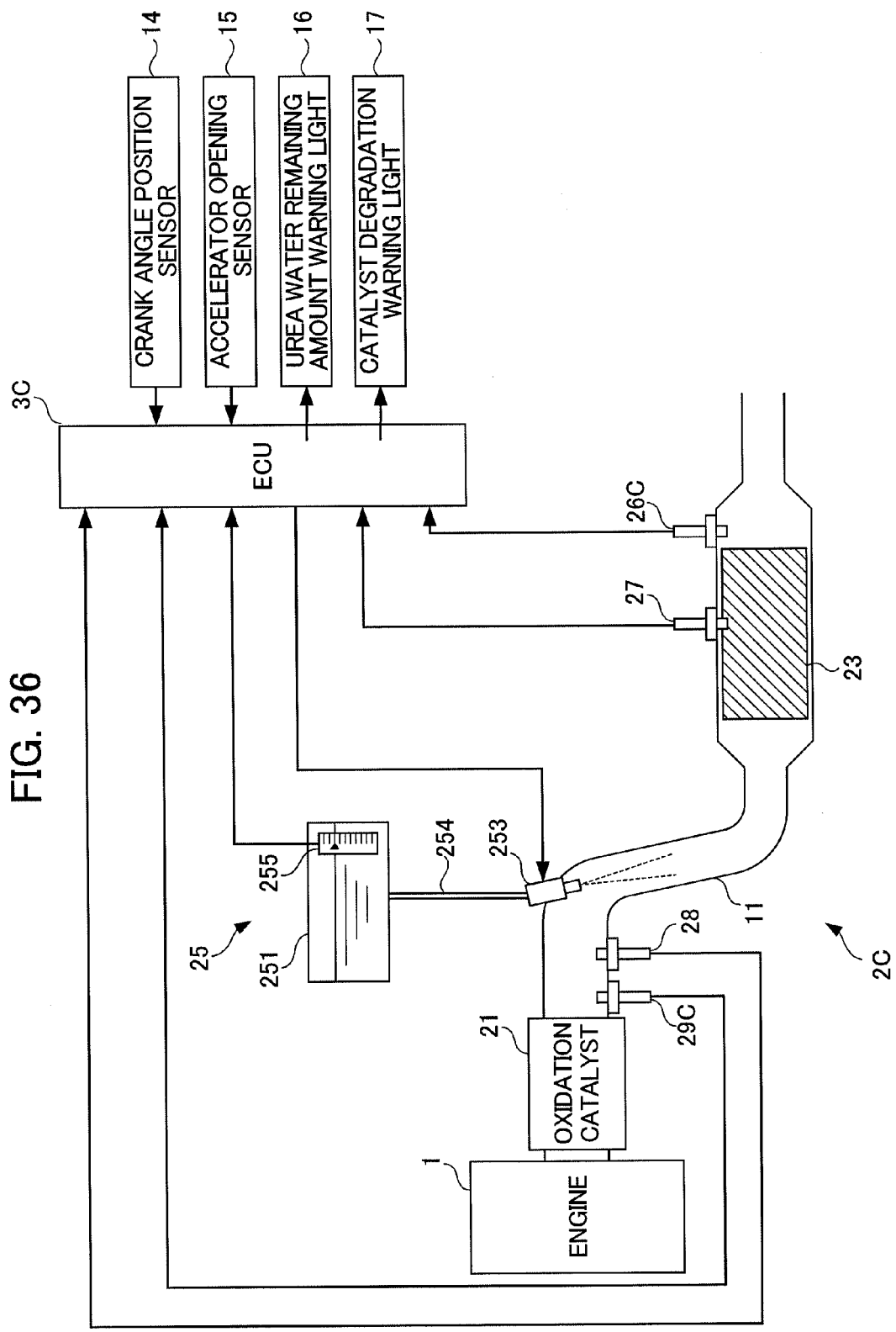
FIG. 36 is a graph showing the configuration of an engine and an exhaust purification system thereof according to a second embodiment of the present invention.

FIG. 36 is a view showing the configurations of an engine 1 and an exhaust purification system 2C thereof according to the present embodiment. In the following explanation, the same reference symbols are assigned for configurations that are the same as the first embodiment, and detailed explanations thereof will be omitted.

Compared to the exhaust purification system 2 of the first embodiment (refer to FIG. 1), the exhaust purification system 2C differs in the aspect of including an $NH_3$ sensor 26C in place of the downstream-side NOx sensor 26, and the aspect of further including an LAF sensor 29C.

The $NH_3$ sensor 26C is provided in the exhaust channel 11 on the downstream side of the SCR catalyst 23, detects the concentration of $NH_3$ in exhaust on the downstream side from the SCR catalyst, and supplies a detection signal substantially proportional to the detection signal to the ECU 3C.

The LAF sensor 29C is provided in the exhaust channel 11 between the oxidation catalyst 21 and the urea water injector 253, detects the $O_2$ concentration in the exhaust flowing into the SCR catalyst 23, and supplies a detection signal according to this concentration to an ECU 3C. This LAF sensor 29C has a linear output characteristic substantially proportional to the $O_2$ concentration of the detection location, in a wide range from the rich side to the lean side relative to a theoretical air fuel ratio of the air-fuel mixture of the engine 1. It should be noted that the detection signal of the LAF sensor 29C is processed in the ECU 3C as a value corresponding to the equivalence ratio of the air-fuel mixture of the engine 1. In addition, the position at which this LAF sensor 29C is provided may be on the upstream side of the oxidation catalyst 21.

The ECU 3C determines the urea water injection amount based on the detection values of the $NH_3$ sensor 26C, catalyst temperature sensor 27, upstream-side NOx sensor 28 and LAF sensor 29C. It should be noted that the details of urea-water injection control by this ECU 3C will be explained later while referencing FIG. 39.

Herein, the matter of the $NH_3$ sensor 26C, which is the substitute article of the downstream-side NOx sensor 26 in the exhaust purification system 2 of the first embodiment, will be explained.

Figure 37:
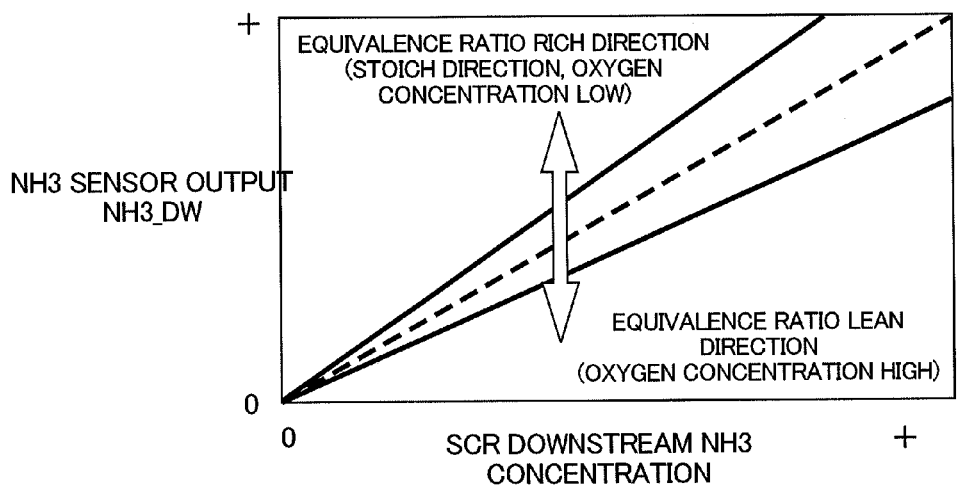
FIG. 37 is a graph showing the output characteristic of an $NH_3$ sensor under the presence of $O_2$.

FIG. 37 is a graph showing the output characteristic of the $NH_3$ sensor under the presence of $O_2$. The $NH_3$ sensor differs from the NOx sensor explained in the first embodiment, and is able to detect the concentration in the exhaust of only the $NH_2$ component. However, for existing $NH_3$ sensors, when $O_2$ is present in the exhaust, there is a characteristic of the gain fluctuating depending on the concentration thereof.

First, a predetermined reference equivalence ratio for the equivalence ratio of the air-fuel mixture of the engine is established on the lean side of stoich, the $O_2$ concentration of the exhaust on the downstream side of the SCR catalyst at this time is defined as the reference $O_2$ concentration, and further, the output characteristic of the $NH_3$ sensor at this time is shown by the dashed line in FIG. 37. When the equivalence ratio of the air-fuel mixture fluctuates to the richer side near stoich from this reference state, the $O_2$ concentration on the downstream side of the SCR catalyst declines, and the $NH_3$ sensor fluctuates to the high gain side, as shown in FIG. 37. In other words, the $NH_3$ sensor exhibits higher output than the reference state for an input. Conversely, when the equivalence ratio of the air-fuel mixture fluctuates to the leaner side from the reference state, the $O_2$ concentration on the downstream side of the SCR catalyst rises, and the $NH_3$ sensor fluctuates to the low gain side, as shown in FIG. 37. In other words, the $NH_3$ sensor exhibits lower output than the reference state for an input.

Figure 38:
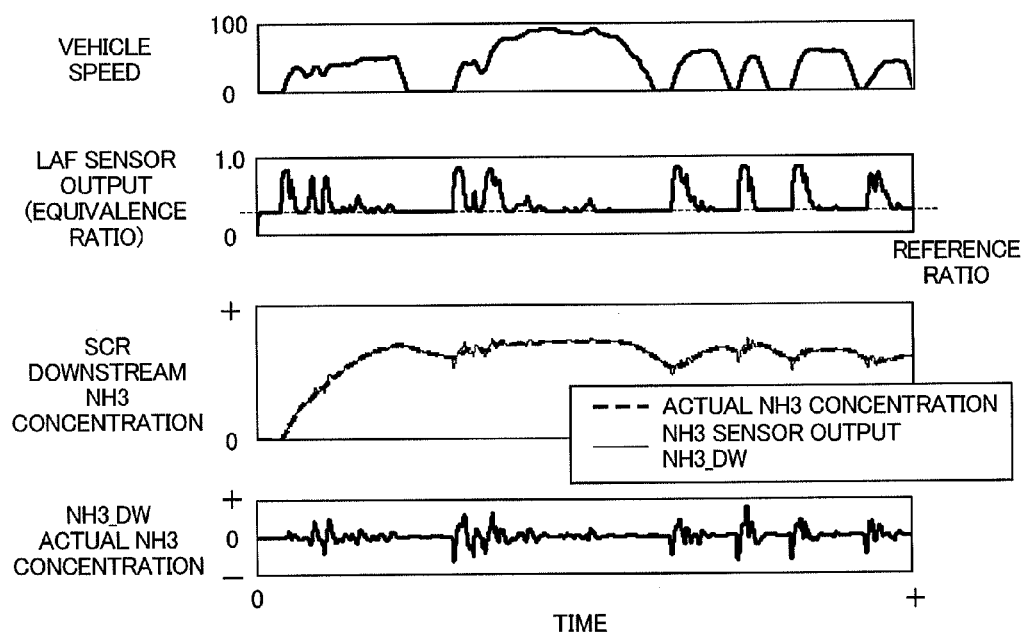
FIG. 38 provides graphs showing the changes in the LAF sensor and $NH_3$ sensor when the vehicle accelerates.

FIG. 38 provides graphs showing the changes of the LAF sensor and $NH_3$ sensor when the vehicle accelerates.

When the vehicle repeats acceleration, since the equivalence ratio of the air-fuel mixture of the engine also fluctuates from the reference equivalence ratio, error arises in the output value NH3_DW of the $NH_3$ sensor relative to the actual $NH_3$ concentration on the downstream side of the SCR catalyst, as shown in the bottom graph in FIG. 38. Hereinafter, the sequence of urea-water injection control of the present embodiment so as to compensate for the error in the $NH_3$ sensor that can occur particularly when the vehicle is in a transient state in this way will be explained in detail.

Figure 39:
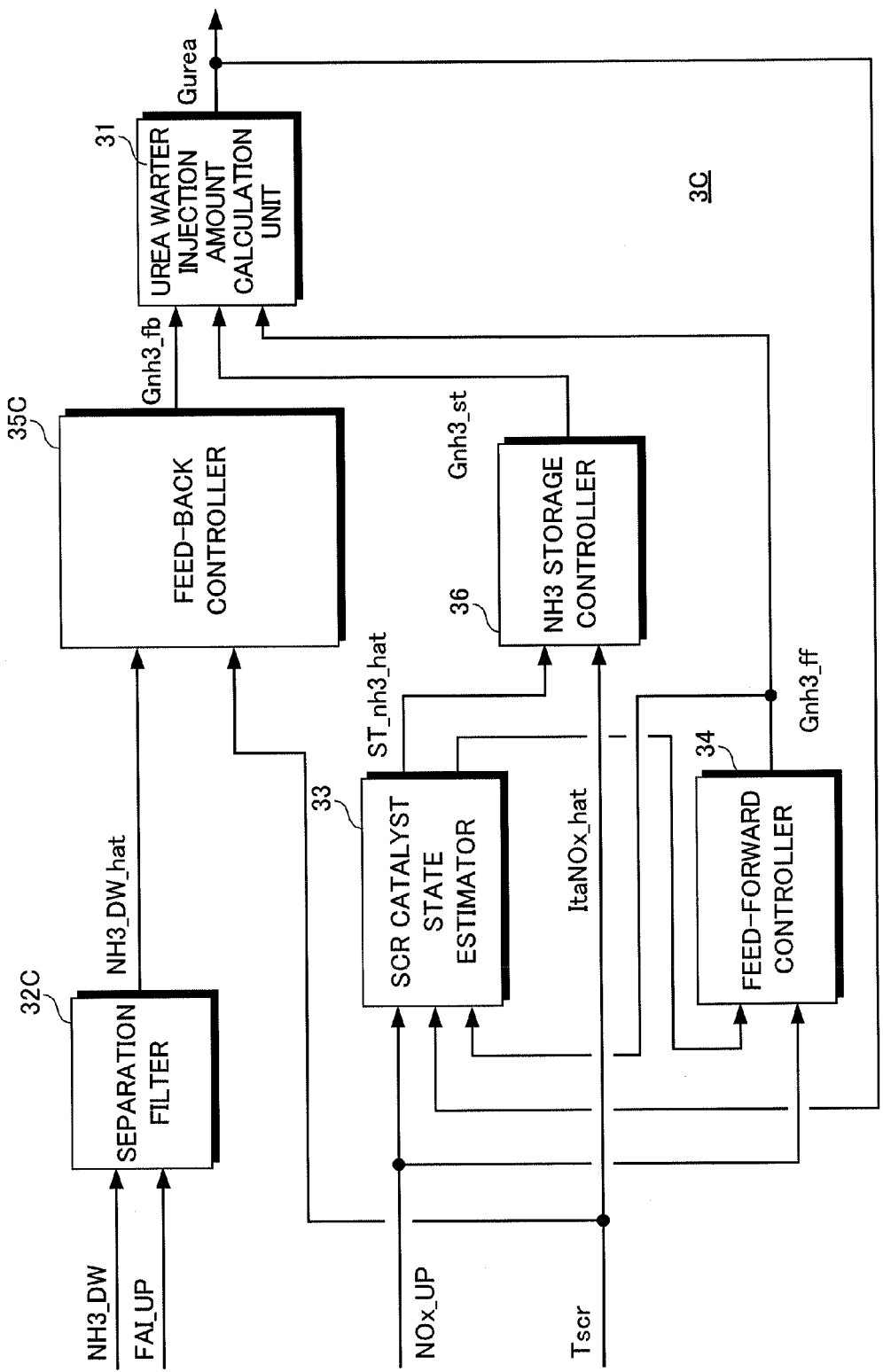
FIG. 39 is a block diagram related to the execution of urea-water injection control in an ECU.

FIG. 39 is a block diagram related to the execution of urea-water injection control of the ECU 3C.

At least the four of the output value NH3_DW of the $NH_3$ sensor corresponding to the concentration value of $NH_3$ in the exhaust on the downstream side from the SCR catalyst, the output value Tscr of the catalyst temperature sensor corresponding to the temperature value of the SCR catalyst, the output value NOx_UP of the upstream-side NOx sensor corresponding to the concentration value of NOx in the exhaust on the upstream side from the SCR catalyst, and the output value FAI_UP of the LAF sensor corresponding to the equivalence ratio of the air-fuel mixture of the engine are inputted as observables indicating the state of the exhaust purification system to the ECU 3C. The ECU 3C determines the value Gurea of the urea water injection amount corresponding to the control input of the urea-water injection device, based on the above-mentioned at least four observables. It should be noted that, among these observables, the output value NOx_UP of the upstream-side NOx sensor and the output value FAI_UP of the LAF sensor may be substituted by values estimated from parameters indicating the operating state of the engine, without using sensors. In addition, the output value Tscr of the catalyst temperature sensor also may be substituted by a value estimated from the operating state of the engine without using a sensor, a value estimated from the output value of a temperature sensor detecting a temperature other than that of the SCR catalyst, etc.

The sequence of operations in the separation filter 32C and feedback controller 35C of the urea-water injection control in the present embodiment differs from the sequence of urea-water injection control in the first embodiment shown in FIG. 2.

The separation filter 32C removes (separates) the error component from the $NH_3$ sensor output value NH3_DW including a error component depending on the fluctuation from the reference $O_2$ concentration of the $O_2$ concentration (equivalence ratio of air-fuel mixture), as described above, and calculates the downstream $NH_3$ estimated value NH3_DW_hat corresponding to the real $NH_3$ concentration value on the downstream side from the SCR catalyst.

The feedback controller 35C calculates the value Gnh3_fb of the feedback input corresponding to the amount of $NH_3$ required in the SCR catalyst in order to make the downstream $NH_3$ estimated value NH3_DW_hat converge to the predetermined target value NH3_DW_trgt.

Hereinafter, the specific sequence of operations of this separation filter 32C and feedback controller 35C will be explained while referencing the drawings.

Separation Filter

The concept of operations performed by the separation filter 32C and the specific sequence thereof will be explained.

Figure 40:
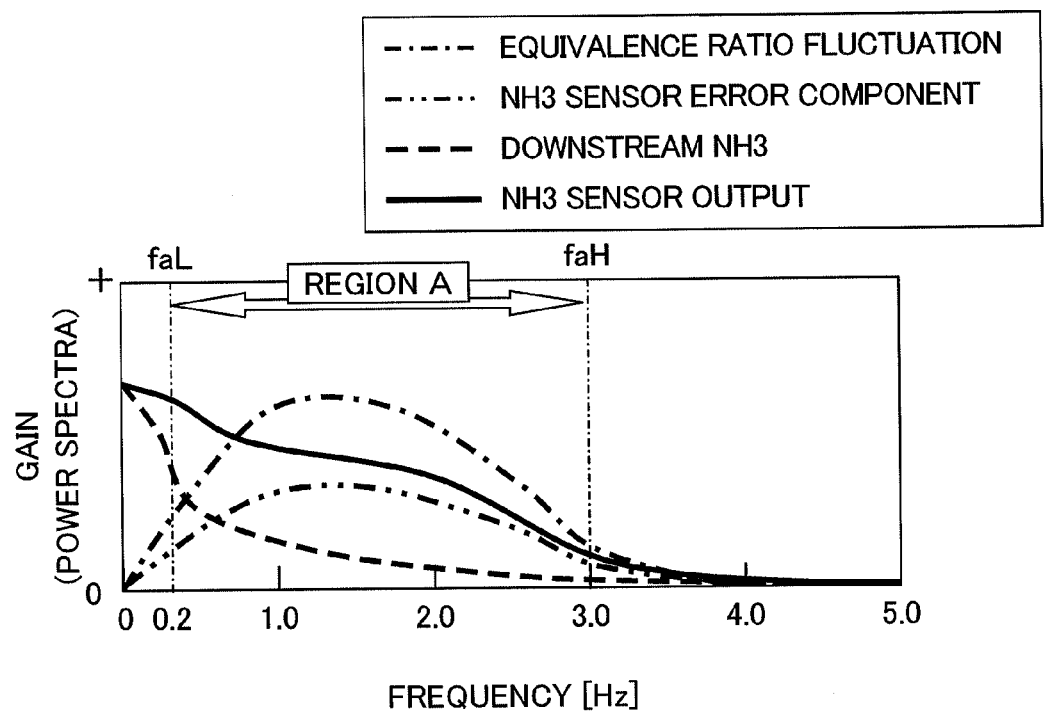
FIG. 40 is a graph showing the spectral distributions of various physical quantities on the upstream side and downstream side of the SCR catalyst.

FIG. 40 is a graph showing the spectral distribution of various physical quantities on the upstream side and downstream side of the SCR catalyst. More specifically, the one-dot dashed line indicates the spectral distribution of the fluctuation of the LAF sensor output on the upstream side of the SCR catalyst from the reference equivalence ratio (LAF sensor output value–reference equivalence ratio). The dashed line indicates the spectral distribution of the $NH_3$ concentration on the downstream side of the SCR catalyst. The solid line indicates the spectral distribution of the output of the $NH_3$ sensor. The two-dot dashed line indicates the spectral distribution of the error component of the $NH_3$ sensor ($NH_3$ sensor output–actual $NH_3$ concentration).

As explained while referencing FIG. 38, the fluctuation behavior of the LAF sensor output from the reference equivalence ratio is coupled to the acceleration requests from the driver. For this reason, the spectral distribution (one-dot dashed line) of the fluctuation (equivalence ratio fluctuation) of the LAF sensor output from the reference equivalence ratio varies depending on the driver, but exhibits an upward convex characteristic with a peak generally at 1 to 2 Hz.

The spectral distribution of the $NH_3$ sensor error component (two-dot dashed line) also exhibits an upward convex characteristic with a peak generally at 1 to 2 Hz.

The spectral distribution of the downstream $NH_3$ concentration (dashed line) has a peak nearer the low frequency side when compared with the aforementioned equivalence ratio fluctuation or $NH_3$ sensor error component, and the stationary component becomes the largest.

The spectral distribution of the $NH_3$ sensor output (solid line) combines the $NH_3$ sensor error component and the downstream $NH_3$ concentration.

In addition, when comparing the spectral distributions between the downstream $NH_3$ concentration and $NH_3$ sensor error component, both somewhat overlap, but clearly differ qualitatively. On the other hand, the $NH_3$ sensor error component and equivalence ratio fluctuation are substantially the same qualitatively. In other words, this means that, if the ratio of the frequency gain of the LAF sensor output fluctuation to the frequency gain of the $NH_3$ sensor error component can be calculated, it is possible to extract (separate) the value of the downstream $NH_3$ concentration closer to the true value from the output value of the $NH_3$ sensor, by estimating the value of the $NH_3$ sensor error component from the value of the equivalence ratio fluctuation, and further, subtracting the estimated value of the $NH_3$ sensor error component from the output value of the $NH_3$ sensor. Hereinafter, the configuration of a separation filter 32C that separates the downstream $NH_3$ estimated value NH3_DW_hat from the $NH_3$ sensor output value NH3_DW based on such a principle will be explained.

Figure 41:
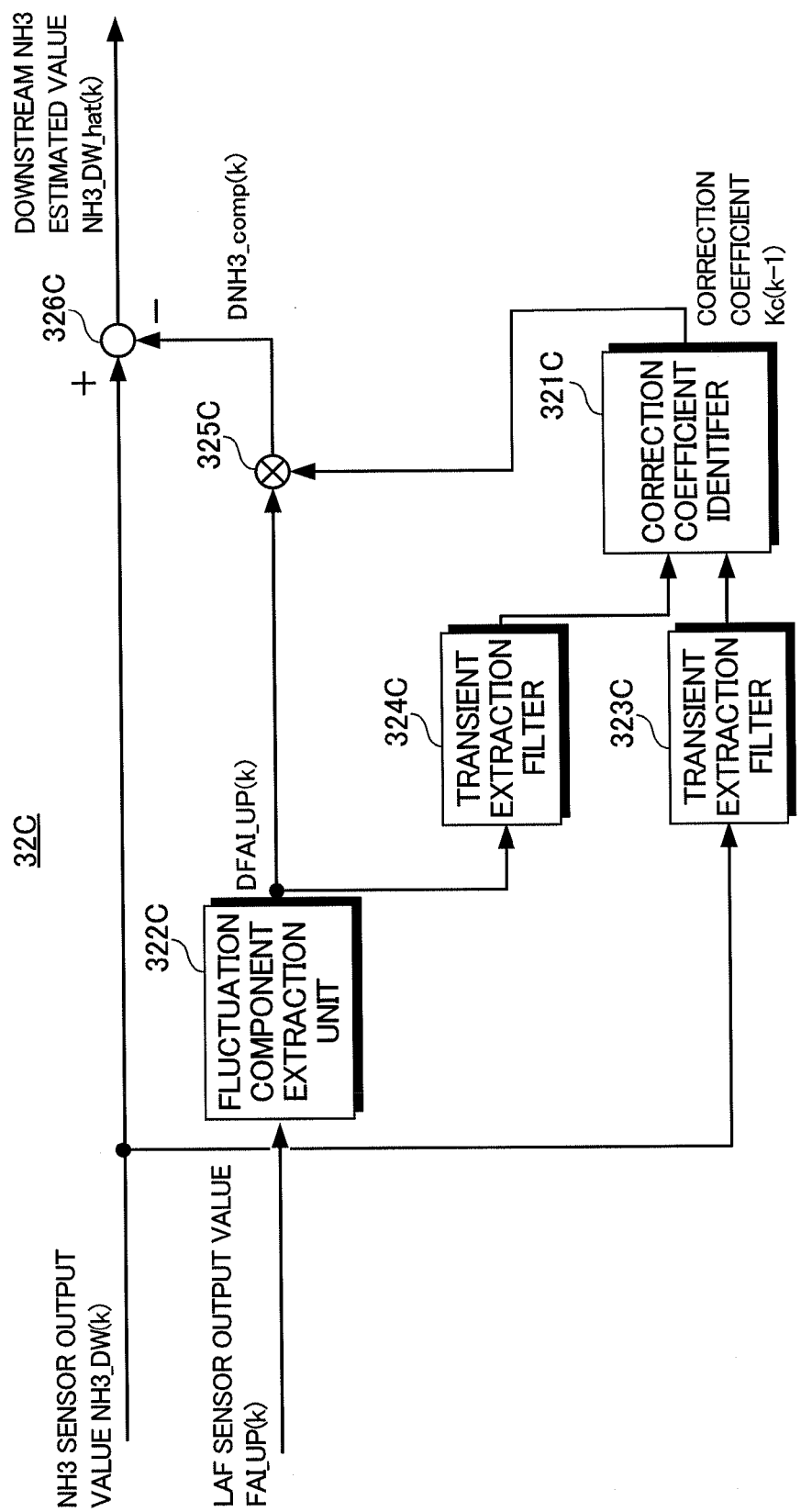
FIG. 41 is a block diagram showing the configuration of a separation filter.

FIG. 41 is a block diagram showing the configuration of the separation filter 32C.

The separation filter 32C calculates the downstream $NH_3$ estimated value NH3_DW_hat when the $NH_3$ sensor output value NH3_DW and LAF sensor output value FAI_UP are inputted. The separation filter 32C includes a correction coefficient identifier 321C, fluctuation component extraction unit 322C, transient extraction filter 323C for the $NH_3$ sensor output value, transient extraction filter 324C for the LAF sensor output value, multiplier 325C, and adder 326C.

The adder 326C calculates the downstream $NH_3$ estimated value NH3_DW_hat by subtracting the correction value DNH3_comp corresponding the error component value of the aforementioned $NH_3$ sensor from the $NH_3$ sensor output value NH3_DW (refer to below formula (45)).

$$NH3\_DW\_hat(k) = NH3\_DW(k) - DNH3\_comp(k) \quad (45)$$

The fluctuation component extraction unit 322C calculates an equivalence ratio fluctuation value DFAI_UP by subtracting a reference equivalence ratio FAI_UP_BS from the output value FAI_UP of the LAF sensor, as shown in the below formula (46-1). It should be noted that this equivalence ratio fluctuation value DFAI_UP may use a value Fd(FAI_UP(k)) extracted from the output value FAI_UP of the LAF sensor by a high-pass filter or band-pass filter at least blocking a stationary component, as shown in the below formula (46-2).

$$DFAI\_UP(k) = FAI\_UP(k) - FAI\_UP\_BS \quad (46\text{-}1)$$

$$DFAI\_UP(k) = Fd(FAI\_UP(k)) \quad (46\text{-}2)$$

As explained while referencing FIG. 40, the spectral distribution of the correction value (equivalence ratio fluctuation value) DFAI_UP and the spectral distribution of the error component value DNH3_comp of the $NH_3$ sensor represented by formula (46-1) or (46-2) are substantially the same qualitatively. This means that the assumption that the $O_2$ discharged from the engine passes through the SCR catalyst in a proportion substantially equal to the overall frequency component and affects the gain change of the $NH_3$ sensor downstream of the catalyst is considered appropriate. Therefore, the correction value DNH3_comp can be modeled with a value obtained by multiplying a predetermined multiplier coefficient Kc by the equivalence ratio fluctuation value DFAI_UP, as shown in the below formula (47). Hereinafter, this multiplier coefficient Kc is referred to as a correction coefficient. The multiplier 325C calculates the correction value DNH3_comp(k) by multiplying the correction coefficient Kc(k−1) for which the value thereof is identified by the correction coefficient identifier 321C described later, by an equivalence ratio fluctuation value DFAI_UP(k−d) for which a dead time d has past (refer to below formula (47)).

$$DNH3\_comp(k) = Kc(k-1)DFAI\_UP(k-d) \quad (47)$$

The transient extraction filter 323C calculates the filter value NH3_DW_f of the output value NH3_DW of the $NH_3$ sensor by performing operations as shown in the below formula (48). Herein, the filter coefficients a1 to a4 and b1 to b5 in the below formula (48) are set to values such that the Region A in FIG. 40 is obtained, i.e. a band-pass filter characteristic in which the frequency faL for which the spectrum of $NH_3$ in the output of the $NH_3$ sensor is considered to sufficiently decline is set as the lower cut-off frequency, and the frequency faH for which the spectrum of the output of the LAF sensor is considered to sufficiently decline is set as the upper cut-off frequency.

$$\begin{aligned}NH3\_DW\_f(k) = &\ a1 \cdot NH3\_DW\_f(k-1) + a2 \cdot NH3\_DW\_f(k-2) + \\ &\ a3 \cdot NH3\_DW\_f(k-3) + a4 \cdot NH3\_DW\_f(k-4) + \\ &\ b1 \cdot NH3\_DW(k) + b2 \cdot NH3\_DW(k-1) + b3 \cdot NH3\_DW(k-2) + \\ &\ b4 \cdot NH3\_DW(k-3) + b5 \cdot NH3\_DW(k-4)\end{aligned} \quad (48)$$

The transient extraction filter 324C calculates the filter value DFAI_UP_f of the equivalence ratio fluctuation value DFAI_UP, by performing operations as shown in the below formula (49). The filter coefficient of this transient extraction filter 324C preferably uses the same value as that of the above-mentioned transient extraction filter 323C.

$$\begin{aligned}DFAI\_UP\_f(k) = &\ a1 \cdot DFAI\_UP\_f(k-1) + a2 \cdot DFAI\_UP\_f(k-2) + \\ &\ a3 \cdot DFAI\_UP\_f(k-3) + a4 \cdot DFAI\_UP\_f(k-4) + \\ &\ b1 \cdot DFAI\_UP(k) + b2 \cdot DFAI\_UP(k-1) + b3 \cdot DFAI\_UP(k-2) + \\ &\ b4 \cdot DFAI\_UP(k-3) + b5 \cdot DFAI\_UP(k-4)\end{aligned} \quad (49)$$

It should be noted that the above-mentioned transient extraction filters 323C and 324C may be high-pass filters not limited to band-pass filters, so long as blocking a stationary component and allowing a frequency band corresponding to the increase-decrease request of drive power by the driver is allowed to pass.

The correction coefficient identifier 321C identifies the value of the correction coefficient Kc(k) so that the square of the error eid between the filter value NH3_DW_f of the $NH_3$ sensor output value and a value NH3_DW_f_hat obtained by multiplying the correction coefficient Kc by the filter value DFAI_UP_f of the equivalence ratio fluctuation value (value corresponding to filter value of the correction value DNH3_comp in formula (47)) becomes a minimum. The so-called recursive least-squares method algorithm shown by the below formulas (50-3) to (50-6) is used as an algorithm identifying this value of the correction coefficient Kc(k), for example, similarly to the first embodiment.

$$NH3\_DW\_f\_hat(k) = Kc(k-1) DFAI\_UP\_f(k-d) \quad (50\text{-}1)$$

$$eid(k) = NH3\_DW\_f(k) - NH3\_DW\_f\_hat(k) \quad (50\text{-}2)$$

$$Kc(k) = Kc\_ini + dKc(k) \quad (50\text{-}3)$$

$$dKc(k) = \delta dKc(k-1) + K_p(k) \cdot e_{id}(k) \quad (50\text{-}4)$$

$$K_p(k) = \frac{P(k) \cdot DFAI\_UP\_f(k-d)}{1 + P(k) \cdot DFAI\_UP\_f(k-d)^2} \quad (50\text{-}5)$$

-continued $$P(k+1) = \frac{1}{\lambda_1}\left(1 - \frac{\lambda_2 P(k) \cdot \text{DFAI\_UP\_f}(k-d)^2}{\lambda_1 + \lambda_2 P(k) \cdot \text{DFAI\_UP\_f}(k-d)^2}\right)P(k) \quad (50\text{-}6)$$

In the above formulas (50-5) to (50-6), "P" is an adaptive gain, and the initial value P(0) thereof is set to a positive value. In addition, in formula (50-4), "δ" is a forgetting factor of no more than 1, and is set to δ=0.999, for example.

Figure 42:
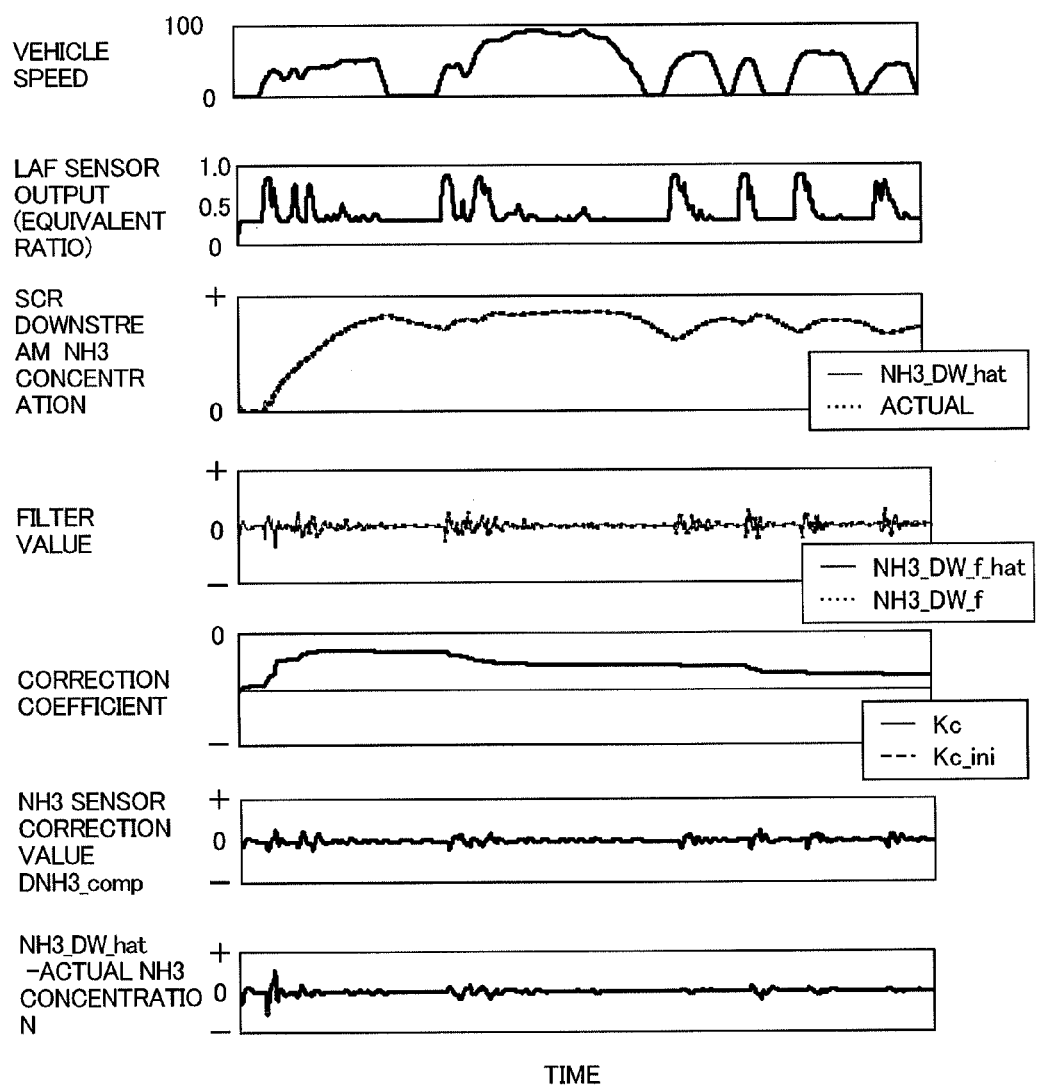
FIG. 42 provides graphs showing the simulation results of the separation filter according to the embodiment.
Figure 43:
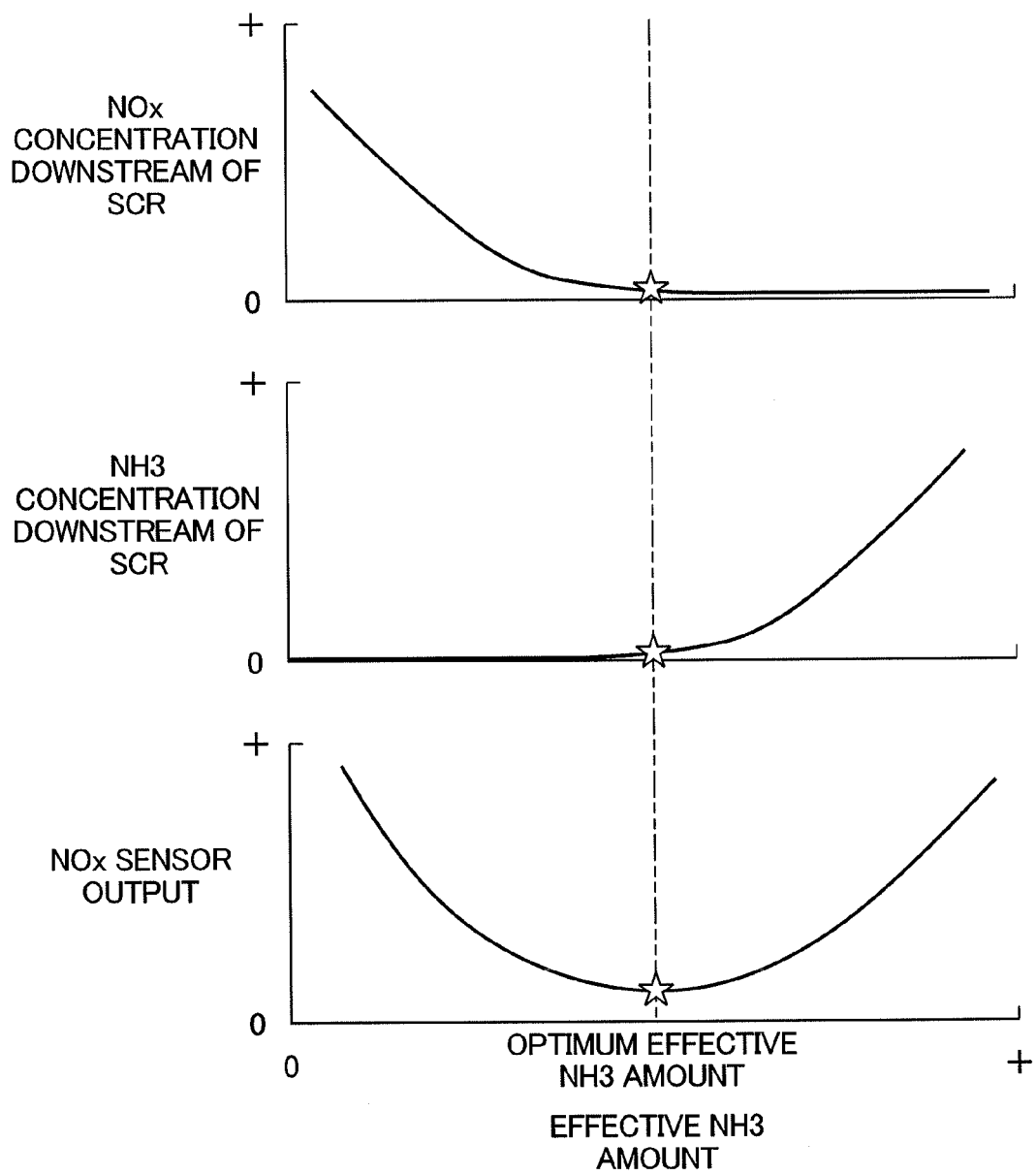
FIG. 43 provides graphs showing the output characteristic of the NOx sensor of a conventional exhaust purification system.
Figure 44:
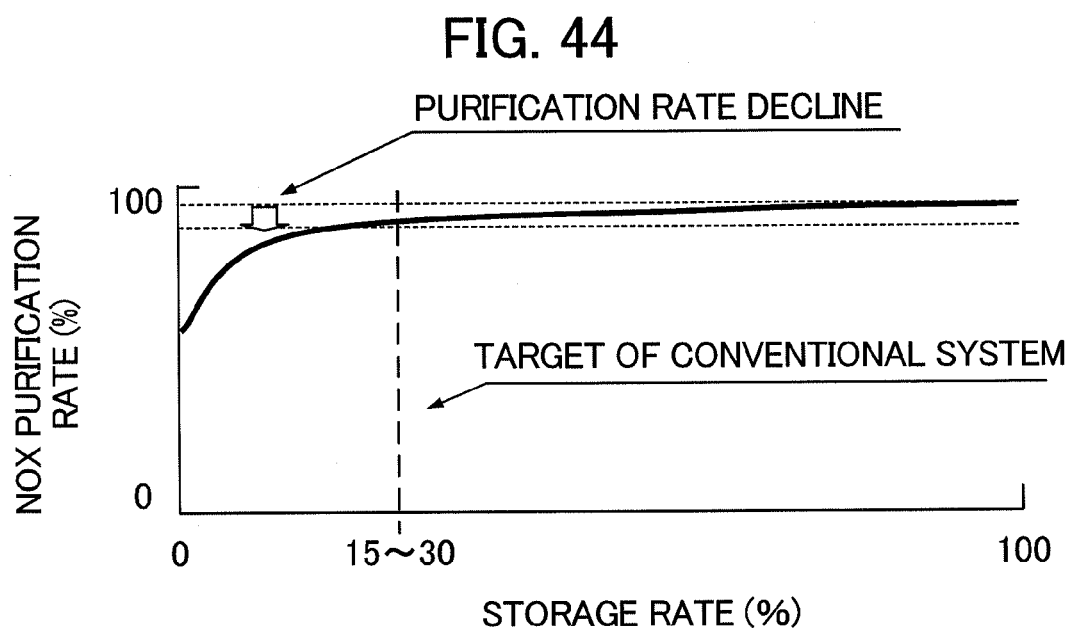
FIG. 44 is a graph showing the relationship between the $NH_3$ storage rate and NOx purification rate of the SCR catalyst.

FIG. 42 provides graphs showing the simulation results of the separation filter.

In sequence from the top, FIG. 42 shows the vehicle speed, LAF sensor output, NH$_3$ concentration on the downstream side (comparing downstream NH$_3$ estimated value NH3_DW_hat and actual NH$_3$ concentration), filter value (comparing the value NH3_DW_f_hat corresponding to the filter value of the correction value DNH3_comp and the filter value NH3_DW_f of the NH$_3$ sensor output value), correction coefficient (comparing correction coefficient Kc and initial value Kc_ini), NH$_3$ sensor correction value DNH3_comp, and error between actual NH$_3$ concentration and estimated value NH3_DW_hat. It should be noted that the simulation conditions such as the vehicle speed are the same as those shown in FIG. 38.

As shown in FIG. 42, the value of the correction coefficient Kc is appropriately updated so that the error of the filter values NH3_DW_f and NH3_DW_f_hat become minimums as time progresses. In addition, as is evident by comparing with the simulation results of FIG. 38, the error between the downstream NH$_3$ estimated value NH3_DW_hat and the actual NH$_3$ concentration drastically declines.

Feedback Controller

Referring back to FIG. 39, the specific sequence of operations performed by the feedback controller 35C will be explained.

Different from the aforementioned first embodiment, the separation filter of the present embodiment can always calculate the downstream NH$_3$ estimated value NH3_DW_hat with high accuracy, irrespective of the operating state of the vehicle; therefore, it is unnecessary to shift between operation algorithms of the feedback input Gnh3_fb depending on the operating state. Therefore, the feedback controller 35C calculates the feedback input Gnh3_fb so as to minimize the deviation input Enh3 obtained by subtracting the target value NH3_DW_trgt from the downstream NH$_3$ estimated value NH3_DW_hat (refer to above formula (31-2)) in substantially the same sequence as the sliding-mode controller of the feedback controller 35 of the first embodiment (refer to above formulas (28) to (35)).

However, since there is no input corresponding to the downstream NOx estimated value NOx_DW_hat of the first embodiment in the feedback controller 35C of the present embodiment, the NOx concentration on the downstream side of the SCR catalyst cannot be actively controlled, contrary to the first embodiment. However, by maintaining the downstream NH$_3$ estimated value NH3_DW_hat at the target value NH3_DW_trgt as shown in FIG. 19, and determining the urea water injection amount Gurea by way of the feed-forward controller 34 and NH$_3$ storage controller 36, the effective NH$_3$ amount Gnh3_scr of the SCR catalyst is also maintained at substantially the optimum value Gnh3_scr_opt; therefore, the NOx purification rate of the SCR catalyst will not excessively decline even when not actively controlling the NOx concentration. In addition, in the case of the purification rate of the SCR catalyst having declined due to degradation or the like, since the supply amount of NH$_3$ tends to be excessive, NH$_3$ slip occurs easily. In such a case, by continuing to control the downstream NH$_3$ estimated value NH3_DW_hat to the target value NH3_DW_trgt by way of the feedback controller 35, since continuous NH$_3$ slip will not occur, the present embodiment is considered more advantageous.

Although two embodiments have been explained in the foregoing, the present invention is not to be limited thereto.

Although an example applying the present invention to an exhaust purification system of urea addition type with NH$_3$ as the reducing agent and that supplies urea water as a precursor thereof by way of an injector is illustrated in the above-mentioned embodiments, it is not limited thereto.

For example, it is effective also when applying the present invention to a system that directly supplies NH$_3$ gas, without supplying urea water from an injector. In addition, the reducing agent for reducing NOx is not limited to NH$_3$. The present invention can be applied to an exhaust purification system using hydrocarbons (HC) in place of NH$_3$ as the reducing agent for reducing NOx.

In addition, as the reducing agent supply means for supplying NH$_3$ or urea water to the SCR catalyst, it is not necessarily a means that supplies stored urea water or NH$_3$ as in the urea-water injection device 25 of the above-mentioned embodiments, and a means on the vehicle that generates as appropriate may be used. More specifically, technology is known that generates NH$_3$ to supply to the SCR catalyst as appropriate on an oxidation catalyst or three-way catalyst provided on an upstream side from the SCR catalyst, by causing the air-fuel ratio of the air-fuel mixture of the engine to change intermittently from leaner than stoich to stoich or to richer than stoich. Therefore, a means that generates NH$_3$ in an amount as required by combining air-fuel ratio control of the air-fuel mixture of the engine and a catalyst provided on the upstream side of the SCR catalyst may be established as the reducing agent supply means.

What is claimed is:

1. An exhaust purification system for an internal combustion engine comprising:
   a selective reduction catalyst that is provided in an exhaust channel of the internal combustion engine and purifies NOx in exhaust under the presence of NH$_3$;
   a reducing agent supply means for supplying NH$_3$ or a precursor thereof to the selective reduction catalyst;
   an exhaust gas sensor that detects a concentration of a component combining NOx and NH$_3$ in exhaust on a downstream side from the selective reduction catalyst;
   an upstream-side detection means for detecting or estimating a concentration of NOx in exhaust on an upstream side from the selective reduction catalyst;
   a downstream-side estimation means for modeling an estimated value of the concentration of NOx in exhaust on a downstream side from the selective reduction catalyst with a value obtained by multiplying a predetermined purification coefficient by an output value of the upstream-side detection means;
   an identification means for identifying a value of the purification coefficient so that error between an output value of the exhaust gas sensor and an output value of the downstream-side estimation means, or error of a value corresponding to a filter value of each of the output values becomes a minimum; and
   a supply amount determination means for determining a supply amount of the reducing agent supply means based on the output value of the downstream-side estimation means.

2. The exhaust purification system for an internal combustion engine according to claim 1, characterized in that the exhaust purification system further comprising a transient extraction filter that blocks a stationary component and that allows at least a frequency band corresponding to a increase-decrease request of drive power from a driver to pass therethrough from the output value of the exhaust gas sensor and the output value of the upstream-side detection means, and calculates a filter value of each; and
    the identification means identifies the value of the purification coefficient so that error between the filter value of the output value of the exhaust gas sensor and a value obtained by multiplying the purification coefficient by the filter value of the output value of the upstream-side detection means becomes a minimum.

3. The exhaust purification system for an internal combustion engine according to claim 1, characterized in that the exhaust purification system further comprises a transient state determination means for determining whether the internal combustion engine is in a transient state; and
    the identification means updates the value of the purification coefficient in a case of having been determined as being a transient state.

4. The exhaust purification system for an internal combustion engine according to claim 1, characterized in that the supply amount determination means includes a feedback controller that determines a supply amount of the reducing agent supply means so that the output value of the downstream-side estimation means becomes a predetermined downstream-side NOx concentration target value, or so that the estimated value of the NOx purification rate of the selective reduction catalyst calculated based on the output value of the downstream-side estimation means becomes a predetermined NOx purification rate target value.

5. The exhaust purification system for an internal combustion engine according to claim 1, characterized in that the supply amount determination means includes a feedback controller that sets a value obtained by subtracting the output value of the downstream-side estimation means from the output value of the exhaust gas sensor as an estimated value of an $NH_3$ concentration on a downstream side from the selective reduction catalyst, and determines the supply amount of the reducing agent supply means so that the estimated value of the $NH_3$ concentration on the downstream side of the selective reduction catalyst converges to a predetermined downstream-side $NH_3$ concentration target value.

6. The exhaust purification system for an internal combustion engine according to claim 5, characterized in that:
    the NOx purification rate of the selective reduction catalyst reaches a local maximum at a predetermined optimum temperature;
    a maximum $NH_3$ storage amount that is a maximum value for an $NH_3$ amount that can be adsorbed to the selective reduction catalyst declines as the temperature thereof rises; and
    the downstream-side $NH_3$ concentration target value is set, in a case of a temperature of the selective reduction catalyst being less than the optimum temperature, in accordance with the NOx purification rate achieved by the selective reduction catalyst when $NH_3$ of an amount corresponding to the maximum $NH_3$ storage amount at the optimum temperature is adsorbed,
    and is set, in a case of the temperature of the selective reduction catalyst being at least the optimum temperature, in accordance with the NOx purification rate achieved by the selective reduction catalyst when $NH_3$ of an amount corresponding to the maximum $NH_3$ storage amount at this temperature is adsorbed.

7. The exhaust purification system for an internal combustion engine according to claim 5, characterized in that the downstream-side $NH_3$ concentration target value is set to 0 or a positive value in the vicinity of zero when the temperature of the selective reduction catalyst is less than the optimum temperature at which the NOx purification rate thereof reaches a local maximum, and is set to a value larger than the value for when less than the optimum temperature if the temperature of the selective reduction catalyst is at least the optimum temperature.

8. The exhaust purification system for an internal combustion engine according to claim 5, characterized in that, when the estimated value of the downstream-side $NH_3$ concentration is smaller than a predetermined threshold that is larger than the downstream-side $NH_3$ concentration target value, the feedback controller reduces a rate of decrease in deviation of the estimated value relative to the downstream-side $NH_3$ concentration target value to slower than in a case of the estimated value of the downstream-side $NH_3$ concentration being greater than the threshold.

9. The exhaust purification system for an internal combustion engine according to claim 5,
    characterized in that the feedback controller:
    determines the supply amount of the reducing agent supply means so that deviation between the output value of the downstream-side estimation means and a predetermined downstream-side NOx concentration target value becomes 0, in a case of the estimated value of the downstream-side $NH_3$ concentration being smaller than a threshold that is larger than the downstream-side $NH_3$ concentration target value; and
    determines the supply amount of the reducing agent supply means so that deviation between the estimated value of the downstream-side $NH_3$ concentration and the downstream-side $NH_3$ concentration target value becomes 0, in a case of the estimated value of the downstream-side $NH_3$ concentration being at least the threshold.

10. The exhaust purification system for an internal combustion engine according to claim 1, characterized in that the exhaust purification system further comprises a failure determination means for determining that the selective reduction catalyst has degraded in a case of the value of the purification coefficient becoming greater than a predetermined threshold.

11. The exhaust purification system for an internal combustion engine according to claim 5, characterized in that the exhaust purification system further comprises a failure determination means for determining that the selective reduction catalyst has degraded in a case of the estimated value of the downstream-side $NH_3$ concentration being larger than a predetermined failure determination threshold, and the estimated value of the downstream-side estimation means being larger than a predetermined failure determination threshold.

12. An exhaust purification system for an internal combustion engine comprising:
    a selective reduction catalyst that is provided in an exhaust channel of the internal combustion engine and purifies NOx in exhaust under the presence of $NH_3$;
    a reducing agent supply means for supplying $NH_3$ or a precursor thereof to the selective reduction catalyst; and
    an exhaust gas sensor that detects a concentration of $NH_3$ in exhaust on a downstream side from the selective reduction catalyst, wherein gain of the exhaust gas sensor changes under the presence of $O_2$;
    an upstream-side detection means for detecting or estimating an $O_2$ concentration of exhaust on an upstream side from the selective reduction catalyst;

a variation calculating means for calculating a variation from a predetermined base value of an output value of the upstream-side detection means;

a downstream-side estimation means for modeling an error component value of the exhaust gas sensor with a value obtained by multiplying a predetermined correction coefficient by the variation calculated by way of the variation calculating means;

a transient extraction filter that blocks a stationary component and at least allows a frequency band corresponding to a increase-decrease request of drive power from a driver to pass from the output value of the exhaust gas sensor and the variation calculated by way of the variation calculating means, and calculates a filter value of each;

an identification means for identifying a value of the correction coefficient so that error between the filter value of the output value of the exhaust gas sensor and a value calculated by multiplying the correction coefficient by the filter value of the variation calculated by way of the variation calculating means becomes a minimum; and a supply amount determination means for determining a supply amount of the reducing agent supply means based on an $NH_3$ concentration estimated value obtained by removing the error component value calculated by way of the downstream-side estimation means from the output value of the exhaust gas sensor.

* * * * *